United States Patent [19]
Maeda

[11] Patent Number: 6,067,382
[45] Date of Patent: May 23, 2000

[54] IMAGE CODING BASED ON THE TARGET CODE LENGTH

[75] Inventor: Mitsuru Maeda, Yokohama, Japan

[73] Assignee: Canon Kabushiki Kaisha, Tokyo, Japan

[21] Appl. No.: 09/017,732

[22] Filed: Feb. 3, 1998

[30] Foreign Application Priority Data

Feb. 5, 1997 [JP] Japan .................................... 9-022588

[51] Int. Cl.$^7$ .................................................... G06K 9/00
[52] U.S. Cl. .......................................... 382/239; 382/245
[58] Field of Search .................................... 348/399, 400, 348/391; 382/234, 239, 176, 270, 236, 246, 171, 173, 177, 212, 233, 235, 240, 243, 244, 245

[56] References Cited

U.S. PATENT DOCUMENTS

| | | | |
|---|---|---|---|
| 4,974,071 | 11/1990 | Maeda ........................ | 358/80 |
| 5,245,427 | 9/1993 | Kunihiro ................... | 358/133 |
| 5,359,438 | 10/1994 | Maeda ........................ | 358/75 |
| 5,459,513 | 10/1995 | Oddou ...................... | 348/397 |
| 5,493,514 | 2/1996 | Keith et al. ................. | 364/514 |
| 5,696,842 | 12/1997 | Shirasawa et al. ....... | 382/176 |
| 5,774,592 | 6/1998 | Takeuchi et al. ......... | 382/236 |
| 5,786,855 | 7/1998 | Chen et al. ............... | 348/391 |
| 5,798,795 | 8/1998 | Glenn et al. .............. | 348/398 |
| 5,818,974 | 10/1998 | Kimura et al. ............ | 382/270 |
| 5,821,997 | 10/1998 | Kawamura et al. ..... | 348/131 |
| 5,956,430 | 9/1999 | Kunitake et al. ......... | 382/246 |

FOREIGN PATENT DOCUMENTS

| | | |
|---|---|---|
| 0402016 | 12/1990 | European Pat. Off. . |
| 0583107 | 2/1994 | European Pat. Off. . |
| 8-030725 | 2/1996 | Japan . |
| 96 02895 | 2/1996 | WIPO . |

OTHER PUBLICATIONS

Pat. Abs. Jp., vol. 016, No. 100 (P–1323), Mar. 11, 1992 (JP 03 276263A) No Name, Title, Date, or Page.

Pat. Abs. Jp., vol. 011, No. 276 (P–613), Sep. 8, 1987 (JP 62 075773A) No Name, Title, Date, or Page.

Wang et al., "Graphics segmentation based coding of multimedia images" Electronics Letters, Mar. 30, 1995, vol. 31, No. 7, pp. 542–544.

*Primary Examiner*—Bijan Tadayon
*Assistant Examiner*—Amir Alavi
*Attorney, Agent, or Firm*—Fitzpatrick, Cella, Harper & Scinto

[57] ABSTRACT

A target code length is designated at a code length designation unit, and the entire input image data is encoded by a continuous gradation region encoding unit to obtain the target code length. On the other hand, a region segmentation unit segments the input image data into regions, a limited color region encoding unit encodes limited color regions of the segmented regions, and the continuous gradation region encoding unit encodes continuous gradation regions, so as to obtain the target code length. Either the codes obtained when the entire input image data is encoded or the codes obtained when the image data is encoded by the limited color region encoding unit and continuous gradation region encoding unit in units of regions are output on the basis of the coding unit of the codes of the entire input image data, and the coding unit of the codes of the continuous gradation region.

53 Claims, 32 Drawing Sheets

IMAGE CODING BASED ON THE TARGET CODE LENGTH

BACKGROUND OF THE INVENTION

The present invention relates to an image processing apparatus and method for encoding input image data and outputting encoded image data and, more particularly, to an image processing apparatus and method that can obtain a desired code length as a result of encoding.

In recent years, widespread color printers and the extended functions of DTP systems allow output of document images, character insertion with proper densities, and so on. With such techniques, a document image can be partially emphasized or intentionally made to be unobtrusive, and many kinds of information can be incorporated in a document image.

Meanwhile, a region segmentation technique has become popular. With this technique, constituting elements such as images (continuous gradation), figures, characters, and the like, and a format are defined, and a document image is described as a set of these constituting elements. As one of conventional region segmentation techniques, a method of quantizing a document image and segmenting the quantized image into regions is known. For example, a method of inputting a binary document image and determining regions is known. In this method, an input document image is binarized by comparing it with a pre-set threshold value to be divided into an image (continuous gradation) region, figure region, character region, and the like, and attributes that represent the contents are assigned to the divided regions, thus dividing the document image into a plurality of regions.

The constituting elements of document images that are segmented into a plurality of regions are increasingly sent nowadays as data exchanged via networks represented by the Internet that has become popular along with preparation of worldwide communication networks, and as SGML standardized in U.S.A. For this purpose, the document image or the individual constituting elements of the document image are required to be suitably encoded and transmitted or stored in a storage medium.

For example, the coding method is switched in units of constituting elements of an input document image so as to suitably encode the respective constituting elements of the document image and transmit or store them in a storage medium.

On the other hand, whether the input color document image is a binary or multi-valued image is determined, and the coding method for encoding the color document image is switched in accordance with the determination result, thus suitably encoding the color document image and transmitting or storing it in a storage medium.

However, of the conventional coding methods, since the method of encoding a document image in units of constituting elements uses a plurality of coding methods, code data with a code length that the user desired is hardly obtained as a whole.

On the other hand, in the method of determining whether the input color document image is a binary or multi-valued image, and encoding the color document image in accordance with the determination result, since the document image is encoded by a coding method corresponding to one of binary and multi-valued images, the quality of the document image cannot often be maintained.

SUMMARY OF THE INVENTION

The present invention has been made in consideration of the above-mentioned problems, and has as its object to provide an image processing apparatus and method, which can obtain encoded data with a code length that the user desired upon encoding an input image, and can encode the image while maintaining high image quality.

In order to achieve the above object, an image processing apparatus according to the present invention comprises the following arrangement.

That is, an image processing apparatus comprises:

designation means for designating a target code length as a desired code length;

first coding means for coding entire input image data to obtain the target code length;

segmentation means for segmenting the input image data into a plurality of regions in units of attributes;

second coding means for encoding the regions segmented by the segmentation means in units of attributes to obtain the target code length; and output means for outputting a code encoded by one of the first and second coding means on the basis of a first coding length of a code encoded by the first coding means and a second coding length of a code in a region having a predetermined attribute encoded by the second coding means.

Preferably, the output means compares the first and second coding lengths, outputs the code encoded by the second coding means when the first coding length is larger than the second coding length as a result of comparison, and outputs the code encoded by the first coding means when the second coding length is larger than the first coding length.

Preferably, the first coding means comprises first quantization means for quantizing the input image data, the first coding length is obtained based on a first quantization coefficient used upon quantization in the first quantization means, the second coding means comprises second quantization means for quantizing the region having the predetermined attribute, and the second coding length is obtained based on a second quantization coefficient used upon quantization in the second quantization means.

Preferably, the first coding means encodes the entire input image data by irreversible coding.

Preferably, the second coding means encodes the region having the predetermined attribute by irreversible coding, and encodes a region other than the region having the predetermined attribute by reversible coding.

Preferably, the region having the predetermined attribute is a continuous gradation region having continuous gradation, and a region other than the region having the predetermined attribute is a limited color region that can be expressed by a limited number of colors.

Preferably, the segmentation means segments the input image data into the continuous gradation region and the limited color region.

In order to achieve the above object, an image processing apparatus according to the present invention comprises the following arrangement.

That is, an image processing apparatus comprises:

designation means for designating a target code length as a desired code length;

first coding means for coding entire input image data to obtain the target code length;

segmentation means for segmenting the input image data into a plurality of regions in units of attributes;

second coding means for encoding the regions segmented by the segmentation means in units of attributes to obtain the target code length; and output means for outputting a code encoded by one of the first and second coding means on the basis of a code length of a code encoded by the second coding means.

Preferably, the output means outputs the code encoded by the first coding means when the code length of the code encoded by the second coding means is larger than the target code length, and outputs the code encoded by the second coding means when the code length of the code encoded by the second coding means is smaller than the target code length.

Preferably, the second coding means encodes a region having a predetermined attribute of the regions segmented by the segmentation means by irreversible coding, and encodes a region other than the region having the predetermined attribute by reversible coding.

Preferably, the output means outputs the code encoded by one of the first and second coding means on the basis of a code length of a code obtained when the second coding means encodes the region having the predetermined attribute by irreversible coding to obtain a minimum required code length, and encodes the region other than the region having the predetermined attribute by reversible coding.

Preferably, a region having a predetermined attribute is a continuous gradation region having continuous gradation, and a region other than the region having the predetermined attribute is a limited color region that can be expressed by a limited number of colors.

Preferably, the segmentation means segments the input image data into the continuous gradation region and the limited color region.

In order to achieve the above object, an image processing apparatus according to the present invention comprises the following arrangement.

That is, an image processing apparatus comprises:

designation means for designating a target code length as a desired code length;

segmentation means for segmenting input image data into a plurality of regions in units of attributes;

first coding means for encoding a region other than a region having a predetermined attribute of a plurality of regions segmented by the segmentation means; and second coding means for encoding the region having the predetermined attribute on the basis of the target code length and a code length of a code encoded by the first coding means.

Preferably, the second coding means comprises calculation means for calculating a difference between the target code length and the code length of the code encoded by the first coding means, and the second coding means encodes image data corresponding to the region having the predetermined attribute to obtain a code length of the difference calculated by the calculation means.

The apparatus preferably further comprises output means for outputting the code encoded by the first coding means and a code encoded by the second coding means.

Preferably, the first coding means encodes the region other than the region having the predetermined attribute by reversible coding.

Preferably, the second coding means encodes the region having the predetermined attribute by irreversible coding.

Preferably, the region having the predetermined attribute is a continuous gradation region having continuous gradation, and the region other than the region having the predetermined attribute is a limited color region that can be expressed by a limited number of colors.

Preferably, the segmentation means segments the input image data into the continuous gradation region and the limited color region.

In order to achieve the above object, an image processing method according to the present invention comprises the following arrangement.

That is, an image processing method comprises:

the designation step of designating a target code length as a desired code length;

the first coding step of coding entire input image data to obtain the target code length;

the segmentation step of segmenting the input image data into a plurality of regions in units of attributes;

the second coding step of encoding the regions segmented in the segmentation step in units of attributes to obtain the target code length; and the output step of outputting a code encoded in one of the first and second coding steps on the basis of a first coding length of a code encoded in the first coding step and a second coding length of a code in a region having a predetermined attribute encoded in the second coding step.

In order to achieve the above object, an image processing method according to the present invention comprises the following arrangement.

That is, an image processing method comprises:

the designation step of designating a target code length as a desired code length;

the first coding step of coding entire input image data to obtain the target code length;

the segmentation step of segmenting the input image data into a plurality of regions in units of attributes;

the second coding step of encoding the regions segmented in the segmentation step in units of attributes to obtain the target code length; and the output step of outputting a code encoded in one of the first and second coding steps on the basis of a code length of a code encoded in the second coding step.

In order to achieve the above object, an image processing method according to the present invention comprises the following arrangement.

That is, an image processing method comprises:

the designation step of designating a target code length as a desired code length;

the segmentation step of segmenting input image data into a plurality of regions in units of attributes;

the first coding step of encoding a region other than a region having a predetermined attribute of a plurality of regions segmented in the segmentation step; and the second coding step of encoding the region having the predetermined attribute on the basis of the target code length and a code length of a code encoded in the first coding step.

In order to achieve the above object, a computer readable memory according to the present invention comprises the following arrangement.

That is, a computer readable memory that stores program codes of image processing, comprises:

a program code of the designation step of designating a target code length as a desired code length;

a program code of the first coding step of coding entire input image data to obtain the target code length;

a program code of the segmentation step of segmenting the input image data into a plurality of regions in units of attributes;

a program code of the second coding step of encoding the regions segmented in the segmentation step in units of attributes to obtain the target code length; and a program code of the output step of outputting a code encoded in one of the first and second coding steps on the basis of a first coding length of a code encoded in the first coding step and a second coding length of a code in a region having a predetermined attribute encoded in the second coding step.

In order to achieve the above object, a computer readable memory according to the present invention comprises the following arrangement.

That is, a computer readable memory that stores program codes of image processing, comprises:

a program code of the designation step of designating a target code length as a desired code length;

a program code of the first coding step of coding entire input image data to obtain the target code length;

a program code of the segmentation step of segmenting the input image data into a plurality of regions in units of attributes;

a program code of the second coding step of encoding the regions segmented in the segmentation step in units of attributes to obtain the target code length; and a program code of the output step of outputting a code encoded in one of the first and second coding steps on the basis of a code length of a code encoded in the second coding step.

In order to achieve the above object, a computer readable memory according to the present invention comprises the following arrangement.

That is, a computer readable memory that stores program codes of image processing, comprises:

a program code of the designation step of designating a target code length as a desired code length;

a program code of the segmentation step of segmenting input image data into a plurality of regions in units of attributes;

a program code of the first coding step of encoding a region other than a region having a predetermined attribute of a plurality of regions segmented in the segmentation step; and a program code of the second coding step of encoding the region having the predetermined attribute on the basis of the target code length and a code length of a code encoded in the first coding step.

In order to achieve the above object, an image processing apparatus according to the present invention comprises the following arrangement.

That is, an image processing apparatus, comprising:

holding means for holding a predetermined target code length;

input means for inputting a first type object image and second type object image which form an image for one frame;

first coding means for coding the first type object image using a first method;

second coding means for coding the second type object image using a second method, an algorithm of which is different from an algorithm of the first method; and code length control means for controlling coding of said second coding means so as to make encoded data corresponding to the plurality of object images that form the image for one frame have the predetermined code length as a whole.

In order to achieve the above object, an image processing method according to the present invention comprises the following arrangement.

That is, an image processing method, comprising:

the holding step of holding a predetermined target code length;

the input step of inputting a first type object image and second type object image which form an image for one frame;

the first coding step of coding the first type object image using a first method;

the second coding step of coding the second type object image using a second method, an algorithm of which is different from an algorithm of the first method; and the code length control step of controlling coding of said second coding step so as to make encoded data corresponding to the plurality of object images that form the image for one frame have the predetermined code length as a whole.

In order to achieve the above object, a computer readable memory according to the present invention comprises the following arrangement.

That is, a computer readable memory that stores program codes of image processing, comprises:

a program code the holding step of holding a predetermined target code length;

a program code of the input step of inputting a first type object image and second type object image which form an image for one frame;

a program code of the first coding step of coding the first type object image using a first method;

a program code of the second coding step of coding the second type object image using a second method, an algorithm of which is different from an algorithm of the first method; and a program code of the code length control step of controlling coding of said second coding step so as to make encoded data corresponding to the plurality of object images that form the image for one frame have the predetermined code length as a whole.

According to the present invention described above, there can be provided an image processing apparatus and method, which can efficiently obtain code data with a code length that the user desired upon encoding an input image, and can attain encoding while maintaining high image quality.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

<First Embodiment>

Figure 1:
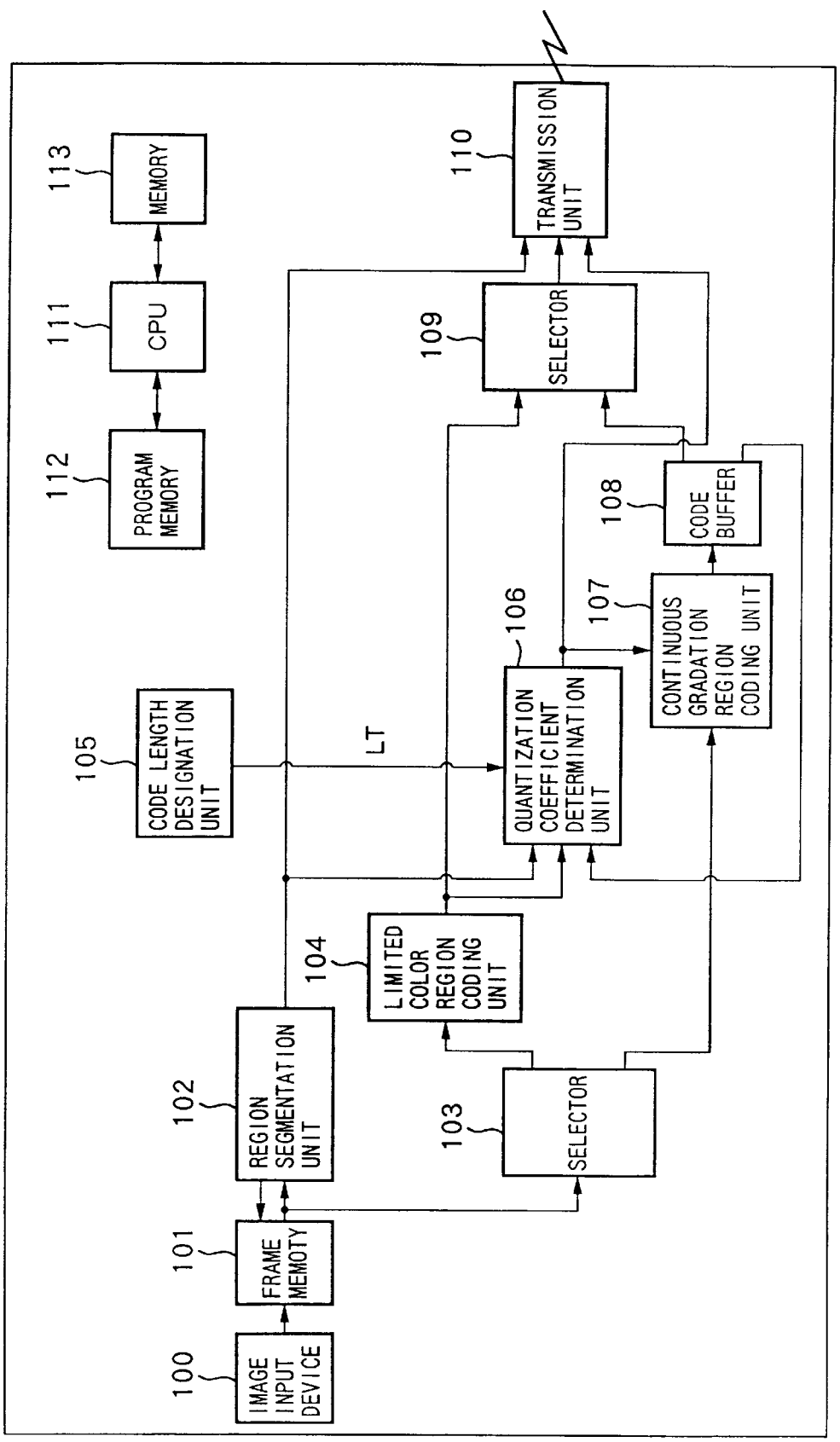
FIG. 1 is a block diagram showing the arrangement of an image processing apparatus according to the first embodiment of the present invention.

FIG. 1 is a block diagram showing the arrangement of an image processing apparatus according to the first embodiment of the present invention.

In FIG. 1, reference numeral 100 denotes an image input device which inputs an image, and comprises, e.g., a scanner, or the like. In this embodiment, the device 100 inputs a color multi-valued image, which has precision of 8 bits for each of R, G, and B components per pixel. Reference numeral 101 denotes a frame memory for storing input color multi-valued image data for one frame. Reference numeral 102 denotes a region segmentation unit for segmenting color multi-valued image data into regions. In the first embodiment, one frame is divided into limited color regions and continuous gradation regions. Note that the limited color region is a region including black characters, CGs defined by two colors, three colors, and the like, and the continuous gradation region is a region including a photograph and the like defined by 256 colors or more. The region segmentation unit 102 outputs, as region information associated with the segmented regions, the number, positions, sizes, and attributes of the regions, and also outputs codes matching them. Reference numeral 103 denotes a selector which selects an output destination in accordance with an instruction from a CPU 111. Reference numeral 104 denotes a limited color region coding unit for encoding a limited color region (to be described later) among the regions segmented by the region segmentation unit 102. In the following description, JBIG coding will be exemplified as a coding method for the limited color region for the sake of simplicity. Reference numeral 105 denotes a code length designation unit at which the user (not shown) inputs a desired code length (target code length).

Reference numeral 107 denotes a continuous gradation region coding unit for encoding a continuous gradation region (to be described later) among the regions segmented by the region segmentation unit 102. In the following description, JPEG coding will be exemplified as a coding method for the continuous gradation region for the sake of simplicity. Note that the feature of the present invention is premised on that the limited color region coding unit 104 and the continuous gradation region coding unit 107 use different coding algorithms. Reference numeral 106 denotes a quantization coefficient determination unit for determining a quantization coefficient used in JPEG coding of the continuous gradation region coding unit 107. Reference numeral 108 denotes a code buffer for storing codes obtained by the continuous gradation region coding unit 107. Reference numeral 109 denotes a selector which selects an output destination in accordance with an instruction from the CPU 111. Reference numeral 110 denotes a transmission unit for outputting the generated codes to a communication network such as the Internet, LAN, and storage medium. Alternatively, the apparatus shown in FIG. 1 may be a portable terminal, and in such case, the transmission unit 110 outputs a radio wave signal to a base station. Reference numeral 111 denotes a CPU which controls these elements via control lines (not shown). Reference numeral 112 denotes a program memory which stores programs required for controlling the image processing apparatus. Reference numeral 113 denotes a memory on which a memory area required for running each program stored in the program memory 112 is assured.

The details and operations of the individual elements of the image processing apparatus of the first embodiment will be described in turn below.

Prior to the processing, the CPU 111 clears the contents of the frame memory 101 to zero.

Subsequently, the user (not shown) inputs a target code length $L_T$ from the code length designation unit 105. Furthermore, the image input device 100 reads a color multi-valued image in accordance with the user's instruction, and stores it in the frame memory 101.

After color multi-valued image data for one frame is stored in the frame memory 101, the CPU 111 reads out the color multi-valued image data from the frame memory 101, and supplies it to the region segmentation unit 102.

The detailed arrangement of the region segmentation unit 102 will be described below with reference to FIG. 2.

Figure 2:
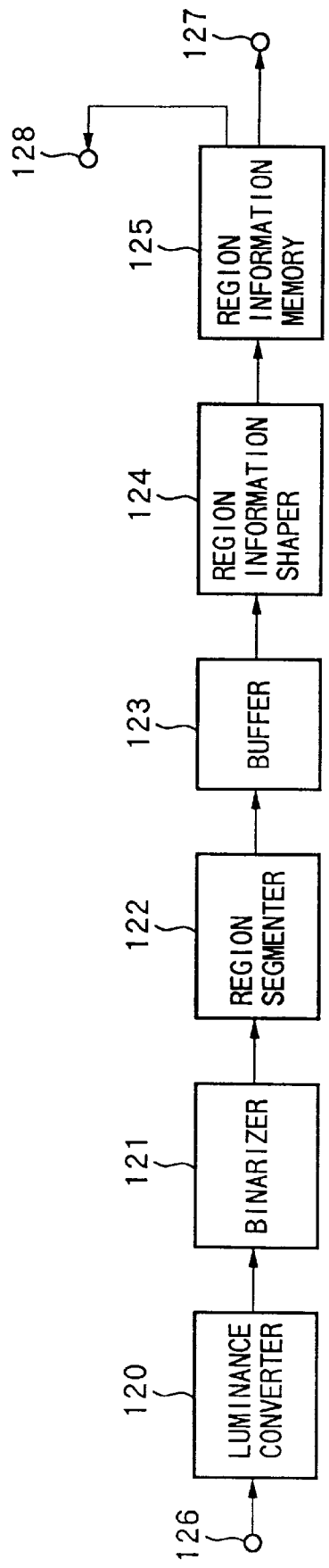
FIG. 2 is a detailed block diagram showing the arrangement of a region segmentation unit according to the first embodiment of the present invention.

FIG. 2 is a detailed block diagram showing the arrangement of the region segmentation unit according to the first embodiment of the present invention.

In FIG. 2, reference numeral 120 denotes a luminance converter which generates luminance image data on the basis of the input color multi-valued image data. Reference numeral 121 denotes a binarizer for binarizing the generated luminance image data by comparing it with a threshold value. Reference numeral 122 denotes a region segmenter for breaking up the binary image data into regions. Reference numeral 123 denotes a buffer for storing the region segmented results output from the region segmenter 122. Reference numeral 124 denotes a region information shaper which operates to output region information as information associated with a limited color region and then to output region information as information associated with a continuous gradation region with respect to the limited color region and continuous gradation region obtained from the region segmented results. Reference numeral 125 denotes a region information memory for storing the outputs from the region information shaper 124. Reference numeral 126 denotes a terminal for reading the color multi-valued image data from the frame memory 101 in the order of pixel data. Reference numeral 127 denotes a terminal for outputting region information to an external device. Reference numeral 128 denotes a terminal for outputting a control signal used for reading out image information from the frame memory 101 in accordance with the region information.

The operation of the region segmentation unit 102 will be explained below.

Color multi-valued image data input from the frame memory 101 via the terminal 126 is converted by the luminance converter 120 into a Y signal (luminance image data) that represents the luminance of YIQ signals of the NTSC scheme as luminance and color difference signals. If (R, G, B) represent the color values of each pixel data of the input color multi-valued image data, the conversion formula is given by:

$$Y=0.30R+0.59B+0.11G \qquad (1)$$

The converted luminance image data is compared with a threshold value by the binarizer 121, and "0" is output for pixel data with a value larger than the threshold value; "1" is output for pixel data with a value smaller than the threshold value, thereby generating binary image data. Upon completion of generation of the binary image data, the data is segmented into regions by the region segmenter 122.

The region segmenter 122 extracts rectangular regions having similar characteristics from the binary image data, and assigns attributes such as "character", "separator", "line image", "halftone", and the like to the extracted regions. These attributes are the above-mentioned region information. The output region information is stored in the buffer 123. After the buffer 123 stores all the pieces of region information, the CPU 111 enables the region information shaper 124. That is, the region information shaper 124 classifies the regions with the attributes "character", "separator", "line image", "halftone", and the like to "halftone" regions (continuous gradation regions) and regions having other attributes (limited color regions). First, the region information of each limited color region is read out from the buffer 123 and is stored in turn from the start address of the region information memory 125. Upon completion of storage of the region information of the limited color regions, the region information of each continuous gradation region is read out from the buffer 123, and is stored in turn in the region information memory 125 after those of the limited color regions. Note that each frame does not always include an image of one attribute. Hence, one frame may often include a plurality of "halftone" regions.

After all the pieces of region information are stored in the region information memory 125, the CPU 111 enables the transmission unit 110 to execute communication protocols, thus preparing for data transfer. Subsequently, the CPU 111 reads out the region information stored in the region information memory 125 via the terminal 127, and transmits it via the transmission unit 110. The region information is used in read control of the frame memory 101 as needed.

The CPU 111 then selects the limited color region coding unit 104 as the output destination and input source of the selectors 103 and 109. The CPU 111 reads out the region information memory 125 in turn. The CPU 111 reads out the corresponding color multi-valued image data from the frame memory 101 in units of pixels in accordance with the region information, and makes the limited color region coding unit 104 process them.

The detailed arrangement of the limited color region coding unit 104 will be described below with reference to FIG. 3.

Figure 3:
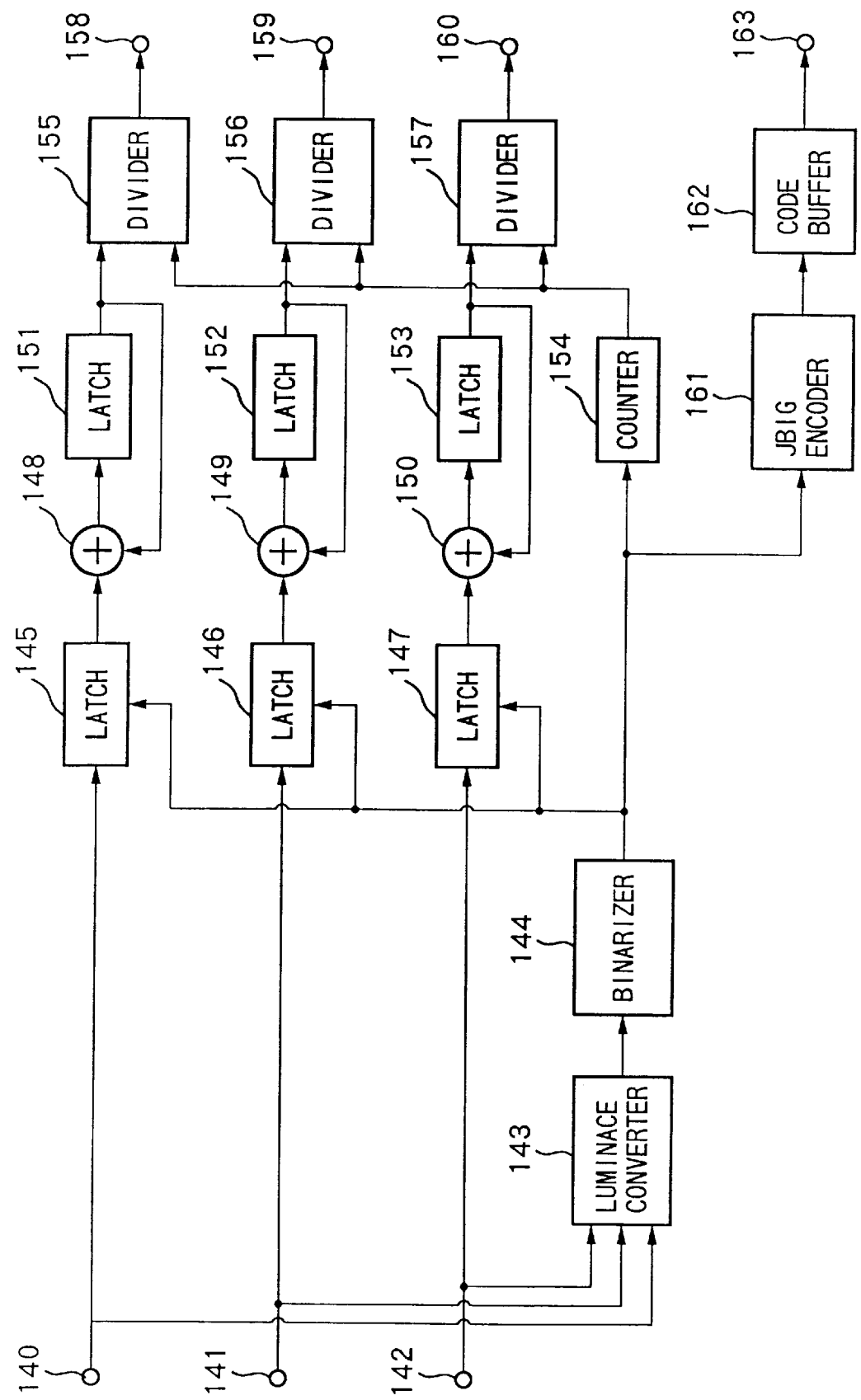
FIG. 3 is a detailed block diagram showing the arrangement of a limited color region coding unit according to the first embodiment of the present invention.

FIG. 3 is a detailed block diagram showing the arrangement of the limited color region coding unit according to the first embodiment of the present invention.

Referring to FIG. 3, reference numerals 140, 141, and 142 denote terminals, which respectively read pixel data of the color multi-valued image data in each limited color region from the frame memory 101 in accordance with pixel clocks. The terminal 140 reads red (R) pixel data, the terminal 141 green (G) pixel data, and the terminal 142 blue (B) pixel data. Reference numeral 143 denotes a luminance converter having the same function as that of the luminance converter 120 shown in FIG. 2. Reference numeral 144 denotes a binarizer having the same function as that of the binarizer 121 shown in FIG. 2. Reference numerals 145, 146, and 147 denote latches. The latch 145 latches R pixel data, the latch 146 G pixel data, and the latch 147 B pixel data. The latches 145, 146, and 147 output pixel data only when the output from the binarizer 144 is "1".

Reference numerals 148, 149, and 150 denote adders, each of which adds two input values, and outputs the sum. Reference numerals 151, 152, and 153 denote latches for latching the output values from the adders 148, 149, and 150. Reference numeral 154 denotes a counter for counting the output from the binarizer 144. Reference numerals 155, 156, and 157 denote dividers, each of which divides the input value by the value of the counter 154. Reference numerals 158, 159, and 160 denote terminals for respectively outputting the quotients output from the dividers 155, 156, and 157. Reference numeral 161 denotes a JBIG encoder for encoding the output from the binarizer 144 by JBIG coding. Reference numeral 162 denotes a code buffer for storing a code output from the JBIG encoder 161. Reference numeral 163 denotes a terminal for outputting the contents of the code buffer 162.

The operation of the limited color region coding unit 104 will be described below.

Prior to the processing in units of limited color regions, the CPU 111 resets the contents of the latches 145 to 147, latches 151 to 153, and counter 154 to zero. At the same time, the CPU 111 resets the JBIG encoder 161 and code buffer 162 to their initial states.

Subsequently, coding is done in units of limited color regions. Pixel data of color multi-valued image data of each limited color region input from the terminals 140, 141, and 142 in accordance with pixel clocks are respectively stored in the latches 145, 146, and 147 corresponding to the individual colors. At the same time, the pixel data are also input to the luminance converter 143, and are converted into luminance image data in accordance with equation (1) above. The obtained luminance image data is binarized by the binarizer 144. If this binary image data is "1", the pixel data in the latches 145, 146, and 147 are respectively input to the adders 148, 149, and 150, and are added to the contents of the latches 151, 152, and 153. The sums are stored in the latches 151, 152, and 153. The binary image data is input to the counter 154, and if the binary image data is "1", the contents of the counter 154 are incremented by "1". Furthermore, the binary image data is encoded by the JBIG encoder 161, and the encoded result is stored in the code buffer 162.

Upon completion of binarization by the binarizer 144, additions by the adders 148, 149, and 150, counting by the counter 154, and JBIG coding by the JBIG encoder 161 for all the pixel data of the limited color region to be processed, the CPU 111 divides the contents of the latches 151, 152, and 153 by the contents of the counter 154 using the dividers 155, 156, and 157. The CPU 111 then outputs the obtained quotients via the terminals 158, 159, and 160. These outputs are information representing the colors of characters and line images represented by one limited color region, and are input to the quantization coefficient determination unit 106. These outputs are also transmitted from the transmission unit 110 via the selector 109. Subsequently, the contents of the code buffer 162 are output from the terminal 163 and are input to the quantization coefficient determination unit 106. The contents are also transmitted from the transmission unit 110 via the selector 109. Upon completion of transmission of all the contents of the code buffer 162, the CPU 111 similarly processes the next limited color region. The CPU 111 repeats the above-mentioned processing for all the limited color regions.

The detailed arrangement of the quantization coefficient determination unit 106 will be described below with reference to FIG. 4.

Figure 4:
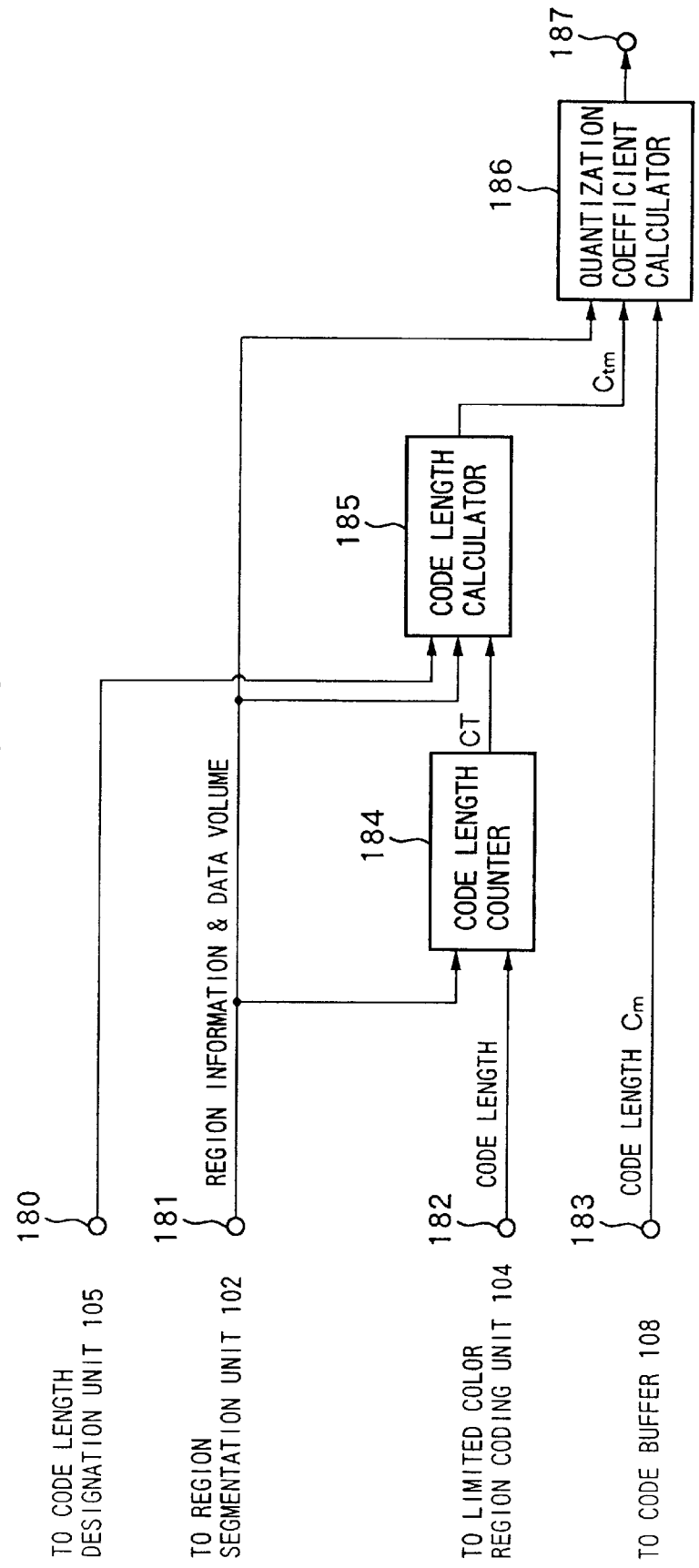
FIG. 4 is a detailed block diagram showing the arrangement of a quantization coefficient determination unit according to the first embodiment of the present invention.

FIG. 4 is a detailed block diagram showing the arrangement of the quantization coefficient determination unit according to the first embodiment of the present invention.

Referring to FIG. 4, reference numeral 180 denotes a terminal for receiving a target code length $L_T$ from the code length designation unit 105. Reference numeral 181 denotes a terminal for receiving region information and the data volume required for transmitting the region information from the region information memory 125. Reference numeral 182 denotes a terminal for receiving the code length of the code stored in the code buffer 162 of the limited color region coding unit 104, and those of codes representing the representative colors of the limited color region output from the terminals 158, 159, and 160. Reference numeral 183 denotes a terminal for receiving the code length of the code stored in the code buffer 108. Reference numeral 184 denotes a code length counter for counting the total code length of the transmitted codes. Note that the code length counter 184 is reset to "0" in accordance with an instruction from the CPU 111 before the beginning of all the processing operations. Reference numeral 185 denotes a code length calculator for calculating the code length (continuous gradation region target code length) assigned to each continuous gradation region. Reference numeral 186 denotes a quantization coefficient calculator for calculating the quantization coefficient suited to the continuous gradation region target code length. Reference numeral 187 denotes a terminal for outputting the quantization coefficient calculated by the quantization coefficient calculator 186 to the continuous gradation region coding unit 107.

The operation of the quantization coefficient determination unit 106 will be described below.

Let $C_T$ be the contents of the code length counter 184. Upon transmission of the region information stored in the region information memory 125 via the transmission unit 110, the transmitted data volume is input via the terminal 181, and is added to the contents $C_T$ of the code length counter 184. Subsequently, in units of limited color regions, the code length of the code stored in the code buffer 162 and the code length of the codes representing the representative colors of the limited color region output from the terminals 158, 159, and 160 are received via the terminal 182, and are added to the contents $C_T$ of the code length counter 184.

Upon completion of JBIG coding of all the limited color regions and transmission of the code lengths of codes obtained as a result of coding, the CPU 111 operates the code length calculator 185. The code length calculator 185 initially reads out the region information stored in the region information memory 125, and calculates the total number P of pixel data included in all the continuous gradation regions on the basis of the sizes in the readout region information of the continuous gradation regions. Then, the calculator 185 calculates a code length $BR_T$ per pixel data of the continuous gradation region from the target code length $L_T$ and the contents $C_T$ of the code length counter 184 using:

$$BR_T = (L_T - C_T)/P \tag{2}$$

After the code length $BR_T$ per pixel data is obtained, the CPU 111 selects the continuous gradation region coding unit 107 and the code buffer 108 as the output destination and input source of the selectors 103 and 109. Subsequently, the CPU 111 sequentially reads out the region information stored in the region information memory 125. The CPU 111 then reads out the corresponding color multi-valued image data from the frame memory 101 in units of pixels in accordance with the readout region information, and instructs the continuous gradation region coding unit 107 to encode them by JPEG coding.

After that, coding is done in units of continuous gradation regions. Prior to JPEG coding of each continuous gradation region, the CPU 111 initializes the continuous gradation region coding unit 107 and code buffer 108. Also, the CPU 111 sets a default value as a scale coefficient Q of the quantization coefficient calculator 186. The CPU 111 then multiplies a basic quantization matrix by the scale coefficient Q to determine quantization coefficients. The determined quantization coefficients are input to the continuous gradation region coding unit 107 via the terminal 187. At the same time, the image size (x, y) of the region to be processed is read, and a code length $C_{tm}$ to be assigned to the region to be processed is calculated by:

$$C_{tm} = BR_T \times x \times y \qquad (3)$$

Subsequently, the CPU 111 reads out the pixel data value included in the continuous gradation region from the frame memory 101, and JPEG-encodes it by the continuous gradation region coding unit 107 on the basis of the input quantization coefficients. The encoded result is stored in the code buffer 108. Upon completion of JPEG coding of all the pixel data in the continuous gradation region, the CPU 111 inputs a code length $C_m$ of the code stored in the code buffer 108 to the quantization coefficient calculator 186 via the terminal 183.

As a result, if the code length $C_m$ is smaller than the code length $C_{tm}$, the quantization coefficient calculator 186 decrements the scale coefficient Q by "1", and multiplies the basic quantization matrix by the scale coefficient Q to determine the quantization coefficients. The calculator 186 inputs the determined quantization coefficients to the continuous gradation region coding unit 107 again. Furthermore, the CPU 111 clears the code buffer 108. The CPU 111 reads pixel data value included in the continuous gradation region from the frame memory 101, and JPEG-encodes it by the continuous gradation region coding unit 107 again. JPEG coding is repeated by decrementing the scale coefficient Q by "1" until the code length $C_m$ becomes larger than the code length $C_{tm}$. When the code length $C_m$ has become larger than the code length $C_{tm}$, the CPU 111 increments the scale coefficient Q by "1", reads the pixel data value included in the continuous gradation region from the frame memory 101, and JPEG-encodes it by the continuous gradation region coding unit 107. The CPU 111 stores the code in the code buffer 108 and transmits it from the transmission unit 110 via the selector 109.

On the other hand, if the code length $C_m$ is larger than the code length $C_{tm}$, the quantization coefficient calculator 186 increments the scale coefficient Q by "1", multiplies the basic quantization matrix by it to determine the quantization coefficients, and inputs these coefficients to the continuous gradation region coding unit 107 again. Furthermore, the CPU 111 clears the code buffer 108. The CPU 111 reads the pixel data value included in the continuous gradation region from the frame memory 101, and JPEG-encodes it by the continuous gradation region coding unit 107. JPEG coding is repeated by incrementing the scale coefficient Q by "1" until the code length $C_m$ becomes smaller than the code length $C_{tm}$. When the code length $C_m$ has become smaller than the code length $C_{tm}$, the CPU 111 transmits the contents of the buffer 108 from the transmission unit 110 via the selector 109.

Upon completion of JPEG coding for all the continuous gradation regions and transmission of the obtained codes, the CPU 111 ends all the operations. The above processing can suppress the encoded data length within $L_T$.

Figure 5:
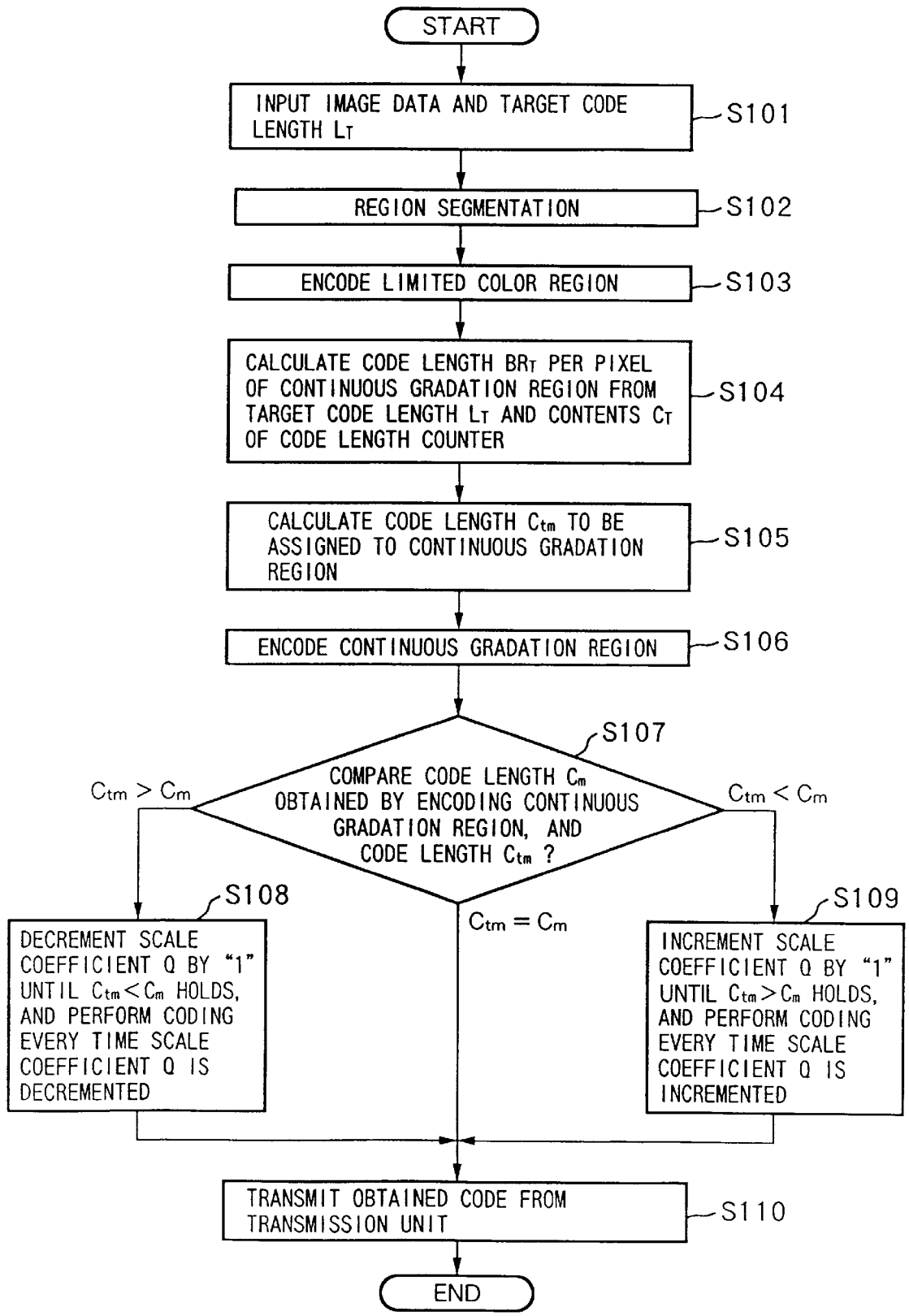
FIG. 5 is a flow chart showing the flow of processing executed in the first embodiment of the present invention.

The outline of the processing executed in the first embodiment will be described below with reference to FIG. 5. FIG. 5 is a flow chart showing the flow of processing executed in the first embodiment of the present invention.

The image input device 100 reads a color multi-valued image, and stores the read color multi-valued image data in the frame memory 101. Also, a desired target code length $L_T$ is input at the code length designation unit 105 (step S101). The color multi-valued image data stored in the frame memory 101 is read out, and is segmented into regions by the region segmentation unit 102 (step S102). Of the segmented regions, limited color regions are JBIG-encoded by the limited color region coding unit 104. The JBIG-encoded codes are transmitted from the transmission unit 110 via the selector 109 (step S103). The quantization coefficient determination unit 106 calculates the code length $BR_T$ per pixel data of the continuous gradation region on the basis of the code length $C_T$ obtained from the code length counter 184 and the target code length $L_T$ (step S104).

Then, the code length $C_{tm}$ to be assigned to each continuous gradation region is calculated (step S105). The continuous gradation region coding unit 107 JPEG-encodes each continuous gradation region (step S106). The code length $C_m$ obtained by encoding each continuous gradation region is compared with the code length $C_{tm}$ (step S107). If the code length $C_m$ is smaller than the code length $C_{tm}$, JPEG coding is done by decrementing the scale coefficient Q by "1" until the code length $C_m$ becomes larger than the code length $C_{tm}$ (step S108). On the other hand, if the code length $C_m$ is larger than the code length $C_{tm}$, JPEG coding is done by incrementing the scale coefficient Q by "1" until the code length $C_m$ becomes smaller than the code length $C_{tm}$ (step S109). When the code length $C_m$ has become equal to the code length $C_{tm}$, the code at that time is transmitted from the transmission unit 110 via the selector 109 (step S110).

If there are a plurality of continuous gradation regions, steps S101 to S110 are repeated in units of continuous gradation regions. Note that steps S101 to S104 need only be executed once for an image.

In the description of the first embodiment, the image to be input from the image input device 100 is a color multi-valued image. However, the present invention is not limited to such specific type of image, but may be applied to a monochrome multi-valued image. Also, the coding methods of image data are not limited to those described above. Furthermore, the memory arrangements and the like are not limited to specific ones described above, and processing in units of a plurality of lines may be done. In JPEG coding, the scale coefficient Q is changed by "1" to adjust the code length. However, the present invention is not limited to such specific adjustment, and a method of predicting a new scale coefficient Q based on the code length and the scale coefficient Q may be used.

As described above, according to the first embodiment, since each pixel data in the continuous gradation region of the color multi-valued image data is encoded to always have a code length smaller than the code length per pixel of the continuous gradation region calculated by the code length calculator 185, encoded data for one frame with the target code length $L_T$ that the user desired can be finally obtained. Since the arrangement of the quantization coefficient determination unit 106 can be realized by latches and some four-rule arithmetic circuits, the circuit scale can be reduced.

<Second Embodiment>

Figure 6:
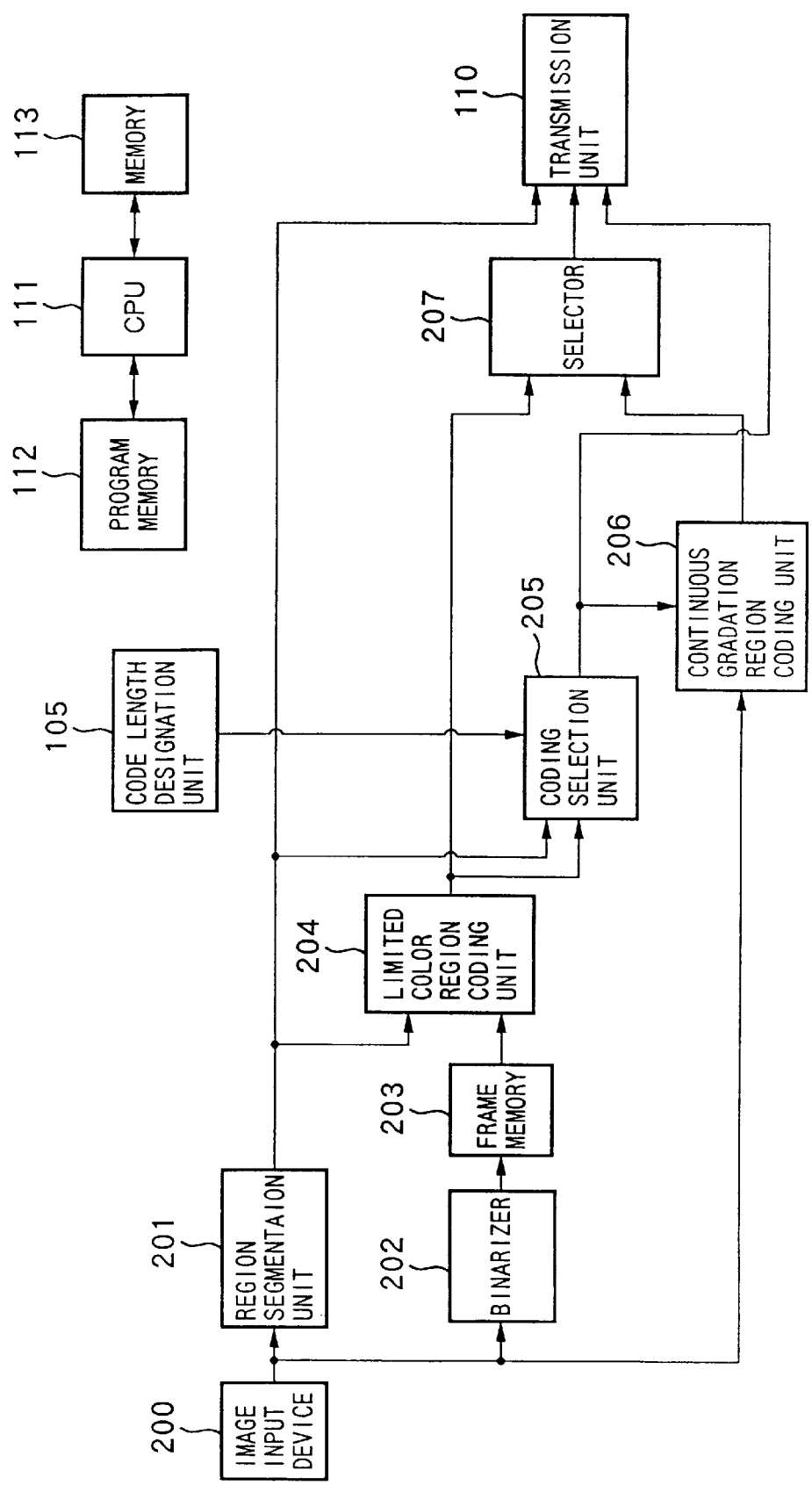
FIG. 6 is a block diagram showing the arrangement of an image processing apparatus according to the second embodiment of the present invention.

FIG. 6 is a block diagram showing the arrangement of an image processing apparatus according to the second embodiment of the present invention.

Since the same reference numerals in FIG. 6 denote parts having the same functions as those in the first embodiment, a detailed description thereof will be omitted. Also, in the following description, assume that the color used in each limited color region is black. Reference numeral 200 denotes an image input device for inputting an image. The image input device 200 comprises, e.g., a scanner. In the following description of this embodiment, assume that the input image is a monochrome multi-valued image and has a precision of 8 bits per pixel. Reference numeral 201 denotes a region segmentation unit. The region segmentation unit 201 is constituted by the region segmenter 122, buffer 123, region information shaper 124, and region information memory 125 shown in FIG. 2 of the first embodiment. The region segmentation unit 201 extracts regions, segments image data into regions, detects attributes representing contents in units of regions, and classifies the segmented regions into region information of limited color regions and region information of continuous gradation regions, and stores the positions, sizes, and attributes of the regions in its internal region information memory 125.

Reference numeral 202 denotes a binarizer which binarizes pixel data of the monochrome multi-valued image data by comparing it with a threshold value. Reference numeral 203 denotes a frame memory for storing binary image data output from the binarizer 202. Reference numeral 204 denotes a limited color region coding unit for encoding each limited color region. In the following description of this embodiment, MMR coding used in a facsimile apparatus and the like will be exemplified as the coding method. Reference numeral 205 denotes a coding selection unit for selecting the coding method of the continuous gradation regions. Reference numeral 206 denotes a continuous gradation region coding unit for encoding the continuous gradation regions. In the following description of this embodiment, vector quantization used in a facsimile apparatus and the like will be exemplified as the coding method. In vector quantization used in the second embodiment, image data is segmented into 4×4 blocks, and orthogonal transformation is done in units of blocks. After individual coefficients are quantized, the coefficients except for the DC component representing their average value are obtained as 15-dimensional vectors, and are compared with vectors stored in a predetermined code book to select the closest ones. On the other hand, the DC component is quantized to M bits, and the quantized DC component and selected vector numbers are output as codes. Furthermore, assume that the DC component is quantized to M=6 bits as the code length per block, and vector quantization can be done selecting one of 10 bits, 9 bits, 8 bits, and 7 bits. Reference numeral 207 denotes a selector which selects its input source depending on the output from the region segmentation unit 201.

The details and operations of the individual elements of the image processing apparatus of the second embodiment will be described in turn below.

Prior to processing, a CPU 111 clears the contents of the frame memory 203 to zero. Furthermore, a monochrome multi-valued image is read from the image input device 200 in accordance with an instruction of the user (not shown). The read monochrome multi-valued image data is broken up into regions by the region segmentation unit 201. Also, the read monochrome multi-valued image data is binarized by the binarizer 202 by comparing it with a threshold value. If the input value is larger than the threshold value, i.e., if it is closer to white, "0" is output; if the input value is smaller than the threshold value, i.e., if it is closer to black, "1" is output. The binarization result is stored in the frame memory 203.

After binary image data for one frame is stored in the frame memory 203, the input monochrome multi-valued image data is input to the region segmenter 122 in the region segmentation unit 201, and the region segmentation results are stored in the buffer 123. The region information shaper 124 classifies the segmentation results into region information of limited color regions and region information of continuous gradation regions, stores the region information of the limited color regions and then region information of the continuous gradation regions from the start address of the region information memory 125.

Upon completion of storage of all the pieces of region information in the region information memory 125, the CPU 111 enables a transmission unit 110 to execute communication protocols, thus preparing for data transfer. Subsequently, the CPU 111 reads out the region information stored in the region information memory 125 in turn via a terminal 127, and transmits it via the transmission unit 110.

The CPU 111 selects the limited color region coding unit 204 as the input source of the selector 207. Subsequently, the CPU 111 sequentially reads out the region information stored in the region information memory 125, also reads out the corresponding binary image data from the frame memory 203 in accordance with the readout region information, and processes them using the limited color region coding unit 204.

The detailed arrangement of the limited color region coding unit 204 will be described below with reference to FIG. 7.

Figure 7:
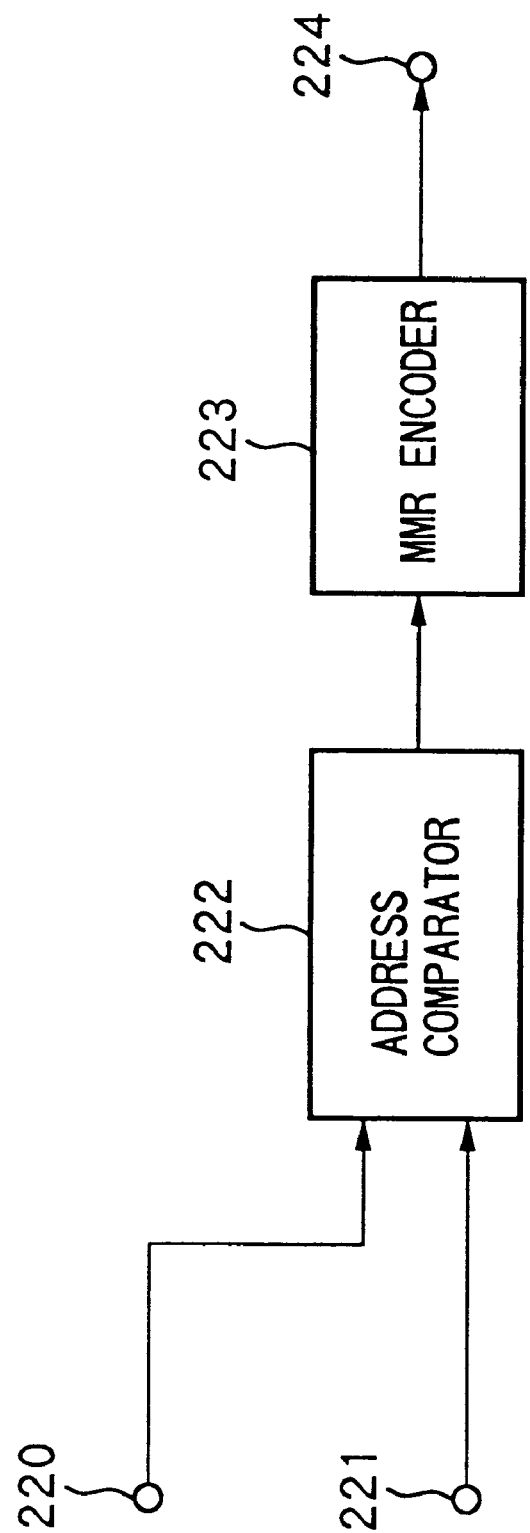
FIG. 7 is a detailed block diagram showing the arrangement of a limited color region coding unit according to the second embodiment of the present invention.

FIG. 7 is a detailed block diagram showing the arrangement of the limited color region coding unit according to the second embodiment of the present invention.

Referring to FIG. 7, reference numeral 220 denotes a terminal for reading the positions and sizes of all the continuous gradation regions from the region information memory 125. Reference numeral 221 denotes a terminal for reading binary image data from the frame memory 203 in units of pixel data in accordance with pixel clocks. Reference numeral 222 denotes an address comparator for determining an output pixel data value by comparing the position of the read pixel data with that of the continuous gradation region. Reference numeral 223 denotes an MMR encoder for encoding input binary image data by MMR coding. Reference numeral 224 denotes a terminal for outputting the obtained code.

The operation of the limited color region coding unit 204 will be described below.

Prior to the processing, the CPU 111 initializes the address comparator 222 and MMR encoder 223. The CPU 111 then inputs the positions and sizes of all the continuous gradation regions from the region information memory 125 to the address comparator 222 via the terminal 220. After that, the CPU 111 sequentially reads out pixel data of the binary image data from the frame memory 203. If the read pixel data falls outside the continuous gradation region, the address comparator 222 directly outputs the input value. By contrast, if the read pixel data is included in the continuous gradation region, the comparator 222 outputs "0". The output from the address comparator 222 is MMR-encoded by the MMR encoder 223, and is input to the transmission unit 110 via the coding selection unit 205 and the selector 207. The transmission unit 110 transmits the obtained code.

The detailed arrangement of the coding selection unit 205 will be explained below with reference to FIG. 8

Figure 8:
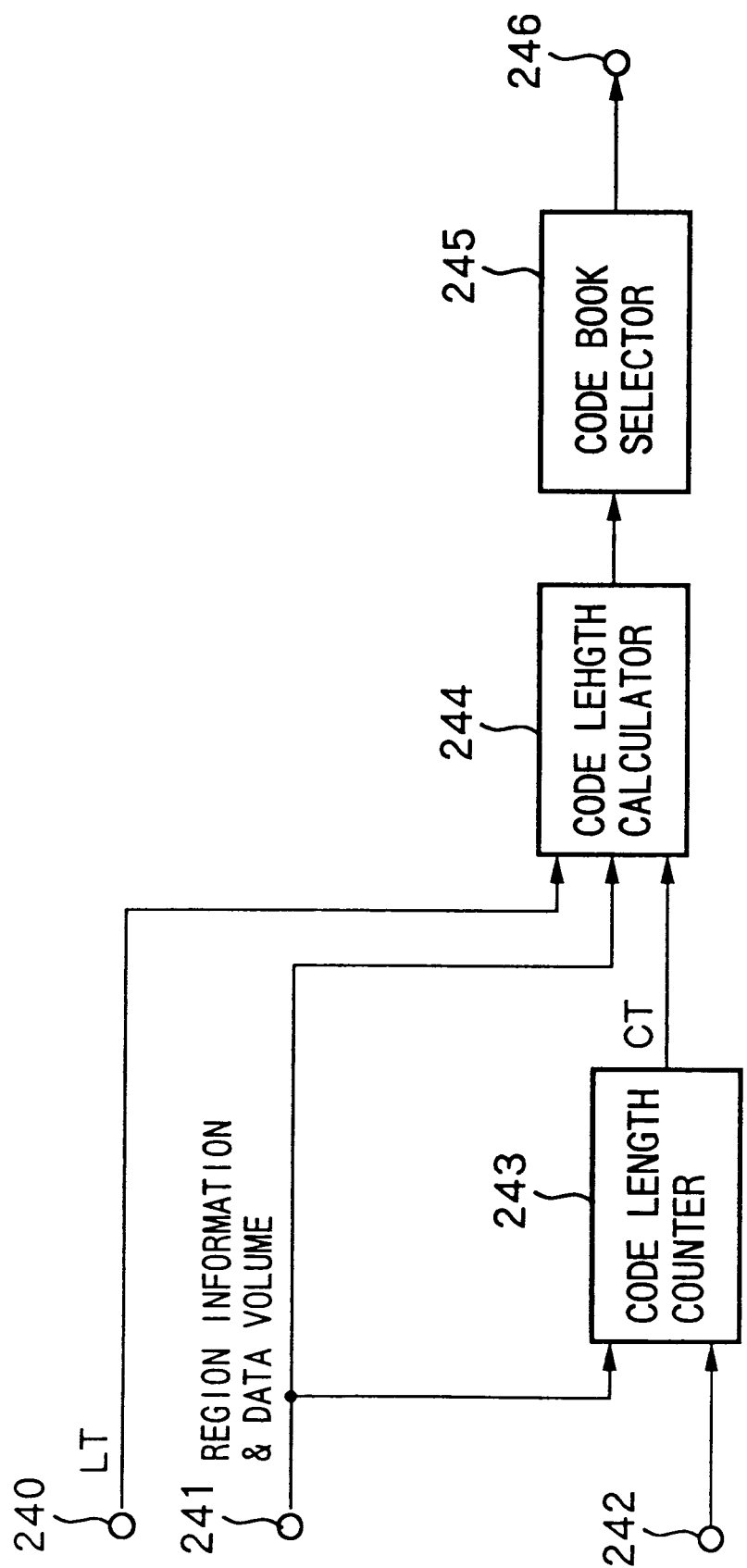
FIG. 8 is a detailed block diagram showing the arrangement of a coding selection unit according to the second embodiment of the present invention.

FIG. 8 is a detailed block diagram showing the arrangement of the coding selection unit according to the second embodiment of the present invention.

Referring to FIG. 8, reference numeral 240 denotes a terminal for receiving a target code length $L_T$ from the code length designation unit 105. Reference numeral 241 denotes a terminal for receiving region information and the transmitted data volume from the region information memory 125 in the region segmentation unit 201. Reference numeral 242 denotes a terminal for receiving a code output from the limited color region coding unit 204. Reference numeral 243 denotes a code length counter for counting the total code length of the transmitted codes. Let $C_T$ be the contents of the code length counter 243. Reference numeral 244 denotes a code length calculator for calculating a continuous gradation region target code length. Reference numeral 245 denotes a code book selector for generating a code book selection code used for switching to a code book for vector coding suited to the continuous gradation region target code length. Reference numeral 246 denotes a terminal for outputting the code book selection code generated by the code book selector 245 to the continuous gradation region coding unit 206 and transmission unit 110.

The operation of the coding selection unit 205 will be described below.

Upon transmitting the region information stored in the region information memory 125 via the transmission unit 110, the CPU 111 inputs the transmitted data volume to the code length counter 243 via the terminal 241. The code length counter 243 counts that data volume and stores the counted value as $C_T$. The counter 243 counts the code length of codes obtained via the terminal 242 after MMR coding, and adds it to $C_T$. Furthermore, the counter 243 adds the code length required for the code book selection code to $C_T$.

After the code length required for the code book selection code is added to $C_T$, the CPU 111 enables the code length calculator 244. The code length calculator 244 initially reads out the region information stored in the region information memory 125, calculates the number of blocks included in each continuous gradation region on the basis of the size of the readout region information of each continuous gradation region, and then obtains a sum total $B_T$ of the numbers of blocks. The CPU 111 calculates a code length $BR_T$ per block of the continuous gradation region from the target code length $L_T$ input from the terminal 240 and the contents $C_T$ of the code length counter 243 by:

$$BR_T=(L_T-C_T)/B_T \quad (4)$$

The code book selector 245 generates a code book selection code on the basis of the calculated code length $BR_T$ per block, and outputs it from the terminal 246. Determination of the code book selection code will be explained later.

After the code book selection code is determined, the CPU 111 transmits that code book selection code via the transmission unit 110. The CPU 111 switches the input source of the selector 207 to the continuous gradation region coding unit 206. After that, the CPU 111 operates the image input device 200 again to read a monochrome multi-valued image. The read monochrome multi-valued image data is input to the continuous gradation region coding unit 206.

The detailed arrangement of the continuous gradation coding unit 206 will be described below with reference to FIG. 9.

Figure 9:
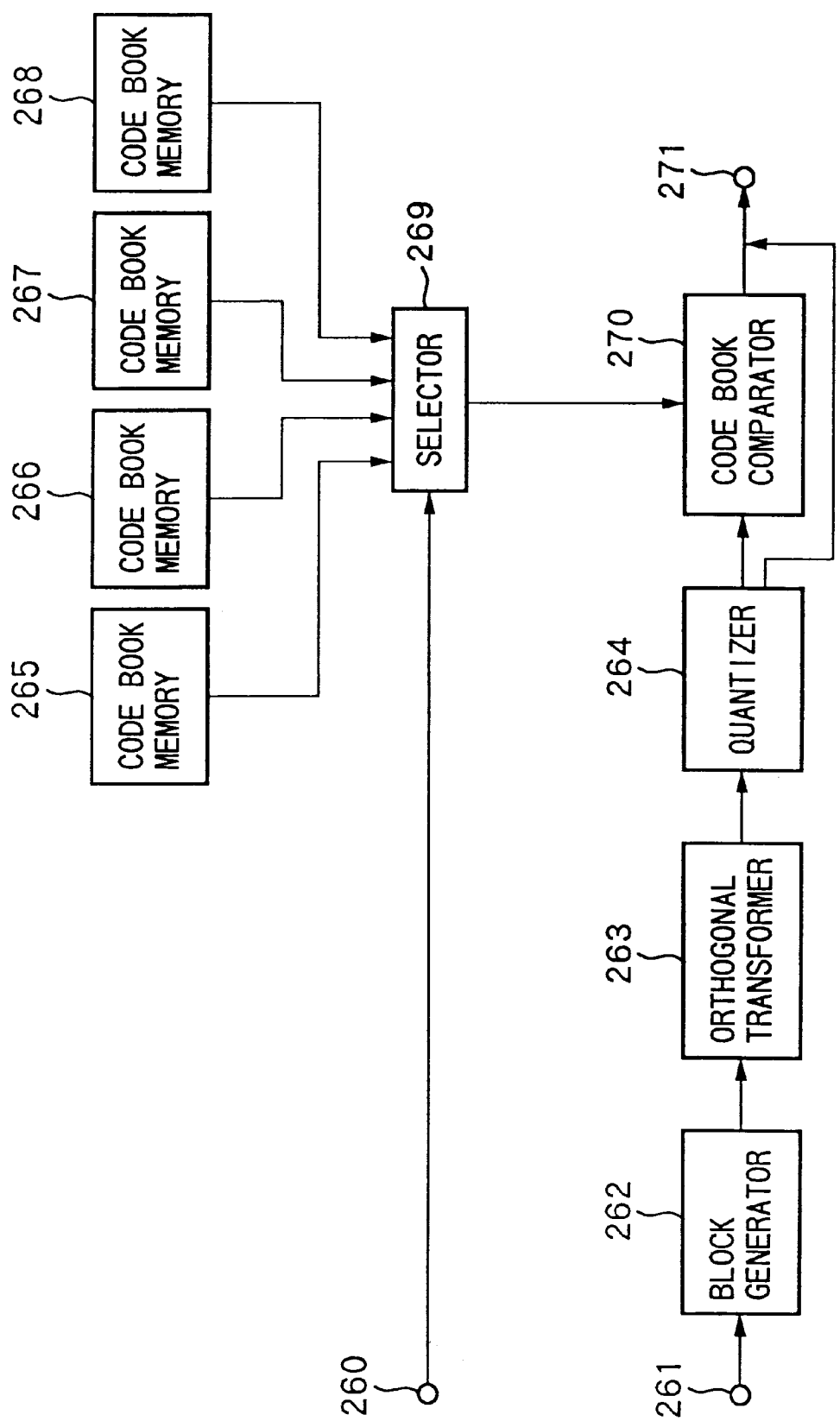
FIG. 9 is a detailed block diagram showing the arrangement of a continuous region coding unit according to the second embodiment of the present invention.

FIG. 9 is a detailed block diagram showing the arrangement of the continuous gradation region coding unit according to the second embodiment of the present invention.

Referring to FIG. 9, reference numeral 260 denotes a terminal for receiving the code book selection code via the terminal 246 shown in FIG. 8. Reference numeral 261 denotes a terminal for receiving monochrome multi-valued image data. Reference numeral 262 denotes a block generator for generating 4×4 blocks in turn from the monochrome multi-valued image data. Reference numeral 263 denotes an orthogonal transformer for performing Hadamard transformation as orthogonal transformation for the 4×4 blocks. Reference numeral 264 denotes a quantizer for quantizing the respective orthogonal transformation coefficients obtained by the orthogonal transformer 263. Reference numerals 265, 266, 267, and 268 denote code book memories. The code book memory 265 stores 1,024 (10 bits) vectors. The code book memory 266 stores 512 (9 bits) vectors. The code book memory 267 stores 256 (8 bits) vectors. The code book memory 268 stores 128 (7 bits) vectors.

Note that the code book is normally determined using the LBG algorithm. An initial value of a desired number N of vectors is given to extract vectors close to the initial value from a population, thus extracting N groups of vectors. The center of gravity of each group is obtained, and N groups of vectors are obtained again from the population using the centers of gravity as initial values. The calculations of the centers of gravity and extractions of N groups of vectors are repeated, and when the average values of the distances between the initial value and the centers of gravity becomes equal to or smaller than a threshold value, vectors representing the centers of gravity are desired ones. With this process, code books containing different numbers of vectors can be generated from a single population.

Reference numeral 269 denotes a selector for selecting an input in accordance with the code book selection code. Reference numeral 270 denotes a code book comparator for generating a vector from each quantization result input from the quantizer 264, selecting a vector which has highest similarity to the generated vector from those in the code book input from the selector 269, and outputting the number of the selected vector as a code. Reference numeral 271 denotes a terminal for outputting the comparison result of the code book comparator 270.

The operation of the continuous gradation region coding unit 206 will be described below.

The image input device 200 operates to read monochrome multi-valued image data. When pixel data of the read monochrome multi-valued image data is included in a continuous gradation region, that pixel data is input to the continuous gradation region coding unit 206. The pixel data input to the continuous gradation region coding unit 206 is input to the block generator 262. The block generator 262 generates 4×4 blocks in units of neighboring pixels on an image on the basis of the monochrome multi-valued image data. The generated 4×4 blocks are input in turn to the orthogonal transformer 263 and are subjected to Hadamard transformation to obtain 4×4 orthogonal transformation coefficients.

The code book selector 245 shown in FIG. 8 calculates ($BR_T$–M) from the code length $BR_T$ per block and M. If ($BR_T$–M)<7, the selector 245 re-defines M as:

$$M=BR_T-7 \quad (5)$$

and it sets a code book selection code at "3". A code indicating that the M has been re-defined and the value M are transmitted as codes from the transmission unit 110 via the selector 207. The code book selector 245 sets the code book selection code at "0" if $10 \leq (BR_T-M)$. The code book selector 245 sets the code book selection code at "1" if $9 \leq (BR_T-M) < 10$. The code book selector 245 sets the code book selection code at "2" if $8 \leq (BR_T-M) < 9$. Furthermore, the code book selector 245 sets the code book selection code at "3" if $(BR_T-M) < 8$.

The selector 269 selects the code book memory 265 if the code book selection code input from the terminal 260 is "0"; the code book memory 266 if it is "1"; the code book memory 267 if it is "2"; or the code book memory 268 if it is "3", and inputs the contents of the selected code book memory to the code book comparator 270.

The 16 transformation coefficients obtained by the orthogonal transformer 263 are respectively quantized by the quantizer 264. Of the obtained 16 quantization results, upper M bits are selected as a DC component, and are output as a code from the terminal 271. The 15 remaining quantization results are input to the code book comparator 270. The code book comparator 270 generates vectors from the input 15 quantization results, selects vectors which have highest similarities to the generated vectors from those in the code book input from the selector 269, and outputs the numbers of the selected vectors as codes from the terminal 271.

Upon completion of reading of monochrome multi-valued image data at the image input device 200, coding of all the pixel data of monochrome multi-valued image data, and transmission of codes, all the operations end.

Figure 10:
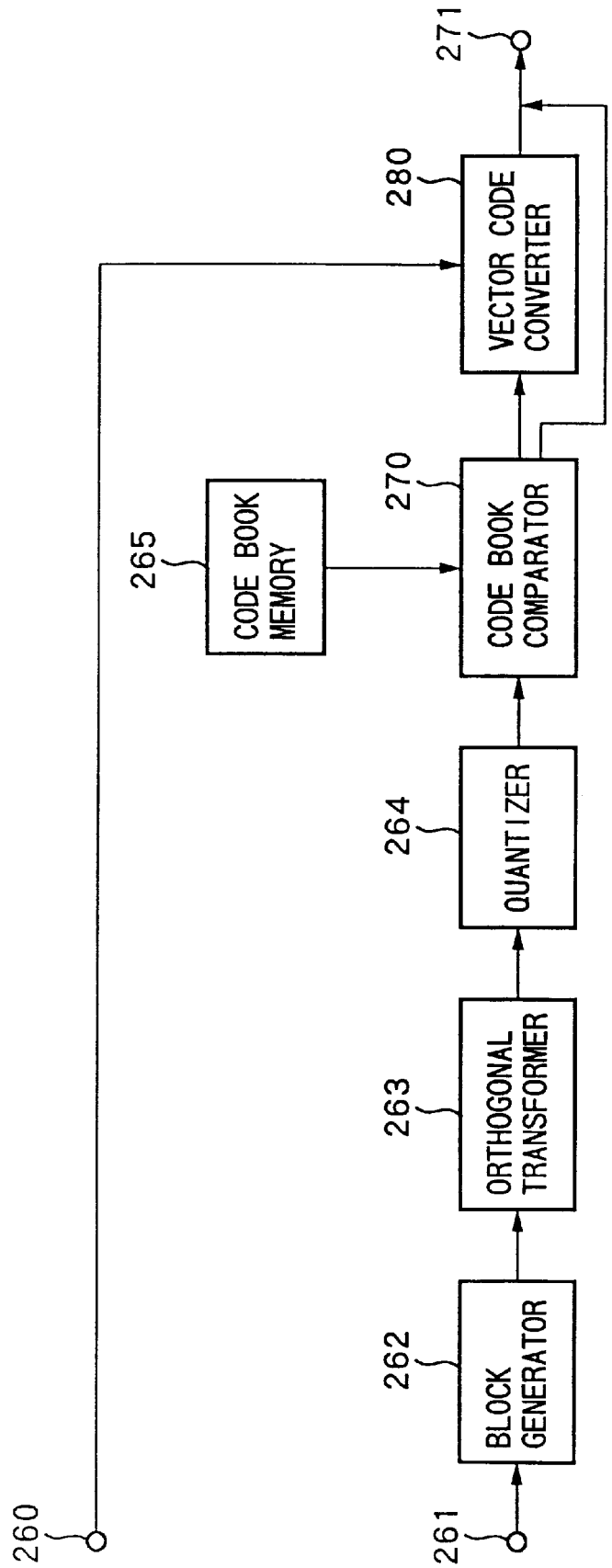
FIG. 10 is a detailed block diagram showing another arrangement of the continuous region coding unit according to the second embodiment of the present invention.

In the second embodiment, the continuous gradation region coding unit 206 shown in FIG. 6 has the arrangement shown in FIG. 9, but may have an arrangement shown in FIG. 10. The same reference numerals in FIG. 10 denote parts having the same functions as those in FIG. 9, and a detailed description thereof will be omitted. In this arrangement, reference numeral 280 denotes a vector code converter for degenerating the code of each vector quantization result input from the code book comparator 270 into a desired code length.

The code book memory 265 has 1,024 vectors, and the code book comparator 270 receives 15 quantization results form the quantizer 264, compares them with the vectors in the code book, and generates 10-bit codes. The vector code converter 280 prepares in advance a correspondence table between the 1,024 vectors in the code book memory 265 and the closest ones of 512 vectors in the code book memory 266. Likewise, similar corresponding tables for the 256 vectors in the code book memory 267 and the 128 vectors in the code book memory 268 are prepared in advance. If the code book selection code input from the terminal 260 is "0", the vector code converter 280 directly outputs an input code. If the code book selection code is "1", the vector code converter 280 converts an input code into a 9-bit code in accordance with the correspondence table between the 1,024 vectors and 512 vectors in the code book memory 266, and outputs the converted code. If the code book selection code is "2", the converter 280 uses the correspondence table associated with the 256 vectors in the code book memory 267; if it is "3", the converter 280 uses the correspondence table associated with the 128 vectors in the code book memory 268. With this arrangement, the apparatus need not have a plurality of ode book memories, and can be realized by a small memory capacity.

The outline of the processing executed in the second embodiment will be described below with reference to FIG. 11.

Figure 11:
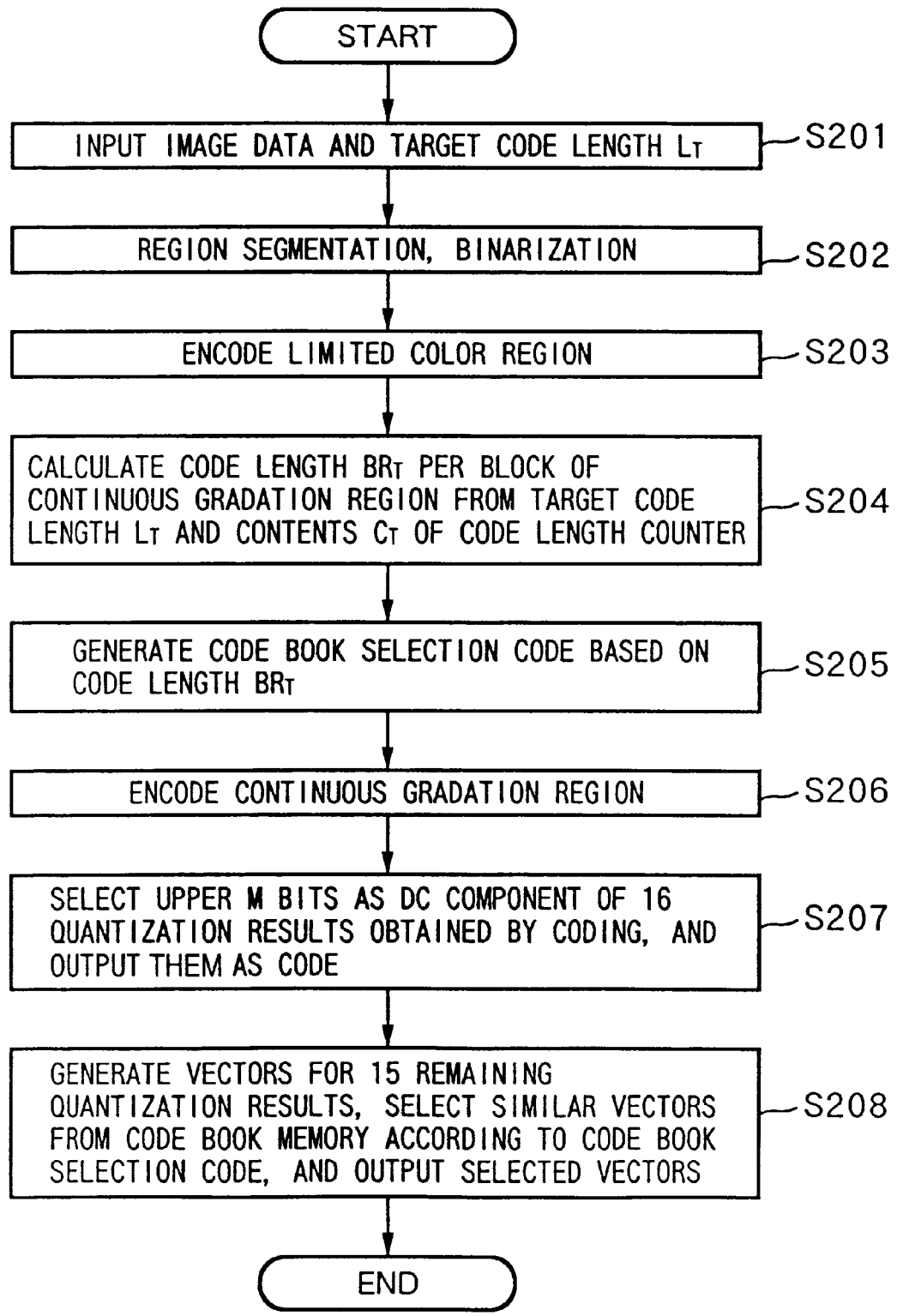
FIG. 11 is a flow chart showing the flow of processing executed in the second embodiment of the present invention.

FIG. 11 is a flow chart showing the flow of the processing executed in the second embodiment of the present invention.

The image input device 200 reads a monochrome image. A desired target code length $L_T$ is input at the code length designation unit 105 (step S201). The region segmentation unit 201 segments the input monochrome multi-valued image data into regions. The binarizer 202 binarizes the monochrome multi-valued image data, and stores the binarization result in the frame memory 203 (step S202). Of the segmented regions, binary image data corresponding to the limited color regions and stored in the frame memory 203 are MMR-encoded by the limited color region coding unit 204. The NMR-encoded codes are transmitted from the transmission unit 110 via the selector 207 (step S203). The coding selection unit 205 calculates the code length $BR_T$ per pixel of the continuous gradation region on the basis of the code length $C_T$ obtained from the code length counter 243 and the target code length $L_T$ (step S204). The code book selector 245 calculates the code book selection code on the basis of the code length $BR_T$ (step S205).

The continuous gradation region coding unit 206 vector-encodes the continuous gradation regions (step S206). Of the 16 quantization results obtained by vector coding, upper M bits are selected as a DC component, and are output as a code from the transmission unit 110 via the selector 207 (step S207). As for the 15 remaining quantization results, vectors are respectively generated, vectors similar to the generated ones are selected from the code book memory according to the code book selection code, and the selected vectors are transmitted as codes from the transmission unit 110 via the selector 207 (step S208).

In the above description of the second embodiment, the image input from the image input device 200 is assumed to be a monochrome multi-valued image. However, the present invention is not limited to such specific type of image, but may be applied to a color multi-valued image. Also, the coding methods of image data are not limited to those described above. Furthermore, the memory arrangements and the like are not limited to specific ones described above, and processing in units of a plurality of lines may be done.

As described above, according to the second embodiment, since coding of monochrome multi-valued image data is one by adjusting the code length in each continuous radation region, a code with a code length that the user desired can be obtained.

<Third Embodiment>

Figure 12:
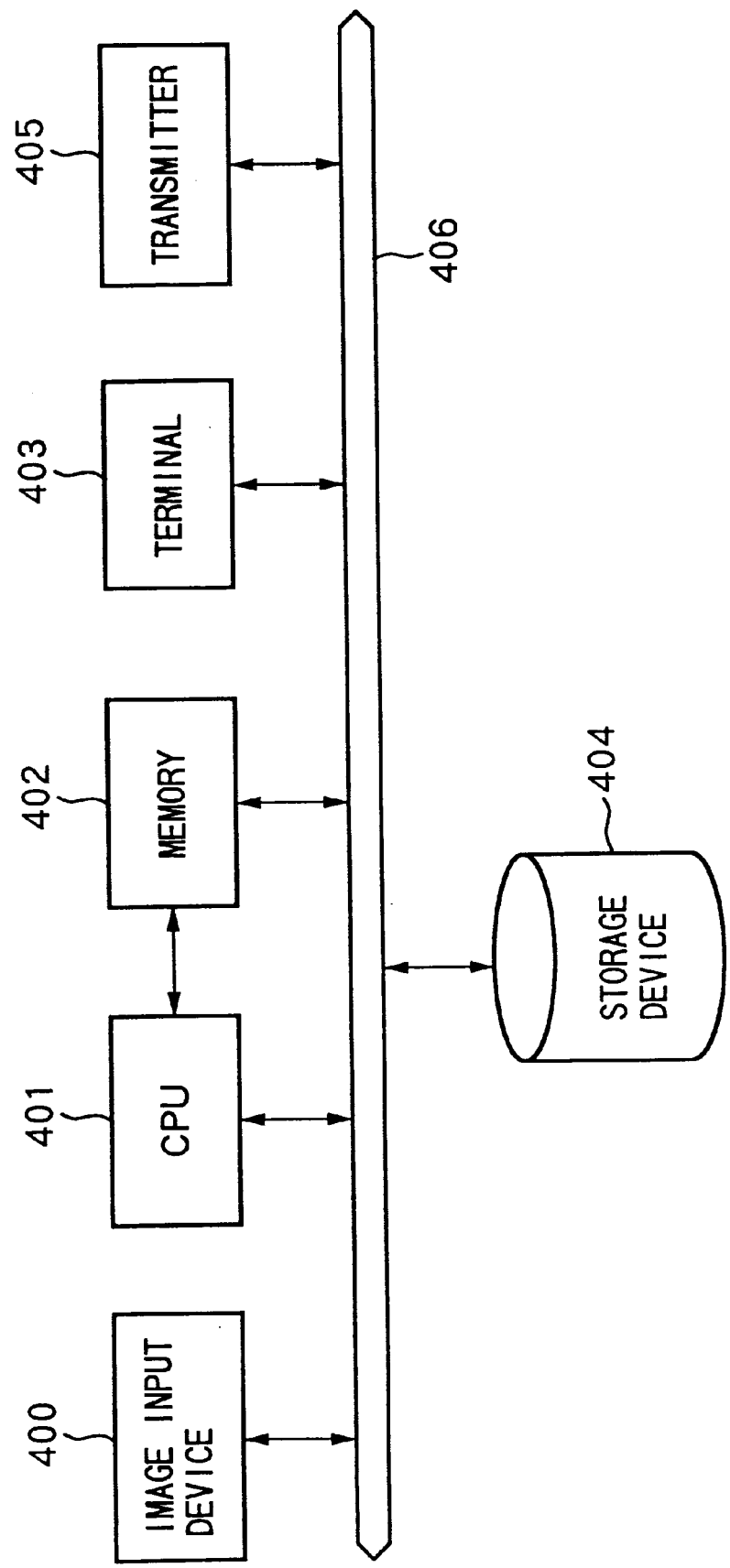
FIG. 12 is a block diagram showing the arrangement of an image processing apparatus according to the third embodiment of the present invention.
Figure 13:
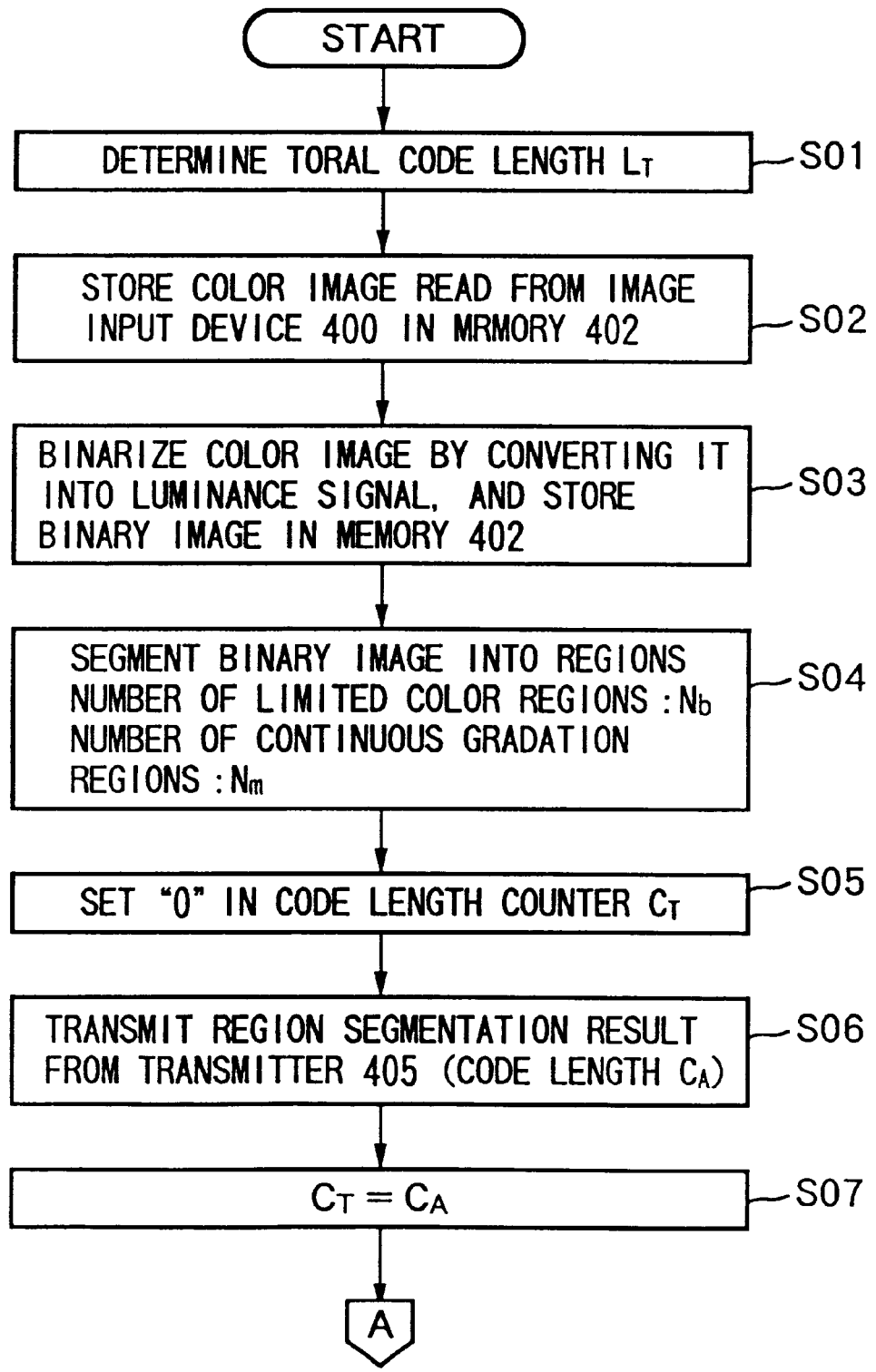
FIG. 13 is a flow chart showing the flow of processing executed in the third embodiment of the present invention.
Figure 14:
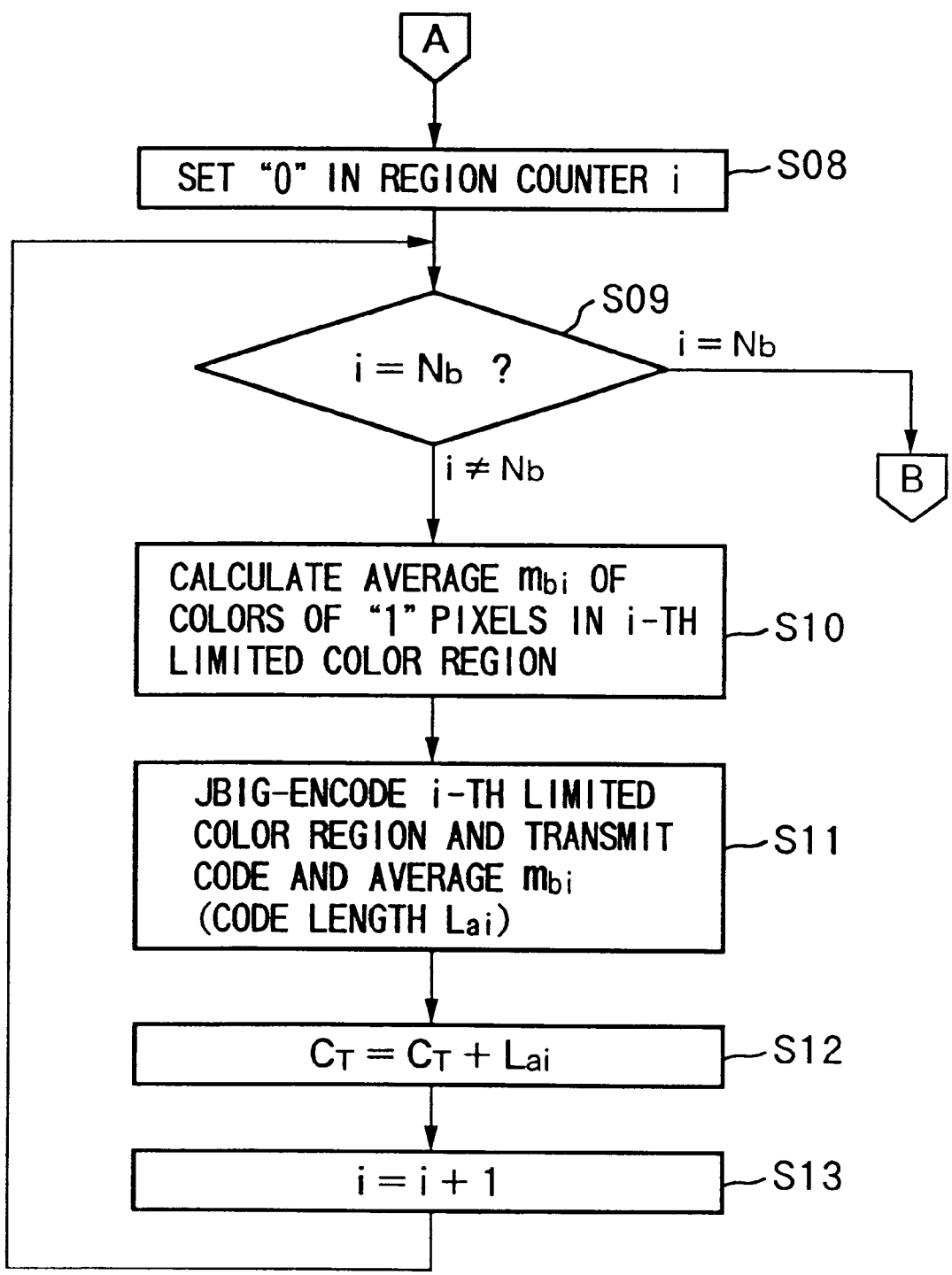
FIG. 14 is a flow chart showing the flow of processing executed in the third embodiment of the present invention.
Figure 15:
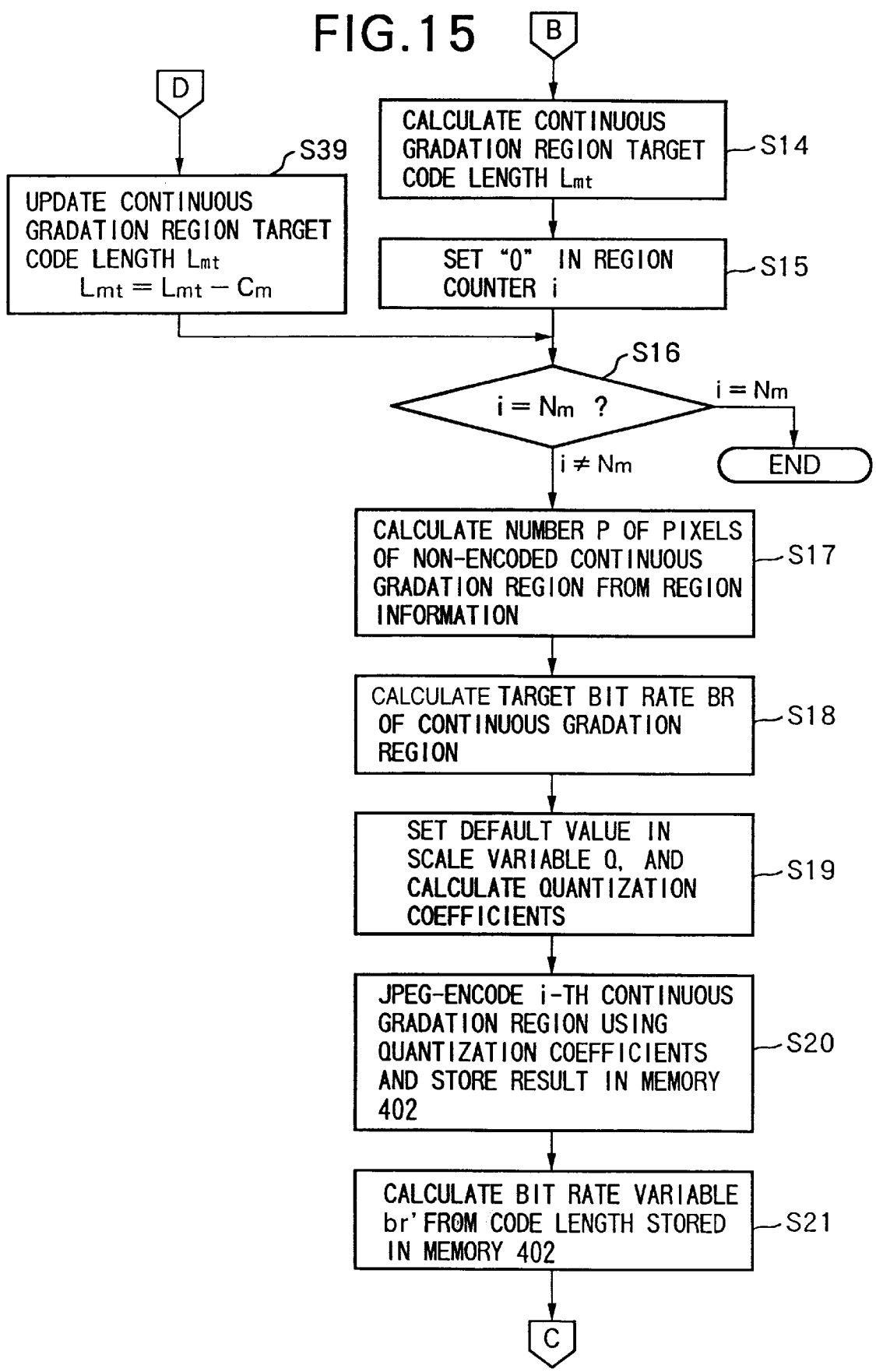
FIG. 15 is a flow chart showing the flow of processing executed in the third embodiment of the present invention.
Figure 16:
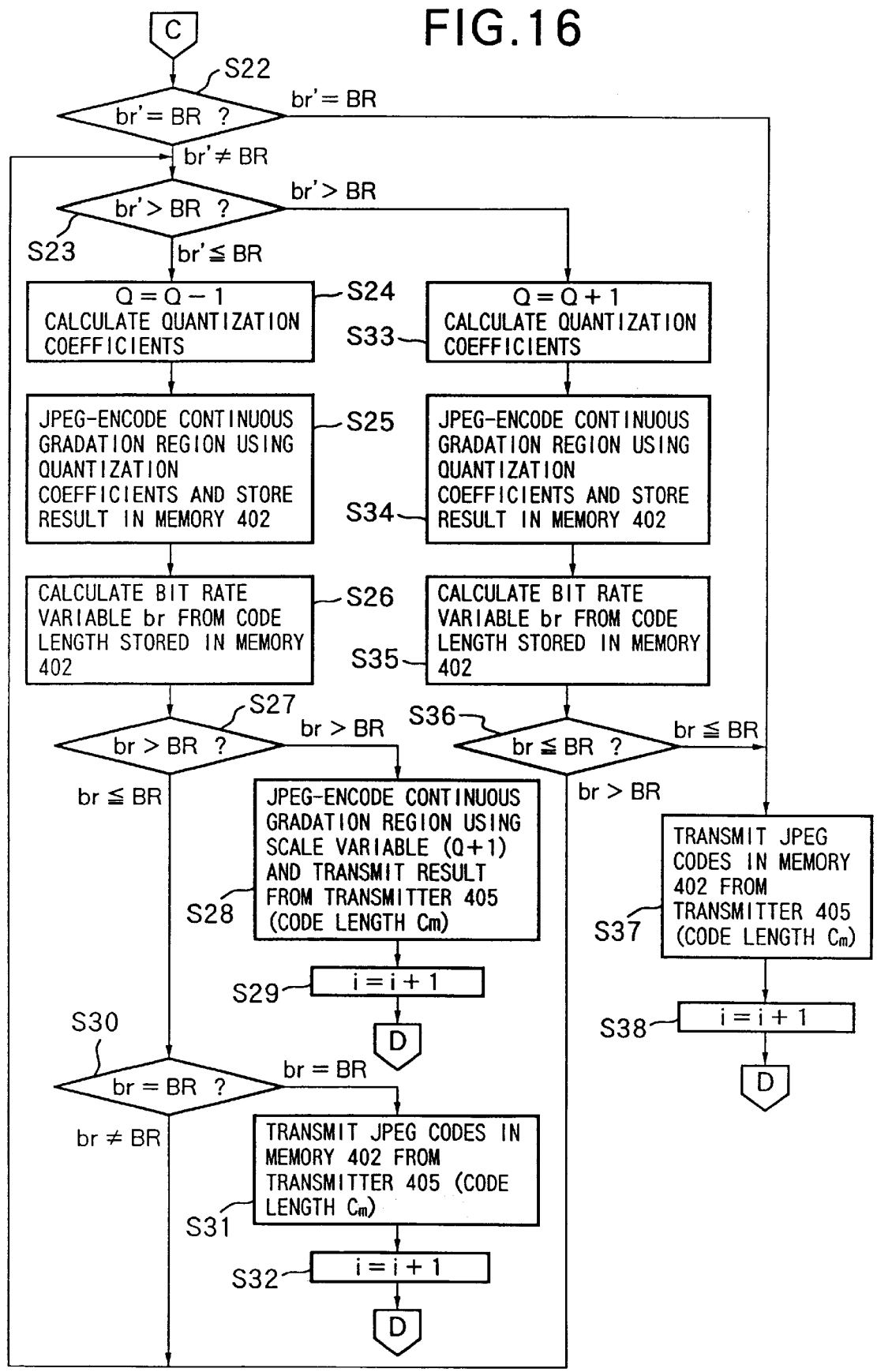
FIG. 16 is a flow chart showing the flow of processing executed in the third embodiment of the present invention.

FIG. 12 is a block diagram showing the arrangement of an image processing apparatus according to the third embodiment of the present invention.

In FIG. 12, reference numeral 400 denotes an image input device for inputting an image. The image input device 400 comprises a color scanner, and inputs 8-bit color multi-valued image data per color. Reference numeral 401 denotes a CPU which controls the individual elements according to a program. Reference numeral 402 denotes a memory which stores the program and assures a memory area required for the operation of the CPU 401. Reference numeral 403 denotes a terminal device at which the user inputs instructions. Reference numeral 404 denotes a storage device which comprises, e.g., a magnetic disk or the like, and can provide a large storage capacity. Reference numeral 405 denotes a transmitter for transmitting encoded data in correspondence with a communication protocol. Reference numeral 406 denotes a bus for connecting these elements to exchange data such as image data and control signals.

An example wherein the user directs to read an original image, segment the read image into regions, encode the segmented regions, and transmit the code from the transmitter 405 will be explained below with reference to the flow charts in FIGS. 13 to 16. For the sake of simplicity, JBIG coding is used as a coding method of encoding each limited color region, and JPEG coding is used as a coding method of encoding each continuous gradation region. FIGS. 13 to 16 are flow charts showing the flows of the processing executed in the third embodiment of the present invention.

The user sets an original on the image input device 400 and inputs a desired total code length $L_T$ at the terminal device 403 (step S01). After that, the CPU 401 starts the image processing apparatus. The CPU 401 reads a color multi-valued image from the image input device 400, and stores it in the memory 402 (step S02).

The CPU 401 converts the color multi-valued image data stored in the memory 402 into a luminance signal, compares the luminance signal value with a threshold value to generate binary image data, and stores the binary image data in the memory 402 (step S03). At this time, if the luminance signal is smaller than the threshold value, i.e., if it is closer to black, "1" is output; if the luminance signal is larger than the threshold value, i.e., if it is closer to white, "0" is output. The generated binary image data is segmented into regions. With this processing, regions are extracted, image data is broken up into regions, attributes representing the contents are detected in units of regions, the regions are classified into region information of limited color regions and region information of continuous gradation regions, and the positions, sizes, and attributes of the regions are stored in the memory 402 (S04). Note that $N_b$ represents the number of limited color regions extracted at that time, and $N_m$ the number of continuous regions.

Subsequently, an internal code length counter $C_T$ (not shown) of the CPU 401 is reset to zero (step S05). The region information stored in the memory 402 is transmitted from the transmitter 405 (step S06). Note that $C_A$ represents the data volume of region information transmitted at that time. Then, $C_A$ is substituted into the code length counter $C_T$ (step S07).

Next, JBIG coding is done in units of limited color regions. Initially, "0" is set in an internal region counter i (not shown) of the CPU 401 (step S08). An average value $m_{bi}$ of color multi-valued image data corresponding to the pixel value "1" of the binary image data is calculated with reference to binary image data and color multi-valued image data in the i-th limited color region (step S10). Binary image data in the i-th limited color region is JBIG-encoded, and the encoded data is transmitted from the transmitter 405 together with the average value $m_{bi}$ (step S11). Note that $L_{ai}$ represents the sum of the data volume of the average value $m_{bi}$ and the code length of JBIG coding at that time. The sum $L_{ai}$ of the code lengths is added to the code length counter $C_T$ (step S12). The region counter i is incremented by "1" (step S13).

If the region counter i is not equal to $N_b$, steps S10 to S13 are repeated (step S09).

If the region counter i becomes equal to $N_b$ and JBIG coding and transmission of all the limited color regions are complete (step S09), a target code length $L_{mt}$ of the continuous gradation region is calculated according to the following equation (6) (step S14):

$$L_{mt}=L_T-C_T \quad (6)$$

After that, JPEG coding is done in units of continuous gradation regions. Initially, "0" is set in the region counter i (step S15). Region information of each non-JPEG-encoded region (the i-th and subsequent continuous gradation regions) stored in the memory 402 is read out, and the number P of pixels included in that region is calculated based on its size (step S17). Furthermore, a target bit rate BR of the i-th continuous gradation region is calculated according to the following equation (7) (step S18):

$$BR=L_{mt}/P \quad (7)$$

Subsequently, a default value is set in a scale variable Q to obtain quantization coefficients (step S19). The i-th continuous gradation region is JPEG-encoded using the obtained quantization coefficients, and the selected code and its code length $C_m$ are stored in the memory 402 (step S20). The code length per pixel is calculated from a code length $C_m$ of JPEG codes stored in the memory 402 and the number of pixels in that region so as to obtain a bit rate variable br' (step S21).

If the bit rate variable br' is equal to the target bit rate BR (step S22), the JPEG codes stored in the memory 402 are transmitted from the transmitter 405, and the JPEG code area on the memory 402 is cleared (step S37). After the region counter i is incremented by "1" (step S38), the target code length $L_{mt}$ of the continuous gradation region is updated according to equation (8) below to process the next continuous gradation region (step S39):

$$L_{mt}=L_{mt}-C_m \quad (8)$$

If the bit rate variable br' is larger than the target bit rate BR (step S23), the scale variable Q is incremented by "1" (step S33). The JPEG code area on the memory 402 is cleared, the i-th continuous gradation region is JPEG-encoded using the updated scale variable Q again, and the encoded result is stored in the memory 402 (step S34).

The code length per pixel is calculated from the code length $C_m$ of JPEG codes stored in the memory 402 and the number of pixels in that continuous gradation region so as to obtain a bit rate variable br (step S35). If the bit rate variable br is equal to or smaller than the target bit rate BR (step S36), the JPEG codes stored in the memory 402 are transmitted from the transmitter 405, and the JPEG code area on the memory 402 is cleared (step S37). After the region counter i is incremented by "1" (step S38), the target code length $L_{mt}$ of the continuous gradation region is updated according to equation (8) above to process the next continuous gradation region (step S39).

On the other hand, if the bit rate variable br is larger than the target bit rate BR (step S36), the flow advances to step S23 and the scale variable Q is incremented by "1" in step S33, thus repeating the processing.

If the bit rate variable br' is equal to or smaller than the target bit rate BR (step S23), the scale variable Q is decremented by "1" (step S24). The JPEG code area on the memory 402 is cleared, quantization coefficients are calculated using the decremented scale variable Q, the i-th continuous gradation region is JPEG-encoded by the calculated quantization coefficients, and the encoded result is stored in the memory 402 (step S25). The code length per pixel is calculated from the code length $C_m$ of JPEG codes stored in the memory 402 and the number of pixels in that continuous gradation region so as to obtain a bit rate variable br (step S26). If the bit rate variable br is larger than the target bit rate BR (step S27), the JPEG code area on the memory 402 is cleared, the i-th continuous gradation region is JPEG-encoded again using the scale variable (Q+1), and the encoded result is transmitted from the transmitter 405 (step S28). The code length at that time is substituted in $C_m$.

After the region counter i is incremented by "1" (step S29), the target code length $L_{mt}$ of the continuous gradation region is updated according to equation (8) above to process the next continuous gradation region (step S39).

On the other hand, if the bit rate variable br is equal to the target bit rate BR (step S30), JPEG codes stored in the memory 402 are transmitted from the transmitter 405, and the JPEG code area on the memory 402 is cleared (step S31). After that, the region counter i is incremented by "1" (step S32), and the target code length $L_{mt}$ of the continuous gradation region is updated according to equation (8) above to process the next continuous gradation region (step S39).

If the bit rate variable br is not equal to the target bit rate BR (step S30), the flow advances to step S23, and the scale variable Q is decremented by "1" in step S24, thus repeating the processing.

The processing in steps S22 to S39 is repeated, and if the region counter i has reached $N_m$ (step S16), JPEG coding ends.

In the above description of the third embodiment, the image input from the image input device 400 is assumed to be a color multi-valued image. However, the present invention is not limited to such specific type of image, but may be applied to a monochrome multi-valued image. Also, the coding methods of image data are not limited to those described above. Furthermore, the memory arrangements and the like are not limited to specific ones described above, and processing in units of a plurality of lines may be done. As described above, according to the third embodiment, a code with a code length that the user desired can be obtained for color multi-valued image data even by software such as a computer program without the use of dedicated hardware. Since the target code length $L_{mt}$ of the continuous gradation region is updated upon coding each continuous gradation region, the obtained code length approaches a desired code length very closely.

On the other hand, the obtained codes are transmitted from the transmitter 405 but may be stored in the storage device 404. At this time, since the storage device 404 can store a predetermined number of frames of image data, management can be facilitated when images are saved in exchangeable media such as magnetooptical disks and the like.

<Fourth Embodiment>

Figure 17:
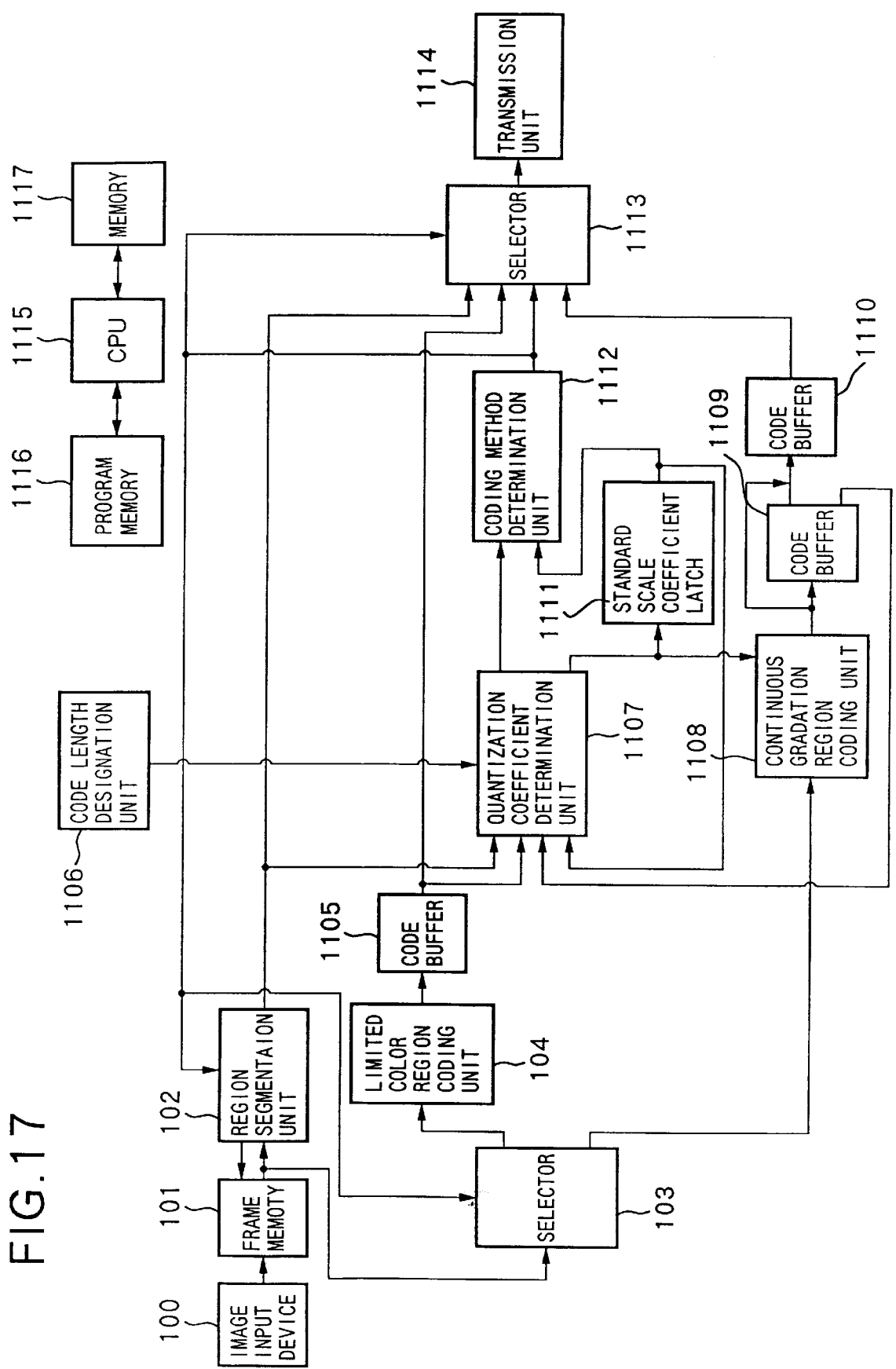
FIG. 17 is a block diagram showing the arrangement of an image processing apparatus according to the fourth embodiment of the present invention.

FIG. 17 is a block diagram showing the arrangement of an image processing apparatus according to the fourth embodiment of the present invention.

Note that the same reference numerals in FIG. 17 denote parts having the same functions as those in the first to third embodiments, and a detailed description thereof will be omitted.

In FIG. 17, reference numeral 103 denotes a selector which selects the output destination in accordance with an instruction from a CPU 1115. Reference numeral 1105 denotes a code buffer for storing a code generated by a limited color region coding unit 104. Reference numeral 1106 denotes a code length designation unit at which the user (not shown) inputs his or her desired code length (target code length).

Reference numeral 1108 denotes a continuous gradation region coding unit for encoding a continuous gradation region. In the following description, JPEG coding will be exemplified as a coding method for the continuous gradation region for the sake of simplicity. Note that the code length in JPEG coding is adjusted by setting basic quantization coefficients in advance, and multiplying them by an adjusted scale coefficient Q. Reference numeral 1107 denotes a quantization coefficient determination unit for determining a quantization coefficient used in JPEG coding of the continuous gradation region coding unit 1108. Reference numerals 1109 and 1110 denote code buffers for storing codes obtained by the continuous gradation region coding unit 1108. Reference numeral 1111 denotes a standard scale coefficient latch for storing a scale coefficient upon JPEG-encoding the entire input color multi-valued image data.

Reference numeral 1112 denotes a coding method determination unit for determining whether the entire color multi-valued image data is JPEG-encoded by the continuous gradation region coding unit 1108, or the color multi-valued image data is segmented by a region segmentation unit 102 into limited color regions and continuous gradation regions, the limited color regions are JBIG-encoded by a limited color region coding unit 104, and the continuous gradation regions are JPEG-encoded by the continuous gradation region coding unit 1108. Reference numeral 1113 denotes a selector for selecting the input source in accordance with an instruction from the CPU 1115. Reference numeral 1114 denotes a transmission unit for outputting the generated codes to a communication line, LAN, and storage medium. Reference numeral 1115 denotes a CPU for controlling the above-mentioned elements via control lines (not shown). Reference numeral 1116 denotes a program memory for storing a program required for controlling the image processing apparatus. Reference numeral 1117 denotes a memory for assuring a memory area required for running the program stored in the program memory 1116.

The details and operations of the individual elements of the image processing apparatus of the fourth embodiment will be described in turn below.

Prior to the processing, the CPU 1115 clears the contents of a frame memory 101.

Subsequently, the user (not shown) inputs a target code length $L_T$ at the code length designation unit 1106. Furthermore, a color multi-valued image is read from an image input device 100 in accordance with the user's instruction, and is stored in the frame memory 101.

After the color multi-valued image data for one frame is stored in the frame memory 101, the CPU 1115 enables the quantization coefficient determination unit 1107.

The detailed arrangement of the quantization coefficient determination unit 1107 will be described below with reference to FIG. 18.

Figure 18:
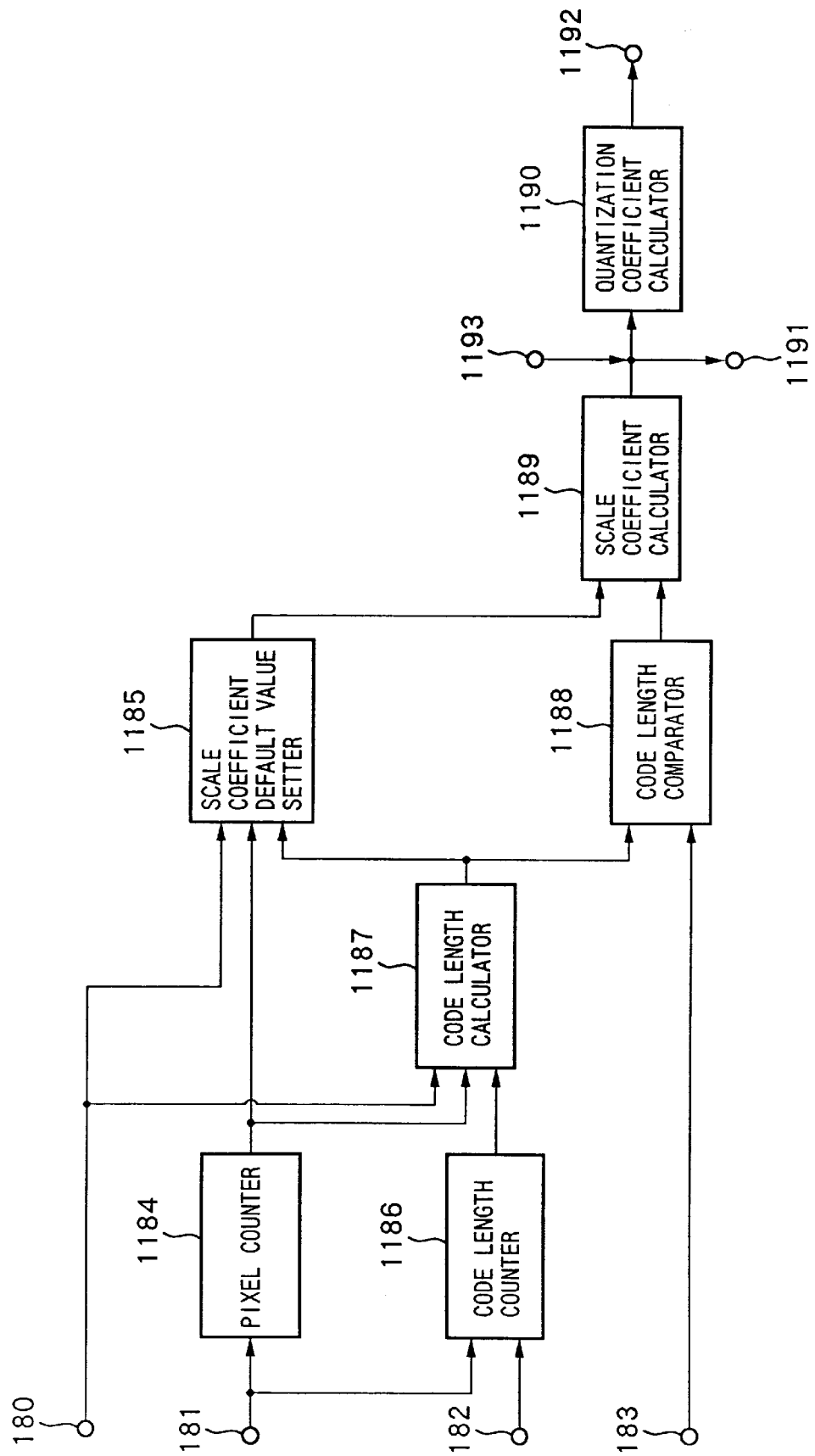
FIG. 18 is a detailed block diagram showing the arrangement of a quantization coefficient determination unit according to the fourth embodiment of the present invention.

FIG. 18 is a detailed block diagram showing the arrangement of the quantization coefficient determination unit according to the fourth embodiment of the present invention.

Reference numeral 180 denotes a terminal for receiving a target code length $L_T$ from the code length designation unit 1106. Reference numeral 181 denotes a terminal for receiving region information and the data volume required for transmitting the region information from a region information memory 125 (FIG. 2) of the region segmentation unit 102. Reference numeral 182 denotes a terminal for receiving the code length of the code stored in the code buffer 1105. Reference numeral 183 denotes a terminal for receiving the code length of the code stored in the code buffer 1109. Reference numeral 1184 denotes a pixel counter for counting the number of pixels in the input color multi-valued image data to be JPEG-encoded or each continuous gradation region of the regions segmented by the region segmentation unit 102. Also, the pixel counter 1184 is reset to zero in response to an instruction from the CPU 1115 before the beginning of all the processing operations.

Reference numeral 1185 denotes a scale coefficient default value setter for setting a default value $Q_d$ of a scale coefficient Q to be multiplied by a quantization able used in JPEG coding. Also, the scale coefficient default value setter 1185 comprises a table constituted by a nonvolatile memory, and a means for updating the contents of the memory. Reference numeral 1186 denotes a code length counter for counting the total code length of the obtained codes. Also, the code length counter 1186 is reset to zero in response to an instruction from the CPU 1115 before the beginning of all the processing operations. Reference numeral 1187 denotes a code length calculator for calculating a code length $C_{tm}$ to be assigned to image data to be encoded on the basis of the contents of the pixel counter 1184 and code length counter 1186. Reference numeral 1188 denotes a code length comparator for comparing the code length $C_{tm}$ with a code length $C_m$ of the code stored in the code buffer 1109 and input from the terminal 183. Reference numeral 1189 denotes a scale coefficient calculator for updating the scale coefficient Q. Reference numeral 1190 denotes a quantization coefficient calculator for multiplying a basic quantization matrix by the scale coefficient Q to determine individual quantization coefficients.

Reference numeral 1191 denotes a terminal for outputting the scale coefficient Q obtained by the scale coefficient calculator 1189 to the standard scale coefficient latch 1111. Reference numeral 1192 denotes a terminal for outputting the quantization coefficients calculated by the quantization coefficient calculator 1190 to the continuous gradation region coding unit 1108. Reference numeral 1193 denotes a terminal for inputting a scale variable supplied from an external device to the quantization coefficient calculator 1190.

The operation of the quantization coefficient determination unit 1107 will be explained below.

The quantization coefficient determination unit 1107 initially calculates a scale coefficient $Q_s$ used upon encoding the entire color multi-valued image data.

Prior to the processing, the CPU 1115 adds the number P of all the pixel data in the read color multi-valued image data in the pixel counter 1184 and the code length of a code indicating that there are no segmented regions in the input color multi-valued image data to the contents $C_T$ of the code length counter 1186. Subsequently, the CPU 1115 operates the code length calculator 1187. The code length $C_{tm}$ upon JPEG-encoding the entire color multi-valued image data is given by equation (9) below from the target code length $L_T$ and the contents $C_T$ of the code length counter 1186:

$$C_{tm} = L_T C_T \qquad (9)$$

After the code length $C_{tm}$ is obtained, the CPU 1115 starts the scale coefficient default value setter 1185. The scale coefficient default value setter 1185 receives the number P of pixel data from the pixel counter 1184 and the code length $C_{tm}$ from the code length calculator 1187, and calculates a code length $BR_T$ per pixel data by:

$$BR_T = C_{tm}/P \qquad (10)$$

After the code length $BR_T$ per pixel data is obtained, the setter 1185 reads out the default value $Q_d$ of the scale coefficient using the calculated code length $BR_T$ and the number P of pixel data as an address of the table stored in the nonvolatile memory.

The CPU 1115 then selects the continuous gradation region coding unit 1108 as the output destination of the selector 103, reads out the color multi-valued image data from the frame memory 101, and inputs it to the continuous gradation region coding unit 1108. The continuous gradation region coding unit 1108 performs JPEG coding. The encoded result is stored in the code buffer 1109. Note that $C_m$ represents the code length obtained at that time. Upon completion of JPEG coding of all the pixel data in each continuous gradation region, the code length $C_m$ of the codes stored in the code buffer 1109 is input to the code length comparator 1188 via the terminal 183 of the quantization coefficient determination unit 1107.

If the code length comparator 1188 determines that the code length $C_m$ is smaller than the code length $C_{tm}$, the scale coefficient calculator 1189 decrements the scale coefficient Q by "1", and the quantization coefficient calculator 1190 multiplies the basic quantization matrix by the decremented scale coefficient to determine individual quantization coefficients. The determined quantization coefficients are input to the continuous gradation region coding unit 1108 again, and the code buffer 1109 is cleared. Subsequently, the pixel data value of the color multi-valued image data is read from the frame memory 101, and is JPEG-encoded by the continuous gradation region coding unit 1108. In this way, JPEG coding is repeated while decrementing the scale coefficient Q by "1", until the code length $C_m$ becomes larger than the code length $C_{tm}$. When the code length $C_m$ has exceeded the code length $C_{tm}$, the scale coefficient Q is incremented by "1", and is stored as $Q_s$ in the standard scale coefficient latch 1111 via the terminal 1191.

On the other hand, if the code length comparator 1188 determines that the code length $C_m$ is larger than the code length $C_{tm}$, the scale coefficient calculator 1189 increments the scale coefficient Q by "1", and the quantization coefficient calculator 1190 multiplies the basic quantization matrix by the incremented scale coefficient to determine individual quantization coefficients. The pixel value of the image is read from the frame memory 101 again, and is JPEG-encoded by the continuous gradation region coding unit 1108. In this fashion, JPEG coding is repeated while incrementing the scale coefficient Q by "1" by the scale coefficient calculator 1189, until the code length $C_m$ becomes smaller than the code length $C_{tm}$. When the code length $C_m$ has become smaller than the code length $C_{tm}$, the scale coefficient Q is stored as $Q_s$ in the standard scale coefficient latch 1111 via the terminal 1191.

Then, the color multi-valued image data is read out from the frame memory 101, and is input to the region segmentation unit 102.

Note that the region segmentation unit 102 used in the fourth embodiment has the same arrangement as that shown in FIG. 2 of the first embodiment, and a detailed description of its arrangement and operation will be omitted herein.

The CPU 1115 selects the limited color region coding unit 104 as the output destination and input source of the selectors 103 and 1113. Subsequently, region information stored in the region information memory 125 is read out in turn. The corresponding color multi-valued image data is read out from the frame memory 101 in units of pixels in accordance with the region information, and is processed by the limited color region coding unit 104.

Note that the detailed arrangement of the limited color region coding unit 104 used in the fourth embodiment is the same as that of the limited color region coding unit 104 shown in FIG. 3 of the first embodiment, and a detailed description thereof will be omitted.

The operation of the limited color region coding unit 104 will be described below.

Prior to the processing in units of limited color regions, the CPU 1115 resets the contents of latches 145 to 147, latches 151 to 153, and counter 154 to zero. At the same time, the CPU 1115 resets a JBIG encoder 161 and code buffer 162 to their initial states.

Subsequently, coding is done in units of limited color regions. Pixel data of color multi-valued image data of each limited color region input from terminals 140, 141, and 142 in accordance with pixel clocks are respectively stored in the latches 145, 146, and 147 corresponding to the individual colors. At the same time, the pixel data are also input to a luminance converter 143, and are converted into luminance image data in accordance with equation (1) above. The obtained luminance image data is binarized by a binarizer 144. If this binary image data is "1", the pixel data in the latches 145, 146, and 147 are respectively input to adders 148, 149, and 150, and are added to the contents of the latches 151, 152, and 153. These sums are stored in the latches 151, 152, and 153 again. The binary image data is input to the counter 154, and if the binary image data is "1", the contents of the counter 154 are incremented by "1". Furthermore, the binary image data is encoded by the JBIG encoder 161, and the encoded result is stored in the code buffer 162.

Upon completion of binarization by the binarizer 144, additions by the adders 148, 149, and 150, counting by the counter 154, and JBIG coding by the JBIG encoder 161 for all the pixel data of the limited color region to be processed, the CPU 1115 divides the contents of the latches 151, 152, and 153 by the contents of the counter 154 using dividers 155, 156, and 157. The CPU 1115 then outputs the obtained quotients via terminals 158, 159, and 160. These outputs are information representing the colors of characters and line images, and are stored in the code buffer 162 together with the codes of the processed region. Upon completion of coding of the limited color region and addition of code lengths, the CPU 1115 processes the next limited color region. The above-mentioned processing is repeated for all the limited color regions.

Upon completion of JBIG coding and addition of code lengths for all the limited color regions, the CPU 1115 performs processing and JPEG coding of the continuous gradation regions.

Prior to coding of the continuous gradation regions, the quantization coefficient determination unit 1107 receives the data volume of region information stored in the region information memory 125 via the terminal 181, and adds it to the contents $C_T$ of the code length counter 1186. After JBIG coding of all the limited color regions, the coding unit 1107 receives information of each limited color via the terminals 158, 159, and 160, and adds it to the contents $C_T$ of the code length counter 1186. Furthermore, the coding unit 1107 receives the code length of the codes stored in the code buffer 162 via the terminal 182, and adds it to the contents $C_T$ of the code length counter 1186. Subsequently, the pixel counter 1184 reads out region information stored in the region information memory 125, and calculates the number P of pixel data included in all the continuous gradation regions on the basis of the sizes of the continuous gradation regions in the readout region information. The CPU 1115 operates the code length calculator 1187 to calculate the code length $BR_T$ per pixel data of the continuous gradation region using equation (11) below on the basis of the target code length $L_T$, the number P of pixel data from the pixel counter 1184, and the contents $C_T$ of the code length counter 1186:

$$BR_T=(L_T-C_T)/P \tag{11}$$

After the code length $BR_T$ per pixel data is obtained, the CPU 1115 selects the continuous gradation region coding unit 1108 and code buffer 1109 as the output destination and input source of the selectors 103 and 1113. Subsequently, the CPU 1115 reads out region information stored in the region information memory 125 in turn. Then, the corresponding color multi-valued image data is read out from the frame memory 101 in units of pixel data in accordance with the region information, and is JPEG-encoded by the continuous gradation region coding unit 1108.

JPEG coding is done in units of continuous gradation regions. Prior to JPEG coding of the continuous gradation regions, the CPU 1115 initializes the continuous gradation region coding unit 1108 and code buffers 1109 and 1110. Subsequently, the CPU 1115 starts the pixel counter 1184. The pixel counter 1184 reads out the region information of all the continuous gradation regions to be JPEG-encoded from the region information memory 123, and counts the number P of pixel data in these continuous gradation regions on the basis of their sizes. The CPU 1115 then starts the scale coefficient default value setter 1185 to read out the default value $Q_d$ of the scale coefficient using the code length $BR_T$ per pixel data and the number P of pixel data as an address of the table comprising the nonvolatile memory, and to set it in the scale coefficient Q of the scale coefficient calculator 1189. The quantization coefficient calculator 1190 multiplies the basic quantization matrix by the scale coefficient Q to determine individual quantization coefficients. The determined quantization coefficients are input to the continuous gradation region coding unit 1108 via the terminal 1192. At the same time, the image size (x, y) of the region to be processed is read, and a code length $C_{tm}$ to be assigned to the continuous gradation region to be processed is calculated using equation (3) above.

Subsequently, the CPU 1115 reads out the pixel data value included in the continuous gradation region from the frame memory 101, and JPEG-encodes it by the continuous gradation region coding unit 1108 on the basis of the input quantization coefficients. The encoded result is stored in the code buffer 1109. Upon completion of JPEG coding of all the pixel data in that continuous gradation region, the code length $C_m$ of the codes stored in the code buffer 1109 is input to the code length comparator 1188 via the terminal 183 of the quantization coefficient determination unit 1107.

The code length comparator 1188 compares the code lengths $C_m$ and $C_{tm}$. At this time, if the code length $C_m$ is smaller than the code length $C_{tm}$, the scale coefficient calculator 1189 decrements the scale coefficient Q by "1", and the quantization coefficient calculator 1190 multiplies the basic quantization matrix by the decremented scale coefficient to define individual quantization coefficients. The determined quantization coefficients are input to the continuous gradation region coding unit 1108 again. Furthermore, the code buffer 1109 is cleared. The pixel data value included in the continuous gradation region is read out from the frame memory 101, and is JPEG-encoded by the continuous gradation region coding unit 1108. The code comparator 1188 then compares the code lengths $C_m$ and $C_{tm}$, and JPEG coding is repeated while decrementing the scale coefficient Q by "1" by the scale coefficient calculator 1189 until the comparator 1188 determines that the code length $C_m$ is larger than the code length $C_{tm}$. When the code length $C_m$ has exceeded the code length $C_{tm}$, the scale coefficient calculator 1189 increments the scale coefficient Q by "1". This scale coefficient Q is input to the coding method determination unit 1112 via the terminal 1191.

The coding method determination unit 1112 compares the scale coefficient Q at that time and the scale coefficient $Q_s$ latched by the standard scale coefficient latch 1111. If the scale coefficient Q is larger than the scale coefficient $Q_s$ in the standard scale coefficient latch 1111, the coding method determination unit 1112 determines that the entire color multi-valued image data is to be JPEG-encoded.

When it is determined that the entire color multi-valued image data is to be JPEG-encoded, the coding method determination unit 1112 directs the region segmentation unit 102 to clear the contents of the region information memory 125, i.e., to clear all the segmented regions. Subsequently, the scale coefficient $Q_s$ is read out from the standard scale coefficient latch 1111, and is input to the quantization coefficient calculator 1190 via the terminal 1193 of the quantization coefficient determination unit 1107. The quantization coefficient calculator 1190 multiplies the basic quantization matrix by the scale coefficient $Q_s$ to determine individual quantization coefficients. The determined quantization coefficients are input to the continuous gradation region coding unit 1108 again. Furthermore, the code buffer 1109 is cleared.

The pixel data values of the color multi-valued image data are sequentially read out from the frame memory 101, and are JPEG-encoded by the continuous gradation region coding unit 1108. The generated codes are stored in the code buffer 1110. Upon completion of JPEG coding of the entire color multi-valued image data, the CPU 1115 starts the transmission unit 1114 to execute communication protocols, thus preparing for data transfer. Then, the CPU 1115 transmits a code indicating that the entire color multi-valued image data is JPEG-encoded (the output from the coding method determination unit 1112), the contents of the region information memory 1125, and the contents of the code buffer 1110 from the transmission unit 1114 via the selector 1113. Upon completion of transmission of all the contents of the code buffer 1110, the CPU 1115 resets the elements to end the processing.

On the other hand, as a result of comparison between the scale coefficient Q and the scale coefficient $Q_s$ latched by the standard scale coefficient latch 1111, if the scale coefficient Q is equal to or smaller than the scale coefficient $Q_s$ in the standard scale coefficient latch 1111, the coding method determination unit 1112 determines to continue JPEG coding in units of continuous gradation regions. The quantization coefficient calculator 1190 multiplies the basic quantization matrix by the scale coefficient Q to determine individual quantization coefficients. The determined quantization coefficients are input to the continuous gradation region coding unit 1108 again. The pixel data values of the color multi-valued image data are sequentially read out from the frame memory 101 and are JPEG-encoded by the continuous gradation region coding unit 1108. The obtained codes are stored in the code buffer 1110 after the previously obtained codes.

Upon completion of JPEG coding for all the continuous gradation regions, the CPU 1115 starts the transmission unit 1114 to execute communication protocols, thus preparing for data transfer. Then, the CPU 1115 transmits a code indicating that coding is switched in units of regions (the output from the coding method determination unit 1112) and the contents of the region information memory 1125 from the transmission unit 1114 via the selector 1113. Subsequently, the CPU 1115 transmits the contents of the code buffer 1110 from the transmission unit 1114 via the selector 1113. Upon completion of transmission of all the contents of the code buffer 1110, the CPU 1115 resets the elements to end the processing.

The outline of the processing executed in the fourth embodiment will be explained below with reference to FIG. 19.

Figure 19:
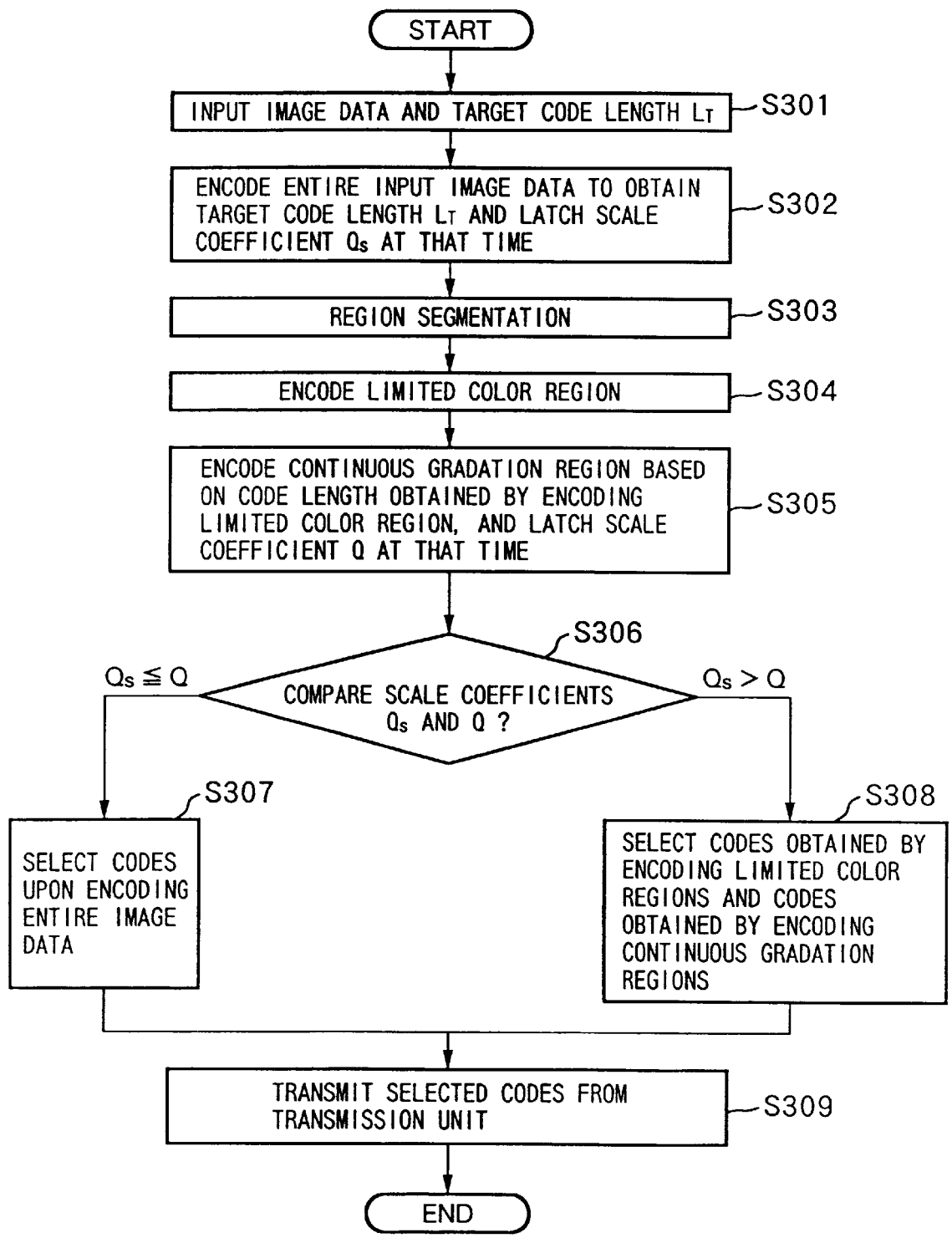
FIG. 19 is a flow chart showing the flow of processing executed in the fourth embodiment of the present invention.

FIG. 19 is a flow chart showing the flow of the processing executed in the fourth embodiment of the present invention.

The image input device 100 reads a color multi-valued image, and stores the read color multi-valued image data in the frame memory 101. Also, a desired target code length $L_T$ is input at the code length designation unit 1106 (step S301). The image data stored in the frame memory 101 is read out, and the continuous gradation region coding unit 1108 JPEG-encodes the entire color multi-valued image data while controlling the scale coefficient Q of the quantization coefficient determination unit 1107, so as to obtain the target code length $L_T$. The scale coefficient $Q_s$ upon obtaining the target code length $L_T$ is latched by the standard scale coefficient latch (step S302). The color multi-valued image data stored in the frame memory 101 is read out, and is segmented into regions by the region segmentation unit 102 (step S303). Of the segmented regions, the limited color regions are JBIG-encoded by the limited color region coding unit 104 (step S304).

Based on the code length obtained by JBIG-encoding the limited color regions, the continuous gradation regions are JPEG-encoded by the continuous gradation region coding unit 1108, and the scale coefficient Q at that time is latched (step S305). The scale coefficients $Q_s$ and Q are compared with each other (step S306). If the scale coefficient $Q_s$ is larger than the scale coefficient Q, codes obtained when the entire color multi-valued image data is JPEG-encoded are selected (step S307). On the other hand, if the scale coefficient $Q_s$ is equal to or smaller than the scale coefficient Q, codes obtained when the limited color regions are JBIG-encoded and those obtained when the continuous gradation regions are JPEG-encoded are selected (step S308). The selected codes are transmitted from the transmission unit 1114 via the selector 1113 (step S309).

In the description of the fourth embodiment, the image to be input from the image input device 100 is a color multi-valued image. However, the present invention is not limited to such specific type of image, but may be applied to a monochrome multi-valued image. Also, the coding methods of image data are not limited to those described above. Furthermore, the memory arrangements and the like are not limited to the specific ones described above, and processing in units of a plurality of lines may be done. In JPEG coding, the scale coefficient Q is changed by "1" to adjust the code length. However, the present invention is not limited to such specific adjustment, and a method of predicting a new scale coefficient Q based on the code length and the scale coefficient Q may be used.

Furthermore, JBIG coding and JPEG coding are used. However, the present invention is not limited to these specific methods, and other coding methods may be used. The scale coefficient is used for adjusting the code length. However, the present invention is not limited to such specific adjustment method of the scale coefficient. For example, the quantization coefficients may be individually changed, or a method of predicting a scale coefficient, a method of updating the scale coefficient at a constant rate, or the like may be used.

Moreover, the scale coefficient default value setter 1185 reads out the default value using the size and bit rate as an address. However, the present invention is not limited to this. For example, a value obtained by quantizing the size or bit rate by an appropriate quantization coefficient may be used as an address. Also, the contents of the scale coefficient default value setter 1185 are updated by overwriting new contents. However, the present invention is not limited to such specific method. For example, an average between the previous contents and new contents may be calculated, or a new scale coefficient may be compared with the history of previous default values of the scale coefficient.

As described above, according to the fourth embodiment, since pixel data of the continuous gradation region in the color multi-valued image data is encoded to always have a code length smaller than the code length per pixel data of the continuous gradation region calculated by the code length calculator 1187, codes having the target code length $L_T$ that the user desired can be obtained. Since the default value of the scale coefficient is determined on the basis of the size and bit rate of the color multi-valued image data to be processed, the time required for obtaining an optimal scale coefficient can be shortened.

<Fifth Embodiment>

Figure 20:
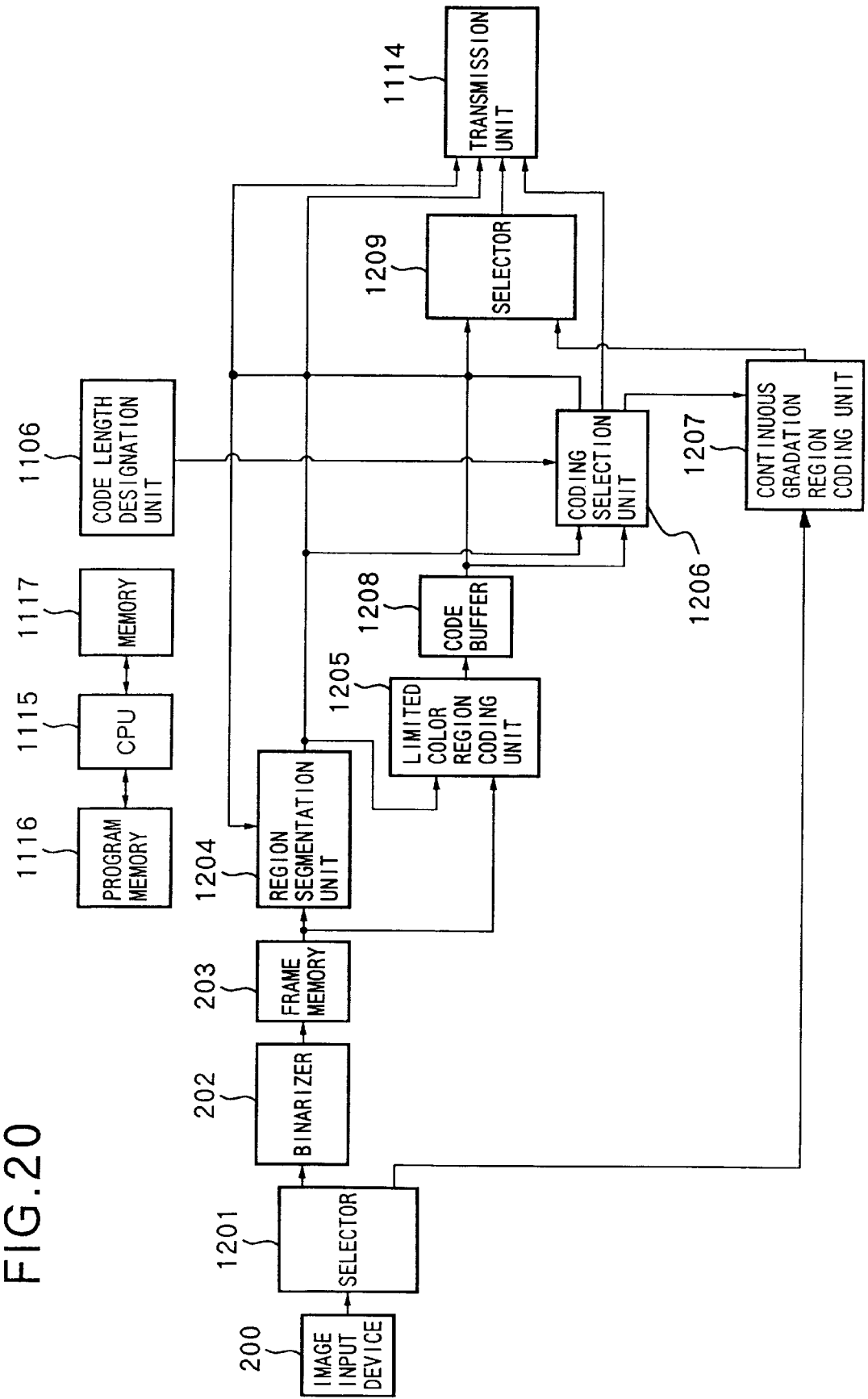
FIG. 20 is a block diagram showing the arrangement of an image processing apparatus according to the fifth embodiment of the present invention.

FIG. 20 is a block diagram showing the arrangement of an image processing apparatus according to the fifth embodiment of the present invention.

The same reference numerals in FIG. 20 denote parts having the same functions as those in the first to fourth embodiments, and a detailed description thereof will be omitted. Also, in the following description, assume that the color used in each limited color region is black.

Reference numeral 1201 denotes a selector for selecting the output destination in accordance with an instruction from a CPU 1115. Reference numeral 1204 denotes a region segmentation unit. Assume that the region segmentation unit 1204 is constituted by the region segmenter 122, buffer 123, region information shaper 124, and region information memory 125 shown in FIG. 2 of the first embodiment, and uses a region segmentation method described in Japanese Patent Application No. 6-167748 described earlier. The region segmentation unit 1204 extracts regions, breaks up image data into regions, detects attributes representing contents in units of regions, and classifies the segmented regions into region information of limited color regions and region information of continuous gradation regions, and stores the positions, sizes, and attributes of the regions in its internal region information memory 125. Reference numeral 1205 denotes a limited color region coding unit for encoding each limited color region. In the following description of this embodiment, NMR coding used in a facsimile apparatus and the like will be exemplified as the coding method. Reference numeral 1206 denotes a coding selection unit for selecting the coding method of the continuous gradation regions.

Reference numeral 1207 denotes a continuous gradation region coding unit for encoding the continuous gradation regions. In the following description of this embodiment, vector coding used in a facsimile apparatus and the like will be exemplified as the coding method. In vector coding used in the fifth embodiment, image data is segmented into 4×4 blocks, and orthogonal transformation is done in units of 4×4 blocks. After individual coefficients are quantized, the coefficients except for the DC component representing their average value are used as 15-dimensional vectors, and are compared with vectors stored in a predetermined code book to select the closest ones. On the other hand, the DC component is quantized to M bits, and the quantized DC component and selected vector numbers are output as codes.

Furthermore, assume that the DC component is quantized to M=6 bits as the code length per block, and vector quantization can be done selecting one of 10 bits, 9 bits, 8 bits, and 7 bits. Note that the code book of the fifth embodiment is determined using the LBG algorithm described in the second embodiment. Reference numeral 1208 denotes a code buffer for storing the output from the limited color region coding unit 1205. Reference numeral 1209 denotes a selector for selecting the input source in accordance with an instruction from the CPU 1115.

The details and operations of the individual elements of the image processing apparatus of the fifth embodiment will be described in turn below.

Prior to processing, the CPU 1115 clears the contents of a frame memory 203 to zero. Furthermore, the CPU 1115 selects a binarizer 202 as the output of the selector 1201. Subsequently, the user (not shown) inputs a target code length $L_T$ at a code length designation unit 1106. Furthermore, a monochrome multi-valued image is read an image input device 200 to the binarizer 202 via the selector 1201 in accordance with the user's instruction. The read monochrome multi-valued image data is binarized by the binarizer 202 by comparing it with a threshold value. If the input value is larger than the threshold value, i.e., if it is closer to white, "0" is output; if the input value is smaller than the threshold value, i.e., if it is closer to black, "1" is output. The binarization result is stored in the frame memory 203.

After binary image data for one frame is stored in the frame memory 203, the CPU 1115 reads out the binary image data from the frame memory 203 and inputs it to the region segmentation unit 1204. In the region segmentation unit 1204, the readout binary image data is input to the region segmenter 122 and the segmentation results are stored in the buffer 123. The region information shaper 124 classifies the segmentation results into region information of limited color regions and region information of continuous gradation regions, and stores the region information of the limited color regions and then region information of the continuous gradation regions from the start address of the region information memory 125.

The CPU 1115 then selects the limited color region coding unit 1205 as the input source of the selector 1209. Subsequently, the CPU 1115 sequentially reads out the region information stored in the region information memory 125, reads out the corresponding binary image data from the frame memory 203 in units of pixels in accordance with the readout region information, and processes them using the limited color region coding unit 1205.

Note that the detailed arrangement of the limited color region coding unit 1205 used in the fifth embodiment is the same as that of the limited color region coding unit 1204 shown in FIG. 7 of the second embodiment, and a detailed description thereof will be omitted.

The operation of the limited color region coding unit 1205 will be described below.

Prior to the processing, the CPU 1115 initializes an address comparator 222 and MMR encoder 223. Also, the CPU 1115 clears the code buffer 1208. Subsequently, the CPU 1115 inputs the positions and sizes of all the continuous gradation regions from the region information memory 125 to the address comparator 222 via a terminal 220. After that, the CPU 1115 sequentially reads out pixel data of the binary image data from the frame memory 203. If the read pixel data falls outside the continuous gradation region, the address comparator 222 directly outputs an input value.

However, if the read pixel data is included in the continuous gradation region, the comparator 222 outputs "0". The output from the address comparator 222 is MMR-encoded by the MMR encoder 223, and is output via a terminal 224. The output code is stored in the code buffer 1208.

The CPU 1115 then selects the continuous gradation region coding unit 1207 as the output destination of the selector 1201, and the code buffer 1208 as the input source of the selector 1209. Furthermore, the CPU 1115 starts the coding selection unit 1206.

The detailed arrangement of the coding selection unit 1206 of the fifth embodiment will be described below with reference to FIG. 21.

Figure 21:
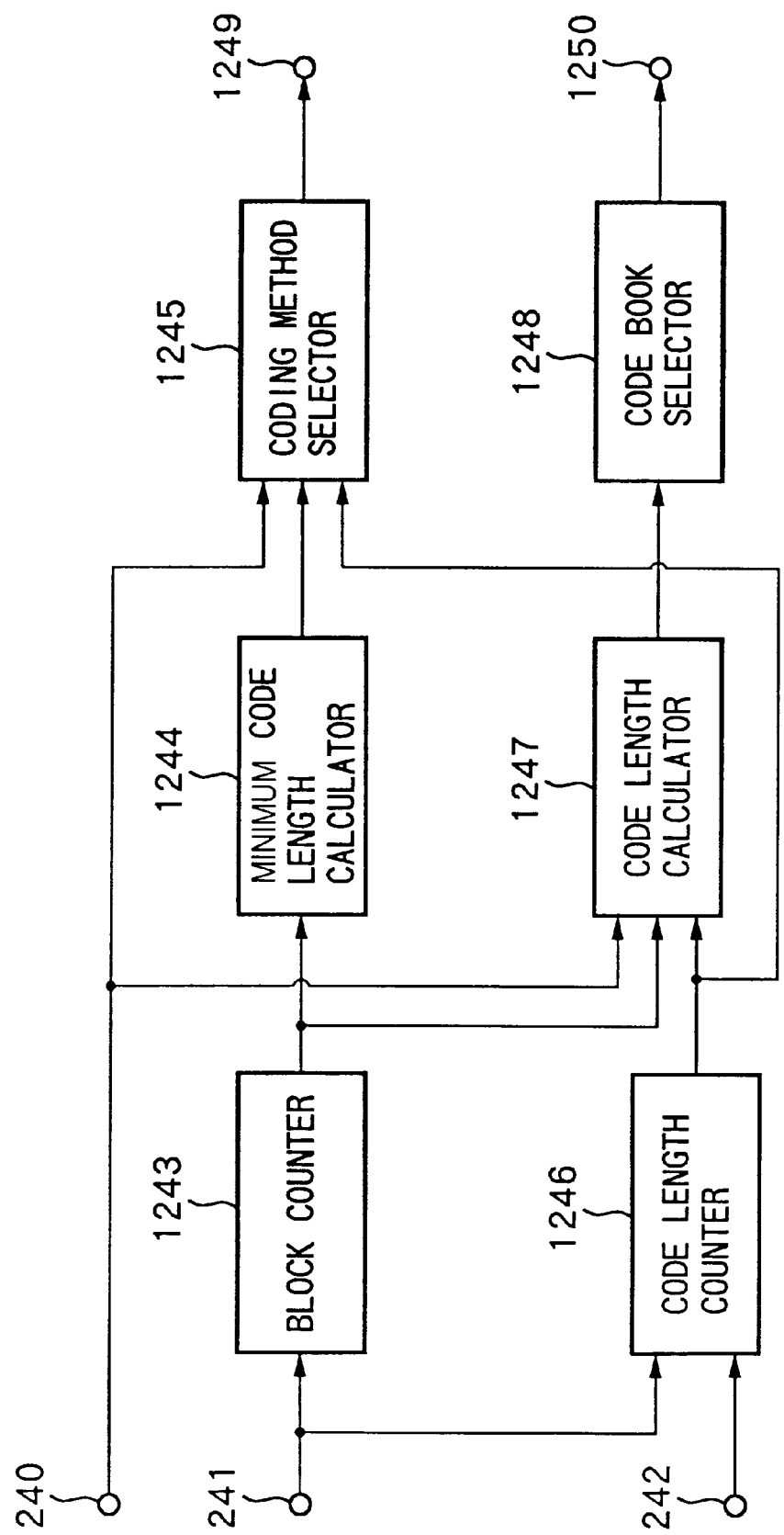
FIG. 21 is a detailed block diagram showing the arrangement of a coding selection unit according to the fifth embodiment of the present invention.

FIG. 21 is a detailed block diagram showing the arrangement of the coding selection unit according to the fifth embodiment of the present invention.

Referring to FIG. 21, reference numeral 240 denotes a terminal for receiving a target code length $L_T$ from the code length designation unit 1106. Reference numeral 241 denotes a terminal for receiving region information from the region information memory 125 in the region segmentation unit 1204. Reference numeral 242 denotes a terminal for receiving a code output from the limited color region coding unit 1205. Reference numeral 1243 denotes a block counter for counting the number of pixel blocks to be vector-encoded from the input region information. Reference numeral 1244 denotes a minimum code length calculator for calculating a minimum code length ($L_{min}$) required for coding all the continuous gradation regions when coding is done while switching the coding method in units of regions. Reference numeral 1245 denotes a coding method selector for determining, based on the target code length $L_T$ and the minimum code length $L_{min}$, full-frame coding for vector-encoding the entire frame of the input monochrome multi-valued image data or coding in units of regions of the image data segmented into regions (i.e., a method of MMR-encoding limited color regions, and vector-encoding continuous gradation regions).

Reference numeral 1246 denotes a code length counter for counting the total code length of the obtained codes. Note that $C_T$ represents the contents of the code length counter 1246. Reference numeral 1247 denotes a code length calculator for calculating the continuous gradation region target code length. Reference numeral 1248 denotes a code book selector for generating a code book selection code used for switching to a code book for vector coding suited to the continuous gradation region target code length. Reference numeral 1249 denotes a terminal for outputting the code book selection code generated by the code book selector 1245 to the continuous gradation region coding unit 1207.

The operation of the coding selection unit 1206 will be described below.

The CPU 1115 inputs the data volume of the region information stored in the region information memory 125 to the code length counter 1246 via the terminal 241, and stores its value as $C_T$. The CPU 1115 counts the code length of codes stored in the code buffer 1208 via the terminal 242 after MMR coding and adds it to $C_T$.

Subsequently, the CPU 1115 enables the block counter 1243 to read out the region information stored in the region information memory 125 and to count the numbers of blocks included in the individual continuous gradation regions on the basis of the sizes of the continuous gradation regions in the readout region information, thus obtaining a sum total $B_T$ of the numbers of blocks. After that, the CPU 1115 operates the minimum code length calculator 1244. In the continuous gradation region coding unit 1207, if $C_{min}$ represents the minimum code length per block, a total of 13 bits, i.e., 6 bits for the average value and 7 bits for the vector quantization result are the minimum code length. The minimum code length calculator 1244 calculates the minimum code length $L_{min}$ using the following equation on the basis of the sum total $B_T$ of the numbers of blocks and the minimum code length $C_{min}$ per block:

$$L_{min}=C_{min}\times B_T \qquad (12)$$

The coding method selector 1245 determines full-frame coding or coding in units of regions on the basis of the minimum code length $L_{min}$, the contents $C_T$ of the code length counter 1246, and the target code length $L_T$. That is, the selector 1245 selects full-frame coding if $(L_{min}+C_T)>L_T$; it selects coding in units of regions if $(L_{min}+C_T)\leq L_T$.

A case will be explained below wherein the coding method selector 1245 selects full-frame coding.

The output from the coding method selector 1245 is input to the CPU 1115 and the region segmentation unit 1204 via the terminal 1249. Since full-frame coding is selected, the region segmentation unit 1204 clears the contents of the region information memory 125, i.e., to clear the segmented regions.

The CPU 1115 enables the transmission unit 1114 to execute communication protocols, thus preparing for data transfer. Then, the CPU 1115 transmits a code indicating that full-frame coding is selected (the output from the coding selection unit 1206) and the contents of the region information memory 125 from the transmission unit 1114 via the selector 1209.

The CPU 1115 then starts the coding selection unit 1206. The CPU 1115 enables the block counter 1243 and obtains the number $B_T$ of blocks from the size of the monochrome multi-valued image data. The code length calculator 1247 calculates a code length $BR_T$ per block given by equation (4) above on the basis of the target code length $L_T$, the number $B_T$ of blocks from the block counter 1243, and the contents $C_T$ of the code length counter 1246.

After the code length $BR_T$ per block is obtained, the code book selector 1248 generates a code book selection code as a signal for selecting a code book that can attain coding with the number of bits which is equal to or smaller than and closest thereto ($BR_T-M$). The code book selector 1248 sets the code book selection code at "0" if $10\leq(BR_T-M)$. The code book selector 1248 sets the code book selection code at "1" if $9\leq(BR_T-M)<10$. The code book selector 1248 sets the code book selection code at "2" if $8\leq(BR_T-M)<9$. Furthermore, the code book selector 1248 sets the code book selection code at "3" if $(BR_T-M)<8$. The code book selection code is output from the terminal 1250.

After the code book selection code is determined, the CPU 1115 transmits the code book selection code via the transmission unit 1114. The CPU 1115 then switches the input source of the selector 1209 to the continuous gradation region coding unit 1207. After that, the image input device 200 operates again to read a monochrome multi-valued image. The read monochrome multi-valued image data is input to the continuous gradation region coding unit 1207.

Note that the detailed arrangement of the continuous gradation region coding unit 1207 used in the fifth embodiment is the same as that of the continuous gradation region coding unit 206 shown in FIG. 9 of the second embodiment, and a detailed description thereof will be omitted.

The operation of the continuous gradation region coding unit 1207 will be explained below.

A selector 269 selects a code book memory 265 if the code book selection code input from a terminal 260 is "0"; a code book memory 266 if it is "1"; a code book memory 267 if it is "2"; or a code book memory 268 if it is "3", and inputs the contents of the selected code book memory to a code book comparator 270.

Pixel data input to the continuous gradation region coding unit 1207 are supplied to a block generator 262. The block generator 262 generates 4×4 blocks in units of neighboring pixel data on the basis of the monochrome multi-valued image data. The generated 4×4 blocks are input in turn to an orthogonal transformer 263 and are subjected to Hadamard transformation to obtain 4×4 orthogonal transformation coefficients.

The 16 transformation coefficients obtained by the orthogonal transformer 263 are respectively quantized by a quantizer 264. Of the obtained 16 quantization results, upper M bits are selected as a DC component, and are output as a code from a terminal 271. The 15 remaining quantization results are input to the code book comparator 270. The code book comparator 270 generates vectors from the input 15 quantization results, selects vectors which have highest similarities to the generated vectors from those in the code book input from the selector 269, and outputs the numbers of the selected vectors as codes from the terminal 271. The output quantization result of the DC component and vector numbers are transmitted from the transmission unit 1114 via the selector 1209.

Upon completion of reading of monochrome multi-valued image data at the image input device 200, coding of all the pixel data of monochrome multi-valued image data, and transmission of codes, all the operations end.

Next, a case will be explained below wherein the coding method selector 1245 selects coding in units of regions.

The output from the coding method selector 1245 is input to the CPU 1115 via the terminal 1249. The CPU 1115 enables the transmission unit 1114 to execute communication protocols, thus preparing for data transfer. Then, the CPU 1115 transmits a code indicating that coding is switched in units of regions (the output from the coding selection unit 1206) and the contents of the region information memory 125 from the transmission unit 1114 via the selector 1209.

Subsequently, the CPU 1115 starts the coding selection unit 1206. The CPU 1115 enables the block counter 1243 to obtain the number $B_T$ of blocks in the continuous gradation regions on the basis of the positions and sizes of the continuous gradation regions obtained from the region information memory 125. The code length calculator 1247 calculates the code length $BR_T$ per block given by equation (4) above on the basis of the target code length $L_T$, the number $B_T$ of blocks from the block counter 1243, and the contents $C_T$ of the code length counter 1246. After the code length $BR_T$ per block is obtained, the code book selector 1248 generates a code book selection code as a signal for selecting a code book that can attain coding with the number of bits which is equal to or smaller than and closest thereto ($BR_T$−M). The generated code book selection code is output from the terminal 1250.

Upon determination of the code book selection code, the CPU 1115 transmits the code book selection code via the transmission unit 1114. After that, the CPU 1115 enables the image input device 200 again to read a monochrome multi-valued image. The read multi-valued image data is input to the continuous gradation region coding unit 1207.

The continuous gradation region coding unit 1207 executes coding, as described above.

Upon completion of reading of monochrome multi-valued image data at the image input device 200, coding of all the pixel data of monochrome multi-valued image data, and transmission of codes, all the operations end.

In the fifth embodiment, the continuous gradation coding unit 1207 shown in FIG. 20 has the arrangement shown in FIG. 9 of the second embodiment, but may have an arrangement shown in FIG. 10 of the second embodiment. With this arrangement, the apparatus need not have a plurality of code book memories, and can be realized by a small memory capacity.

The outline of the processing executed in the fifth embodiment will be explained below with reference to FIG. 22.

Figure 22:
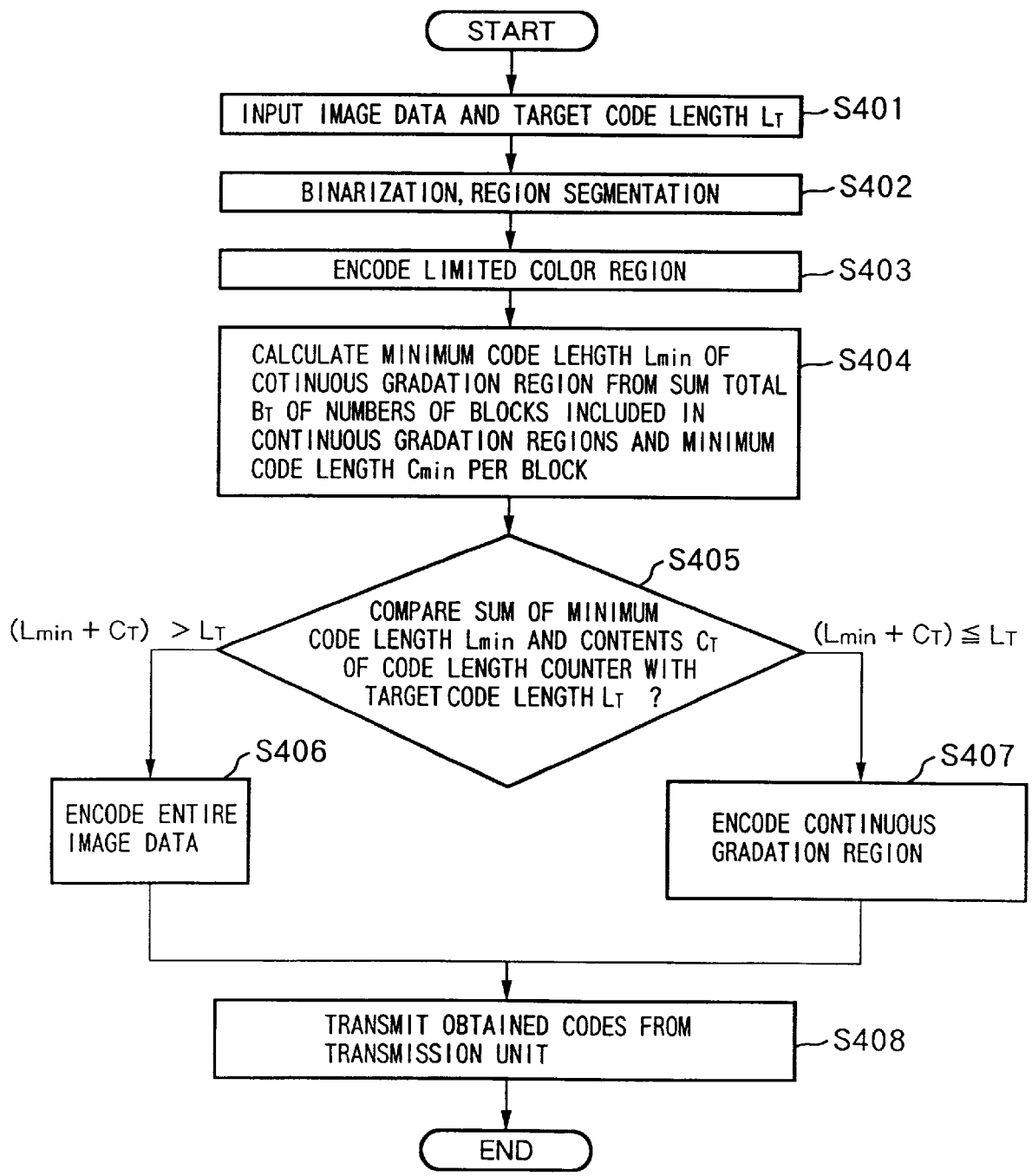
FIG. 22 is a flow chart showing the flow of processing executed in the fifth embodiment of the present invention.
Figure 23:
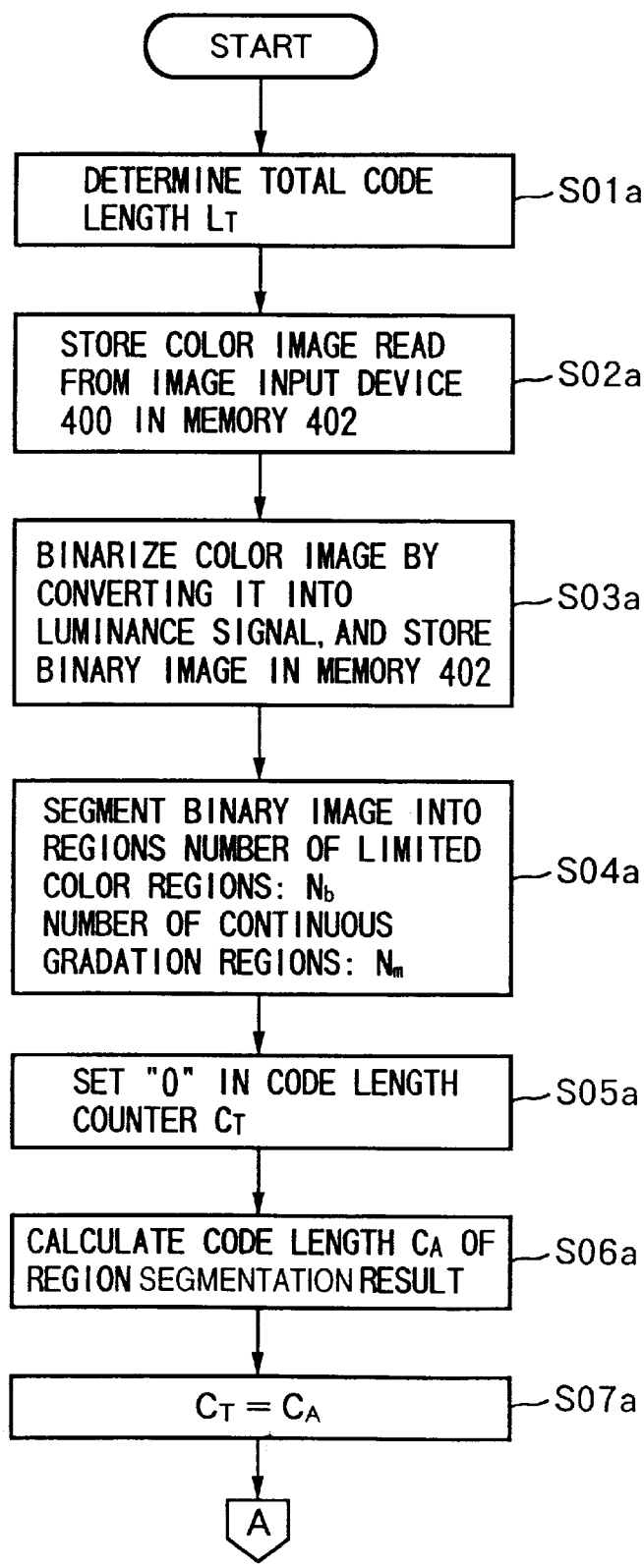
FIG. 23 is a flow chart showing the flow of processing executed in the sixth embodiment of the present invention.
Figure 24:
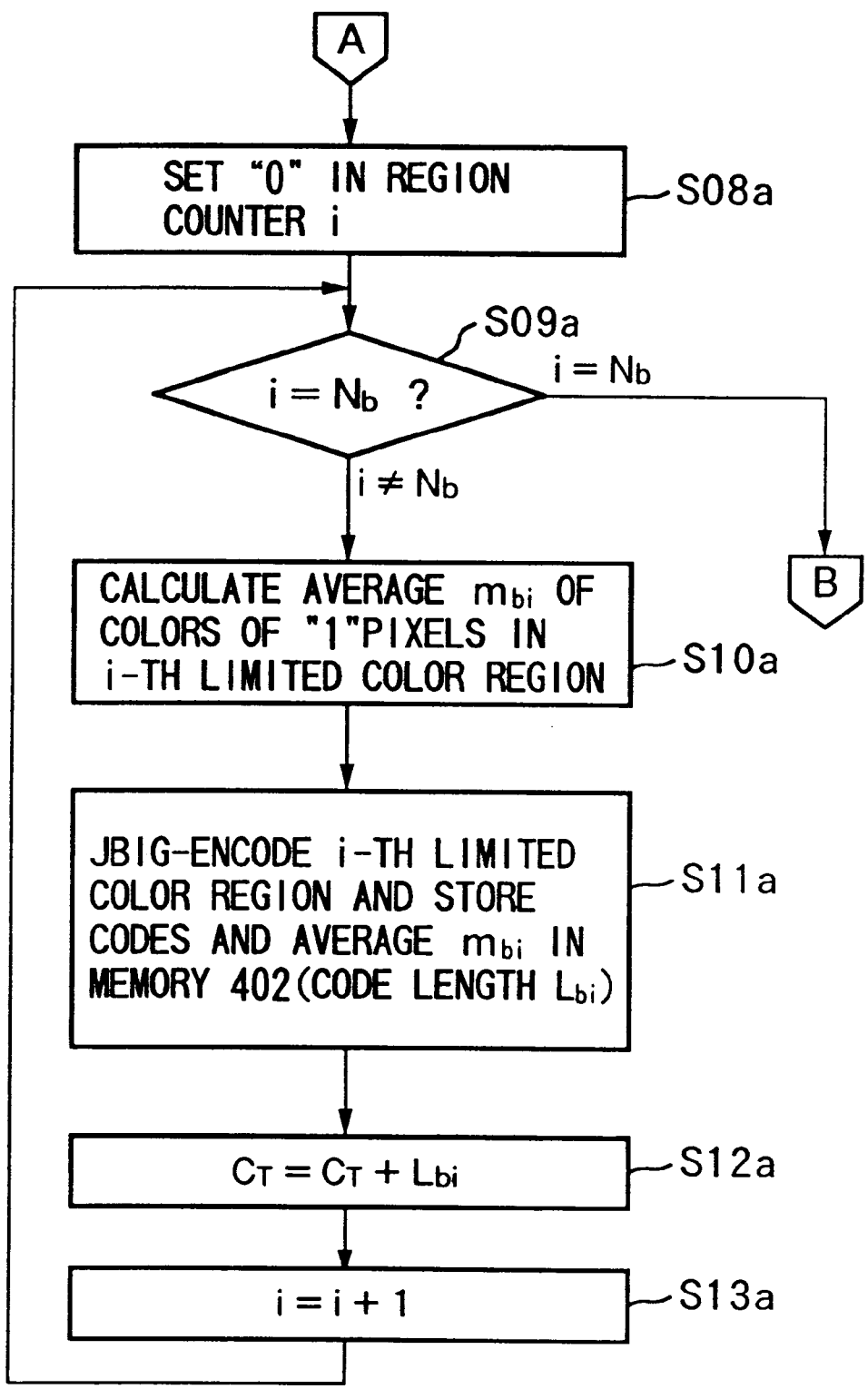
FIG. 24 is a flow chart showing the flow of processing executed in the sixth embodiment of the present invention.
Figure 25:
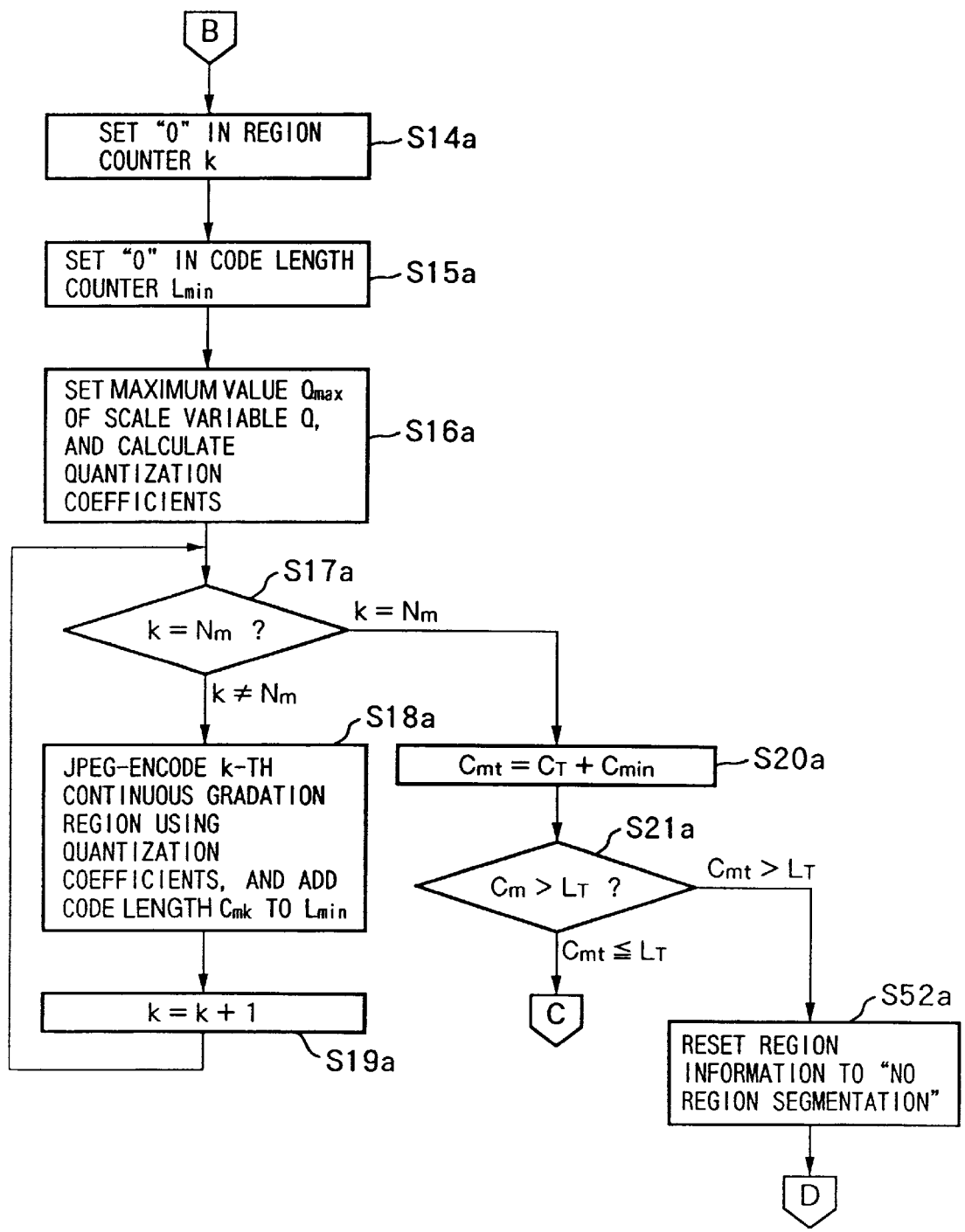
FIG. 25 is a flow chart showing the flow of processing executed in the sixth embodiment of the present invention.
Figure 26:
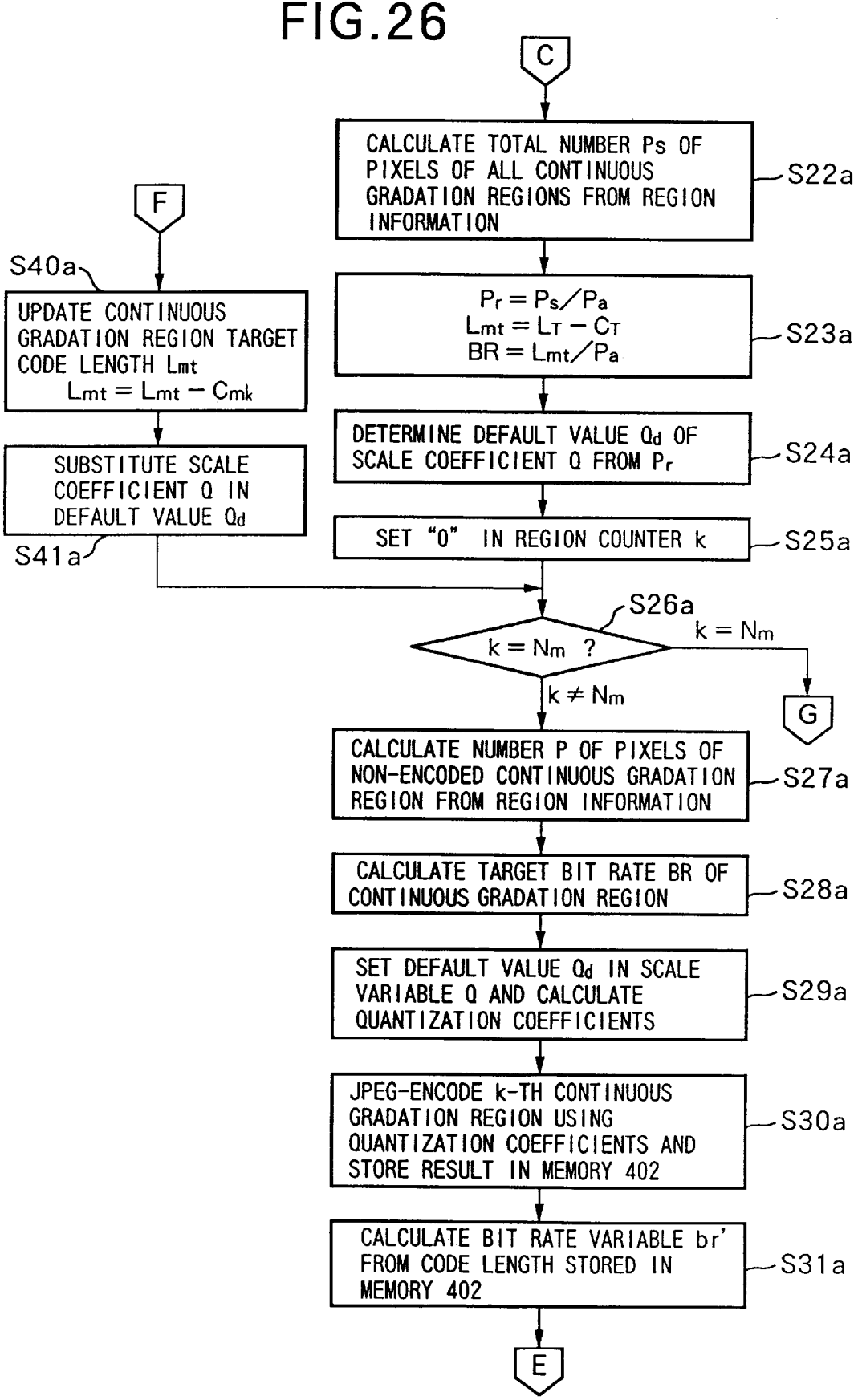
FIG. 26 is a flow chart showing the flow of processing executed in the sixth embodiment of the present invention.
Figure 27:
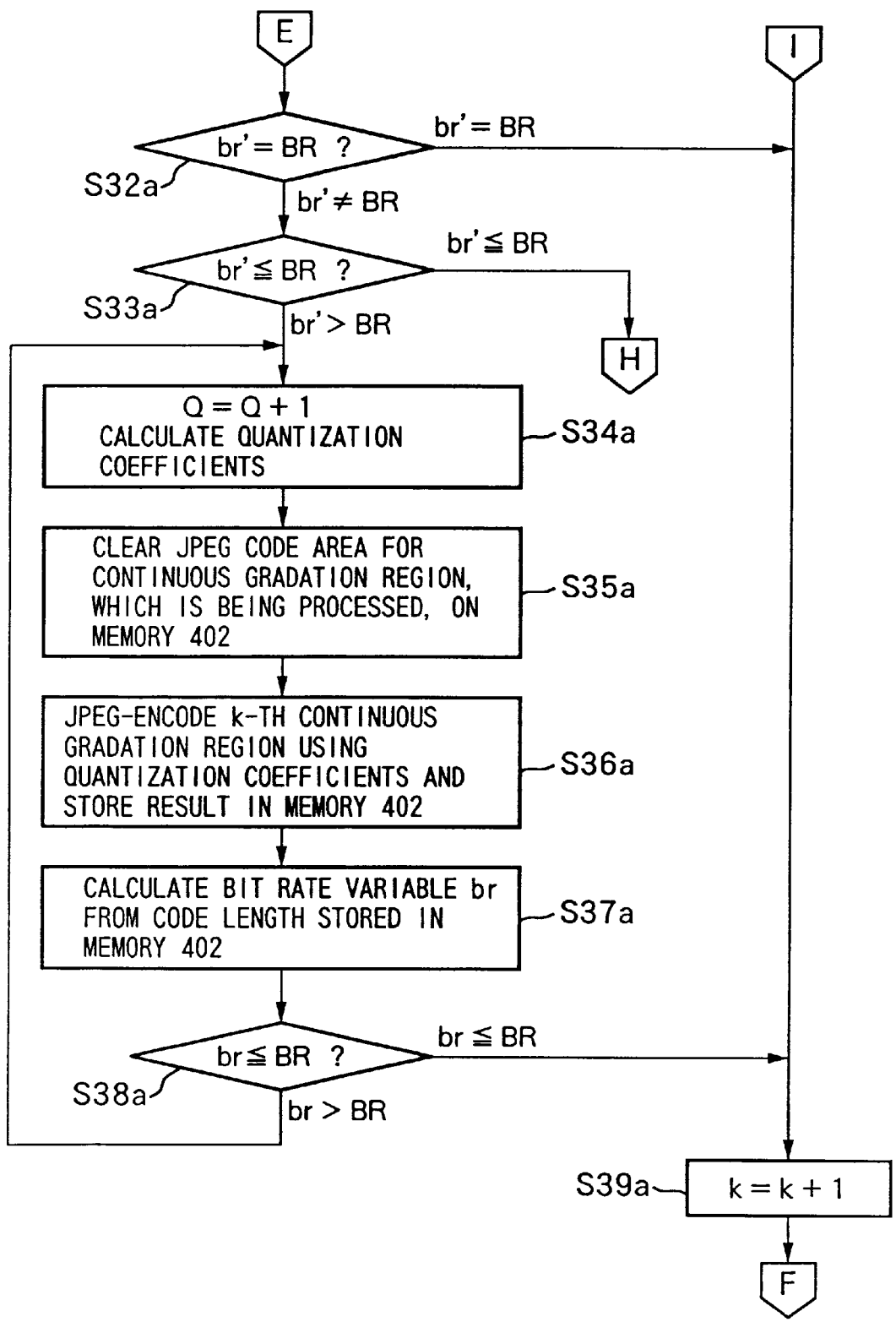
FIG. 27 is a flow chart showing the flow of processing executed in the sixth embodiment of the present invention.
Figure 28:
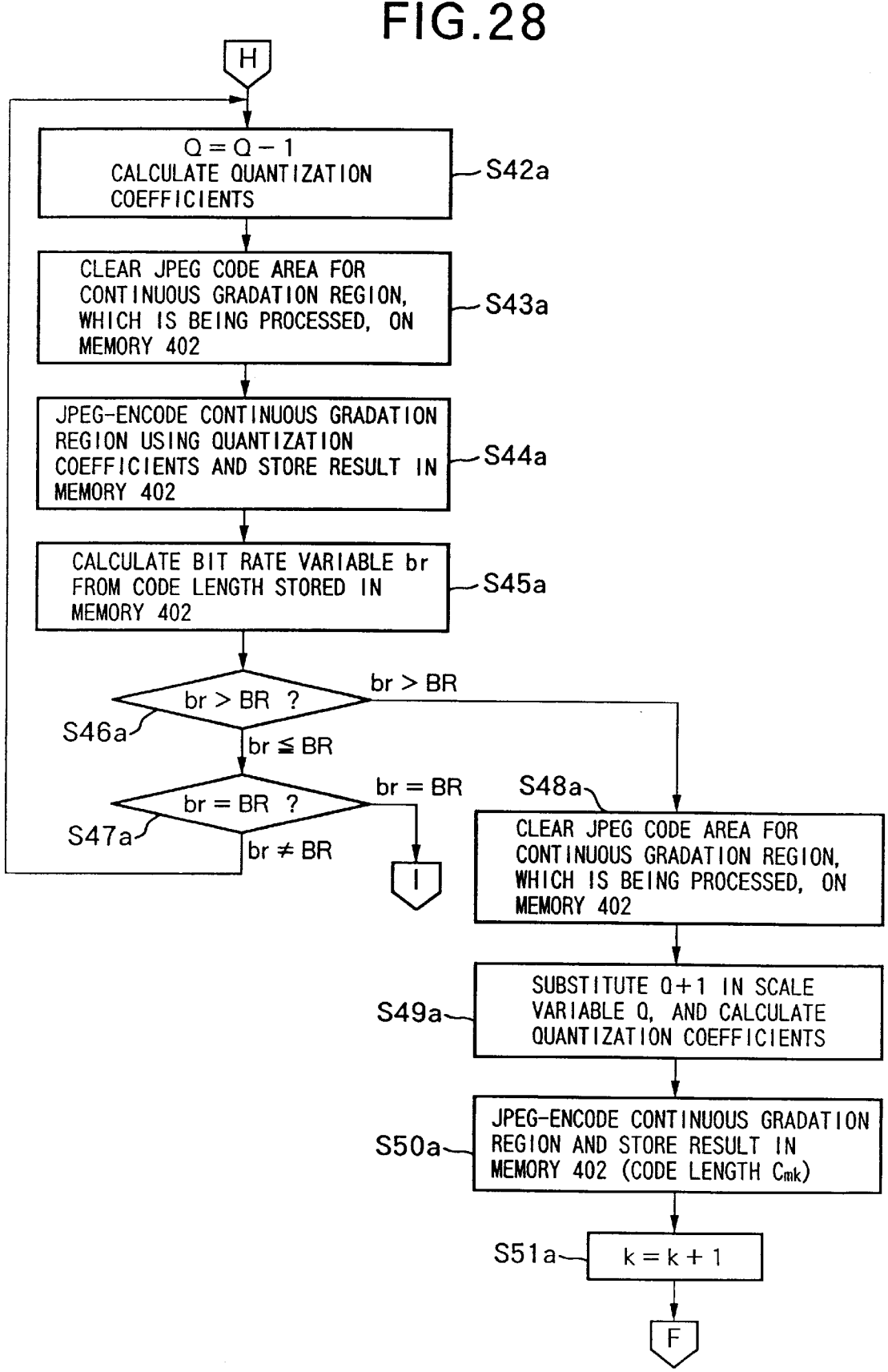
FIG. 28 is a flow chart showing the flow of processing executed in the sixth embodiment of the present invention.
Figure 29:
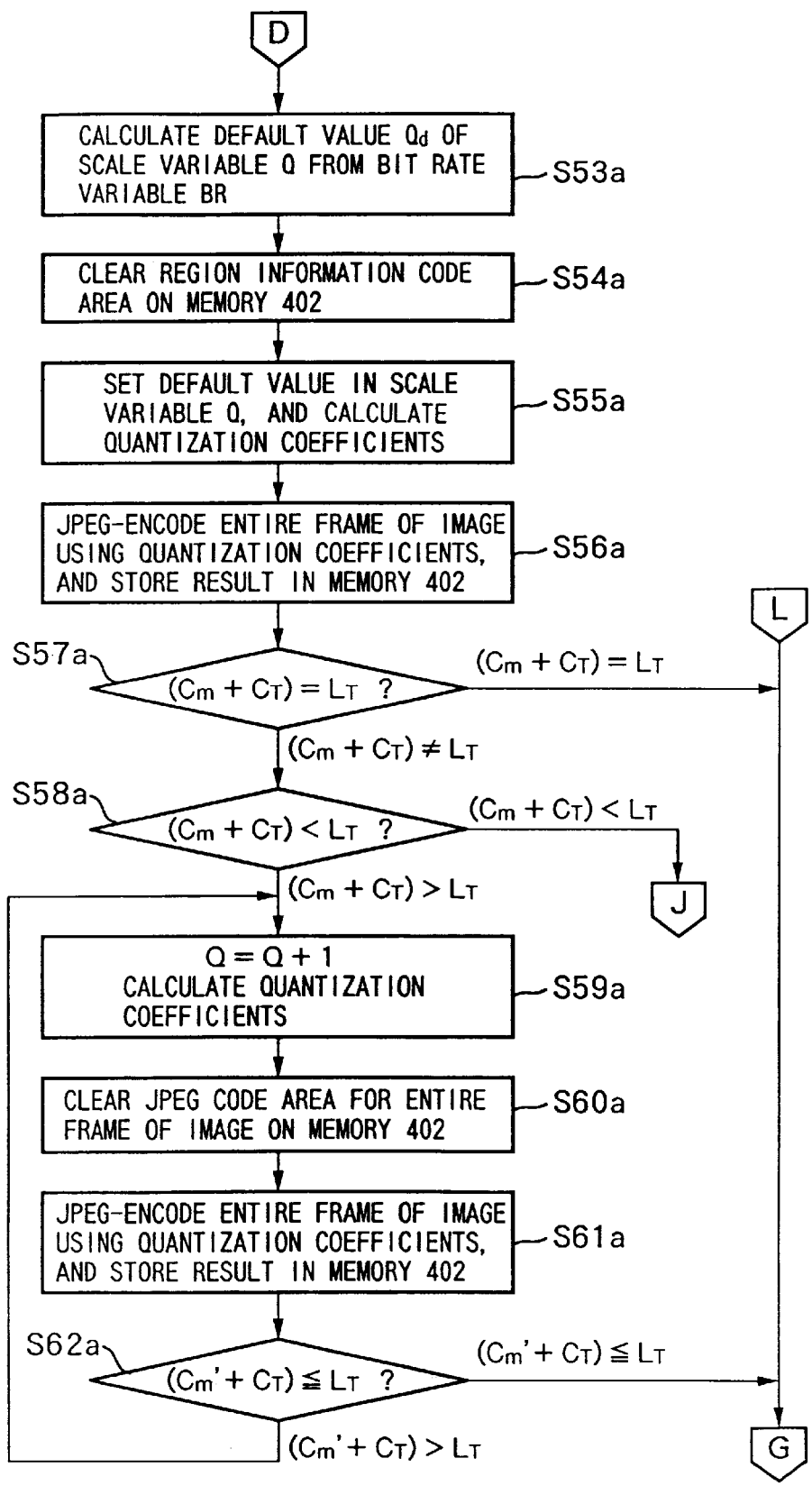
FIG. 29 is a flow chart showing the flow of processing executed in the sixth embodiment of the present invention.
Figure 30:
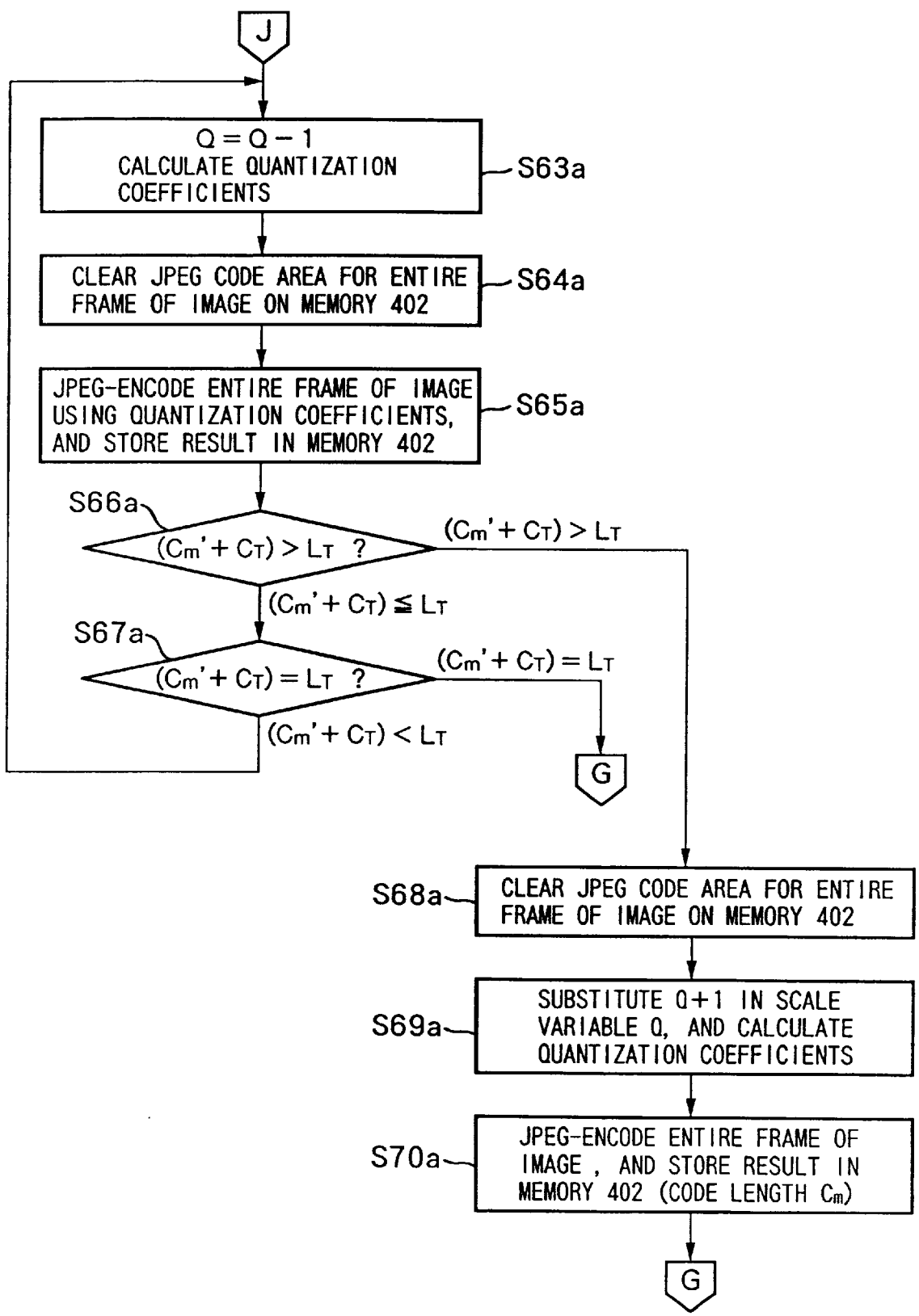
FIG. 30 is a flow chart showing the flow of processing executed in the sixth embodiment of the present invention.
Figure 31:
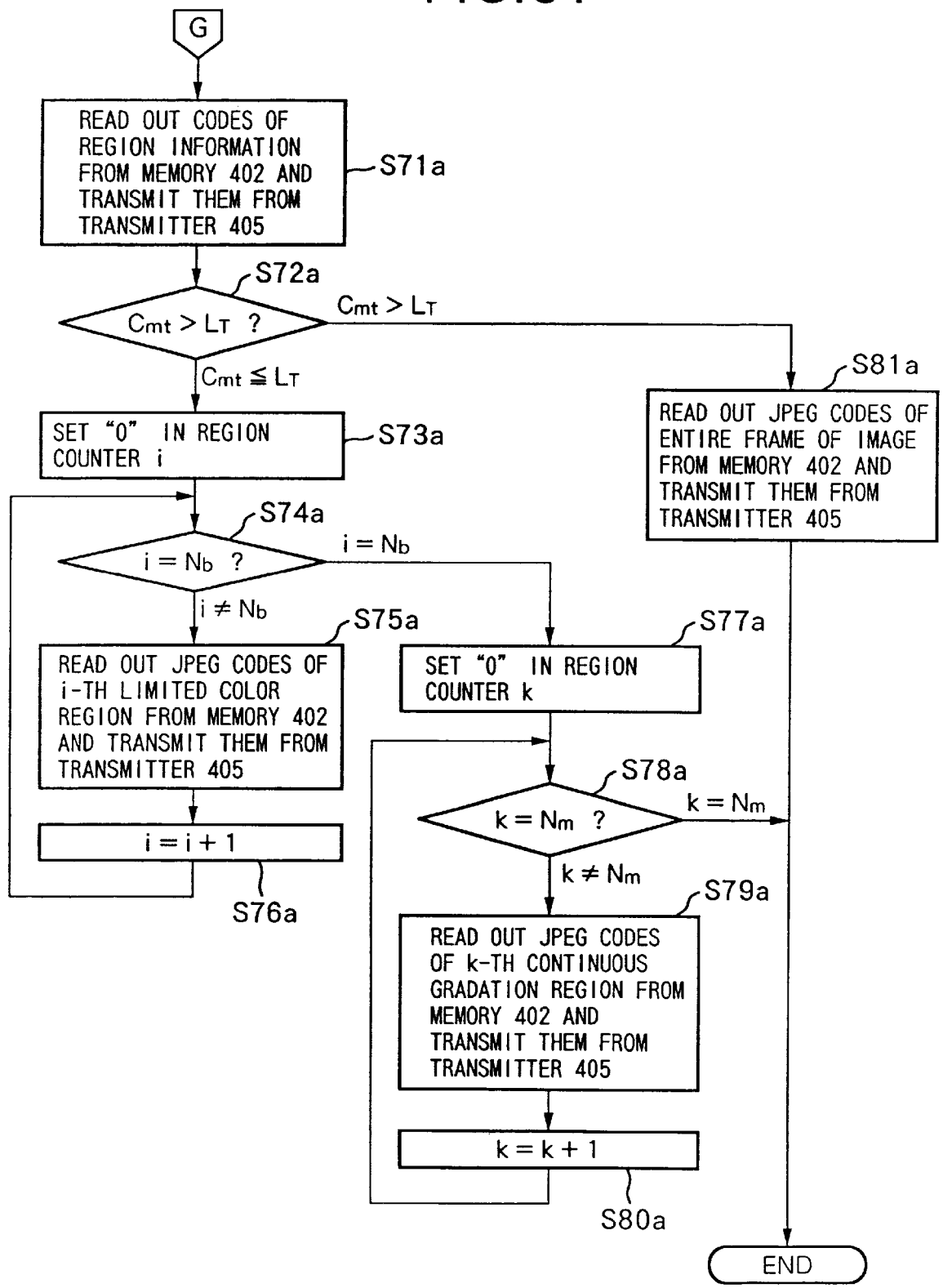
FIG. 31 is a flow chart showing the flow of processing executed in the sixth embodiment of the present invention.

FIG. 22 is a flow chart showing the flow of the processing executed in the fifth embodiment of the present invention.

The image input device 200 reads a monochrome multi-valued image. A desired target code length $L_T$ is input at the code length designation unit 1106 (step S401). The binarizer 202 binarizes the monochrome multi-valued image data, and stores the binarization result in the frame memory 203. Subsequently, the binary image data stored in the frame memory 203 is read out, and is segmented into regions by the region segmentation unit 1204 (step S402). Of the segmented regions, binary image data corresponding to the limited color regions and stored in the frame memory 203 are MMR-encoded by the limited color region coding unit 1205 (step S403). The coding selection unit 1206 calculates the minimum code length $L_{min}$ of the continuous gradation region on the basis of the sum total $B_T$ of the numbers of blocks obtained from the block counter 1243, and the minimum code length $C_{min}$ per block (step S404).

The sum of the minimum code length $L_{min}$ and the contents $C_T$ of the code length counter 1246 is compared with the target code length $L_T$ (step S405). If $L_{min}+C_T$ is larger than $L_T$, the continuous gradation region coding unit 1207 vector-encodes the entire input monochrome multi-valued image data (step S406). On the other hand, if $L_{min}+C_T$ is equal to or smaller than $L_T$, the continuous gradation region coding unit 1207 vector-encodes the continuous gradation regions (step S407). The obtained codes are transmitted from the transmission unit 1114 (step S408).

In the above description of the fifth embodiment, the image input from the image input device 200 is assumed to be a monochrome multi-valued image. However, the present invention is not limited to such specific type of image, but may be applied to a color multi-valued image. Also, the coding methods of image data are not limited to those described above. Furthermore, the memory arrangements and the like are not limited to specific ones described above, and processing in units of a plurality of lines may be done.

As described above, according to the fifth embodiment, since monochrome multi-valued image data is coded by adjusting the code length in each continuous gradation region, a code with a code length that the user desired can be obtained. Also, since the minimum code length in the continuous gradation region is calculated, the minimum code length upon coding in units of regions is calculated, and these code lengths are compared with the target code length, coding beyond the desired code length can be avoided.

<Sixth Embodiment>

In the sixth embodiment, the processing to be described below is executed using the same elements as those in the image processing apparatus described earlier with reference to FIG. 12 in the third embodiment.

An example wherein the user directs to read an original image, segment the read image into regions, encode the segmented regions, and transmit the code from a transmitter 405 will be explained below with reference to the flow charts in FIGS. 23 to 31. For the sake of simplicity, JBIG coding is used as a coding method of encoding each limited color region, and JPEG coding is used as a coding method of encoding each continuous gradation region.

FIGS. 23 to 31 are flow charts showing the flows of the processing executed in the sixth embodiment of the present invention.

The user sets an original on an image input device 400 and inputs a desired total code length $L_T$ at a terminal device 403 (step S01a). After that, the CPU 401 starts the image processing apparatus. The CPU 401 reads a color multi-valued image from the image input device 400, and stores it in a memory 402 (step S02a).

The CPU 401 converts the color multi-valued image data stored in the memory 402 into a luminance signal, compares the luminance signal value with a threshold value to generate binary image data, and stores the binary image data in the memory 402 (step S03a). At this time, if the luminance signal is smaller than the threshold value, i.e., if it is closer to black, "1" is output; if the luminance signal is larger than the threshold value, i.e., if it is closer to white, "0" is output. The generated binary image data is segmented into regions. With this processing, regions are extracted, image data is segmented into regions, attributes representing the contents are detected in units of regions, the regions are classified into region information of limited color regions and region information of continuous gradation regions, and the positions, sizes, and attributes of the regions are stored in the memory 402 (S04a). Note that $N_b$ represents the number of limited color regions extracted at that time, and $N_m$ the number of continuous regions.

Subsequently, an internal code length counter $C_T$ (not shown) of the CPU 401 is reset to zero (step S05a). The CPU 401 calculates a code length $C_A$ required for transmitting the region information in the memory 402 from the transmitter 405 (step S06a). Then, $C_A$ is substituted into the code length counter $C_T$ (step S07a).

Next, JBIG coding is done in units of limited color regions. Initially, "0" is set in an internal region counter i (not shown) of the CPU 401 (step S08a). An average value $m_{bi}$ of color multi-valued image data corresponding to the pixel value "1" of the binary image data is calculated with reference to binary image data and color multi-valued image data in the i-th limited color region (step S10a). Binary image data in the i-th limited color region is JBIG-encoded, and the encoded data is stored in the memory 402 together with the average value $m_{bi}$ (step S11a). Let $L_{bi}$ be the sum of the data volume of the average value $m_{bi}$ at that time and the code length of JBIG coding. The sum $L_{bi}$ of the code lengths is added to the code length counter $C_T$ (step S12a). The region counter i is incremented by "1" (step S13a).

If the region counter i is not equal to $N_b$, steps S10a to S13a are repeated (step S09a).

If the region counter i becomes equal to $N_b$, a minimum code length generated in each continuous gradation region is calculated. Initially, "0" is set in an internal region counter k (not shown) of the CPU 401 (step S14a). Also, "0" is set in an internal code length counter $L_{min}$ (not shown) of the CPU 401 (step S15a). A maximum value $Q_{max}$ of a scale coefficient Q is set in the scale coefficient Q to calculate quantization coefficients (step S16a). Subsequently, the k-th continuous gradation region is read out from the memory 402, and is JPEG-encoded using the calculated quantization coefficients. After that, a code length $C_{mk}$ of the obtained codes is calculated, and is added to the code length counter $L_{min}$ (step S18a). The region counter k is incremented by "1" to calculate the code length of the next continuous gradation region (step S19a).

If the value of the region counter k becomes equal to the number $N_m$ of continuous gradation regions, i.e., calculations of the code lengths $C_{mk}$ of all the continuous gradation regions and addition of them to the code length counter $L_{min}$ are complete (step S17a), the sum of the code length counters $C_T$ and $L_{min}$, i.e., a minimum code length $C_{mt}$, is calculated (step S20a). The minimum code length $C_{mt}$ is compared with the target code length $L_T$. If the minimum code length $C_{mt}$ is larger than the target code length $L_T$, full-frame coding is selected; otherwise, coding in units of regions is selected (step S21a).

A case will be explained below wherein coding in units of regions is selected in step S21a.

The total number $P_s$ of pixel data in all the continuous gradation region is calculated based on region information associated with the continuous gradation regions and stored in the memory 402 (step S22a). A continuous gradation region occupation ratio $P_r$ and target bit rate BR are calculated (step S23a). The continuous gradation region occupation ratio $P_r$ is calculated based on the total number $P_s$ of pixels and the total number $P_a$ of pixels of the color multi-valued image data by:

$$P_r = P_s/P_a \tag{13}$$

A target code length $L_{mt}$ of the continuous gradation region is calculated by:

$$L_{mt} = L_T - C_T \tag{14}$$

Furthermore, the target bit rate BR of the continuous gradation region is calculated by:

$$BR = L_{mt}/P_s \tag{15}$$

A default value $Q_d$ of the scale coefficient is determined based on the continuous gradation region occupation ratio $P_r$ and the target bit rate BR using (step S24a):

$$Q_d = Q_a \times \alpha P_r \times \beta BR \tag{16}$$

(where $Q_a$, $\alpha$, and $\beta$ are constants.)

Subsequently, "0" is set in the region counter k (step S25a).

JPEG coding is then done in units of continuous gradation regions. Region information of each non-JPEG-encoded region (the k-th and subsequent continuous gradation regions) stored in the memory 402 is read out, and the number P of pixels included in that region is calculated based on its size (step S27a). Furthermore, a target bit rate BR of the k-th continuous gradation region is calculated according to the following equation (17) (step S28a):

$$BR = L_{mt}/P \tag{17}$$

The default value $Q_d$ is set in a scale variable Q to calculate quantization coefficients (step S29a). The k-th continuous gradation region is JPEG-encoded using the calculated quantization coefficients, and the encoded result is stored in the memory 402 (step S30a). A bit rate variable br' is calculated from a code length $C_{mk}$ of the JPEG codes stored in the memory 402 and the number $P_k$ of pixel data in the continuous gradation region by (step S33a):

$$br'=C_{mk}/P_k \qquad (18)$$

If the bit rate variable br' is equal to the target bit rate BR (step S32a), the region counter k is incremented by "1" (step S39a). Furthermore, the target code length $L_{mt}$ of the continuous gradation region is updated using (step S40a):

$$L_{mt}=L_{mt}-C_{mk} \qquad (19)$$

Moreover, the scale coefficient Q used at that time is set as the default value $Q_d$ to process the next continuous gradation region (step S41a).

If the bit rate variable br' is larger than the target bit rate BR (steps S32a and S33a), the scale variable Q is incremented by "1" to calculate quantization coefficients (step S34a). The JPEG code area on the memory 402 is cleared (step S35a) The k-th continuous gradation region is JPEG-encoded using the calculated quantization coefficients again, and the encoded result is stored in the memory 402 (step S36a). A bit rate variable br as a code length per pixel data is calculated from the code length $C_{mk}$ of the JPEG codes stored in the memory 402 and the number $P_k$ of pixel data in the continuous gradation region by (step S37a):

$$br=C_{mk}/P_k \qquad (20)$$

If the bit rate variable br is equal to or smaller than the target bit rate BR (step S38a), the region counter k is incremented by "1" (step S39a). Furthermore, the target code length $L_{mt}$ of the continuous gradation region is updated according to equation (19) above (step S40a).

Moreover, the scale coefficient Q used at that time is set as the default value $Q_d$ to process the next continuous gradation region (step S41a).

If the bit rate variable br is larger than the target bit rate BR (step S38a), the flow advances to step S34a. In step S34a, the scale variable Q is incremented by "1" to calculate quantization coefficients again, thus repeating the processing.

If the bit rate variable br' is smaller than the target bit rate BR (step S33a), the scale variable Q is decremented by "1" to calculate quantization coefficients (step S42a). The JPEG code area on the memory 402 is cleared (step S43a). The k-th continuous gradation region is JPEG-encoded using the new quantization coefficients (the code length at that time is $C_{mk}$), and the encoded result is stored in the memory 402 (step S44a). The bit rate variable br is calculated from the code length $C_{mk}$ of the JPEG codes stored in the memory 402 and the number $P_k$ of pixel data in the continuous gradation region in accordance with equation (20) above (step S45a).

If the bit rate variable br is larger than the target bit rate BR (step S46a), the JPEG code area on the memory 402 is cleared (step S48a), and quantization coefficients for the k-th continuous gradation region are calculated again using the scale variable (Q+1) (step S49a). The k-th continuous gradation region is JPEG-encoded ((the code length at that time is $C_{mk}$), and the encoded result is stored in the memory 402 (step 50a).

After that, the region counter k is incremented by "1" (step S51a). Furthermore, the target code length $L_{mt}$ of the continuous gradation region is updated according to equation (19) above (step S40a).

Moreover, the scale coefficient Q used at that time is set as the default value $Q_d$ to process the next continuous gradation region (step S41a).

If the bit rate variable br is equal to the target bit rate BR (step S47a), the region counter k is incremented by "1" (step S39a). Furthermore, the target code length $L_{mt}$ of the continuous gradation region is updated according to equation (19) above (step S40a). Moreover, the scale coefficient Q used at that time is set as the default value $Q_d$ to process the next continuous gradation region (step S41a).

If the bit rate variable br is not equal to the target bit rate BR (step S47a), the flow advances to step S42a. In step S42a, the scale variable Q is decremented by "1" to calculate quantization coefficients again, thus repeating the processing.

If the region counter k has reached $N_m$ (step S26a), transmission from the transmitter 405 is done. Region information is read out from the memory 402 and is transmitted from the transmitter 405 (step S71a). Since the minimum code length $C_{mt}$ is equal to or smaller than the target code length $L_T$ (step S72a), the average values $m_{bi}$ of the colors of the limited color regions and JBIG codes are transmitted. First, "0" is set in the region counter i (step S73a). The average value of the colors of the i-th limited color region and JBIG codes (code length $L_{bi}$) are read out from the memory 402 and are transmitted from the transmitter 405 (step S75a). After that, the region counter i is incremented by "1" (step S76a). After the codes of all the limited color regions are transmitted (step S75a), the JPEG codes of the continuous gradation regions are transmitted. Initially, "0" is set in the region counter k (step S77a) The JPEG codes (code length $C_{mk}$) of the k-th continuous gradation region are read out from the memory 402 and are transmitted from the transmitter 405 (step S79a). The region counter k is incremented by "1" (step S80a). After the codes of all the continuous gradation regions are transmitted (step S78a), all the processing operations end.

A case will be explained below wherein full-frame coding is selected in step S21a.

Region information stored in the memory 402 is cleared to set the number of segmented regions at "0" (step S52a). A code length required for the region information at that time is substituted in the code length counter $C_T$. Furthermore, a target bit rate BR of the entire color multi-valued image data is calculated by:

$$BR=(L_T-C_T)/P_a \qquad (21)$$

A default value $Q_d$ of the scale coefficient is calculated from the target bit rate BR by:

$$Q_d=Q_a\times\beta BR \qquad (22)$$

Limited color region and continuous gradation region code areas on the memory 402 are cleared (step S54a). The default value $Q_d$ is set in the scale variable Q to calculate quantization coefficients (step S55a). The entire color multi-valued image data is JPEG-encoded using the calculated quantization coefficients, and the encoded result (code length $C_m$) is stored in the memory 402 (step S56a).

If the sum of the code length $C_m$ of the JPEG codes stored in the memory 402 and the code length counter $C_T$ is equal to the target code length $L_T$ (step S57a), region information is read out from the memory 402 first, and is transmitted from the transmitter 405 (step S71a). Since the minimum code length $C_{mt}$ is larger than the target code length $L_T$ (step S72a), the JPEG codes of the entire color multi-valued image data are transmitted from the transmitter 405 (step S81a). Upon completion of transmission of all the JPEG codes of the entire color multi-valued image data, all the processing operations end.

If the sum of the code length $C_m$ and the code length counter $C_T$ is larger than the target code length $L_T$ (step S58a), the scale variable Q is incremented by "1" to calculate quantization coefficients (step S59a). The JPEG code area on the memory 402 is cleared (step S60a). The entire color multi-valued image data is JPEG-encoded using the calculated quantization coefficients again, and the encoded result (code length $C_m'$), is stored in the memory 402 (step S61a).

If the sum of the code length $C_m'$ of the JPEG codes stored in the memory 402 and the code length counter $C_T$ is equal to or smaller than the target code length $L_T$ (step S62a), region information is read out from the memory 402 first, and is transmitted from the transmitter 405 (step S71a). Since the minimum code length $C_{mt}$ is larger than the target code length $L_T$ (step S72a), the JPEG codes of the entire color multi-valued image data are transmitted from the transmitter 405 (step S81a). Upon completion of transmission of all the JPEG codes of the entire color multi-valued image data, all the processing operations end.

If the sum of the code length $C_m'$ of the JPEG codes stored in the memory 402 and the code length counter $C_T$ is larger than the target code length $L_T$ (step S62a), the flow advances to step S59a. In step S59a, the scale variable Q is incremented by "1" to calculate quantization coefficients again, thus repeating the processing.

If the sum of the code length $C_m$ and the code length counter $C_T$ is smaller than the target code length $L_T$ (step S58a), the scale variable Q is decremented by "1" to calculate quantization coefficients (step S63a). The JPEG code area on the memory 402 is cleared (step S64a). The entire color multi-valued image data is JPEG-encoded again using the new quantization coefficients (the code length at that time is $C_m'$), and the encoded result is stored in the memory 402 (step S65a).

If the sum of the code length $C_m'$ of the JPEG codes stored in the memory 402 and the code length counter $C_T$ is larger than the target code length $L_T$ (step S66a), the JPEG code area on the memory 402 is cleared (step S68a). After that, quantization coefficients are calculated again using the scale variable (Q+1) (step S69a), and the entire color multi-valued image data is JPEG-encoded again using these coefficients (the code length at that time is $C_m$). The encoded result is stored in the memory 402 (step S70a). Region information is read out from the memory 402 first, and is transmitted from the transmitter 405 (step S71a). Since the minimum code length $C_{mt}$ is larger than the target code length $L_T$ (step S72a), the JPEG codes of the entire color multi-valued image data are transmitted from the transmitter 405 (step S81a). Upon completion of transmission of all the JPEG codes of the entire color multi-valued image data, all the processing operations end.

If the sum of the code length $C_m'$ of the JPEG codes stored in the memory 402 and the code length counter $C_T$ is equal to the target code length $L_T$ (step S67a), region information is read out from the memory 402 first, and is transmitted from the transmitter 405 (step S71a). Since the minimum code length $C_{mt}$ is larger than the target code length $L_T$ (step S72a), the JPEG codes of the entire color multi-valued image data are transmitted from the transmitter 405 (step S81a). Upon completion of transmission of all the JPEG codes of the entire color multi-valued image data, all the processing operations end.

If the sum of the code length $C_m'$ of the JPEG codes stored in the memory 402 and the code length counter $C_T$ is smaller than the target code length $L_T$ (step S67a), the flow advances to step S63a. In step S63a, the scale variable Q is decremented by "1" to repeat the above-mentioned processing.

In the description of the sixth embodiment, the image input from the image input device 400 is assumed to be a color multi-valued image. However, the present invention is not limited to such specific type of image, but may be applied to a monochrome multi-valued image. Also, the coding methods of image data are not limited to those described above. Furthermore, the memory arrangements and the like are not limited to the specific ones described above, and processing in units of a plurality of lines may be done.

In JPEG coding, the scale coefficient Q is changed by "1" to adjust the code length. However, the present invention is not limited to such specific adjustment, and a method of predicting a new scale coefficient Q based on the code length and the scale coefficient Q may be used.

Although JBIG coding and JPEG coding are used herein, the present invention is not limited to these specific methods, and other coding methods may be used.

The scale coefficient is used for adjusting the code length. However, the present invention is not limited to such specific adjustment method of the scale coefficient. For example, the quantization coefficients may be individually changed, or a method of predicting a scale coefficient, a method of updating the scale coefficient at a constant rate, or the like may be used.

As described above, according to the sixth embodiment, a code with a code length that the user desired can be obtained for color multi-valued image data even by software such as a computer program without the need for dedicated hardware. Since the target code length $L_{mt}$ of the continuous gradation region is updated upon coding each continuous gradation region, the obtained code length approaches a desired code length to a maximum possible degree. Furthermore, since the default value of the scale coefficient is determined on the basis of the size and bit rate of the image to be processed, the time required for obtaining an optimal scale coefficient can be shortened. Moreover, since the minimum code length in the continuous gradation region is calculated, the minimum code length upon coding in units of regions is calculated, and they are compared with the target code length, coding beyond a desired code length can be avoided.

On the other hand, the obtained code are transmitted from the transmitter 405 but may be stored in a storage device 404. At this time, since the storage device 404 can store a predetermined number of frames of image data, management can be facilitated when images are saved in exchangeable media such as magnetooptical disks and the like.

In the first to sixth embodiments mentioned above, the arrangement of the image processing apparatus is not limited to those described above, and may be partially realized by software or the like. In the above embodiments, the frame memory is used. However, the present invention is not limited to such specific memory, and line buffers may be used. Furthermore, the number of bits and the like of the input image are not limited to those described above.

In case of a color image, R, G, and B components are directly used. However, the present invention is not limited to this, and CIE1976 L*a*b*, YCbCr, and the like may be used. The number of input bits is not particularly limited. The coding methods are not particularly limited, but any other methods may be used as long as reversible coding is done for the limited color regions and irreversible coding is done for the continuous gradation regions. For example, Lempel-Ziv coding or other entropy coding methods may be used for the limited color regions. More specifically, each limited color region is encoded based on binary image information and representative colors. However, the present invention is not limited to this. For example, if the limited color region includes a plurality of colors, it may be encoded as a multi-valued image with a smaller number of bits. Alternatively, any other methods may be used. For example, the limited color region may be expressed as a multi-valued image having a white background="00", black="01", red= "10", and blue="11", and may be encoded by, e.g., DPCM or the like.

The region segmentation and quantization methods are not limited to those described above, but other methods may be used. In the above description, each segmented region has a rectangular shape. However, the present invention is not limited to such specific shape, and each region may have a free shape such as an edge line.

Binarization for region segmentation is done for the luminance that best expresses the nature of image for the sake of descriptive convenience. However, binarization may be similarly done for the chromaticity or may be done for R, G, and B components respectively.

The scale coefficient Q is used in code length adjustment in JPEG coding. However, code length adjustment is not limited to such specific method, but may be done by individually manipulating quantization coefficients. Also, in adjustment using the scale variable Q, the scale variable Q is incremented/decremented by "1". However, the present invention is not limited to such specific method. For example, a method of updating the code length by prediction based on the scale coefficient Q and code length may be used.

In the fourth and fifth embodiments, the default value of the scale coefficient Q is expressed in proportion to the continuous gradation region occupation ratio $P_r$ and bit rate BR as in equation (18) above, but may be expressed by a quadratic function or the like.

As described above, according to the first to sixth embodiments, an image is segmented into regions and is encoded in units of segmented regions, and the code amount is controlled in each continuous gradation region. Hence, the code length can be controlled without deteriorating the image quality and visibility.

According to the fourth to sixth embodiments, since the default value of a variable used for adjusting the code length is determined based on the ratio of continuous gradation regions to the entire image, the time required for calculating a desired code length can be shortened. Furthermore, upon encoding a plurality of regions by variable-length coding, since the previously used value of the variable used for controlling the code amount is used, the time required for calculating a desired code length can be shortened.

In the method of coding in correspondence with the natures of regions, since the minimum code length required for codes and the target code length are compared with each other, the obtained code length can always be smaller than the desired code length.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the above-mentioned flow charts. This will be briefly explained below. That is, the storage medium stores individual modules shown in memory map examples shown in FIGS. 32 and 33.

Figure 32:
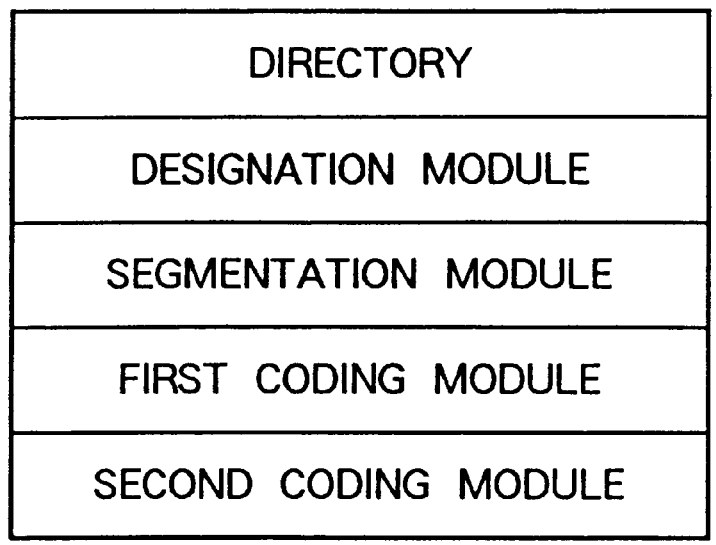
FIG. 32 shows the memory map structure of a storage medium that stores program codes which implement the embodiment of the present invention.

More specifically, in the first to third embodiments, the storage medium need only store program codes of at least a "designation module", "segmentation module", "first coding module", and "second coding module", as shown in FIG. 32.

Note that the "designation module" designates a target code length as a desired code length. The "segmentation module" segments input image data into a plurality of regions in units of attributes. The "first coding module" encodes regions other than those having a predetermined attribute among the plurality of segmented regions. The "second coding module" encodes the regions having the predetermined attribute on the basis of the code length of codes encoded by the first coding module.

Figure 33:
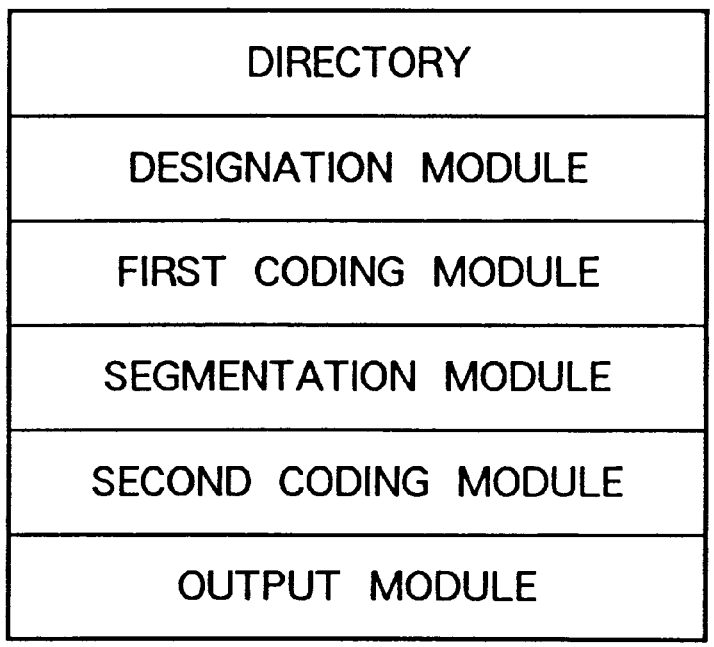
FIG. 33 shows the memory map structure of a storage medium that stores program codes which implement the embodiment of the present invention.

More specifically, in the fourth embodiment, the storage medium need only store program codes of at least a "designation module", "first coding module", "segmentation module", "second coding module", and "output module", as shown in FIG. 33.

Note that the "designation module" designates a target code length as a desired code length. The "first coding module" encodes the entire input image data to obtain the target code length. The "segmentation module" segments input image data into a plurality of regions in units of attributes. The "second coding module" encodes the segmented regions in units of attributes to obtain the target code length. The "output module" outputs either codes encoded by the first or second coding module on the basis of a first coding unit of codes encoded by the first coding module and a second coding unit of codes in a region having a predetermined attribute encoded by the second coding module.

More specifically, in the fifth and sixth embodiments, the storage medium need only store program codes of at least a "designation module", "first coding module", "segmentation module", "second coding module", and "output module", as shown in FIG. 33.

Note that the "designation module" designates a target code length as a desired code length. The "first coding module" encodes the entire input image data to obtain the target code length. The "segmentation module" segments input image data into a plurality of regions in units of attributes. The "second coding module" encodes the segmented regions in units of attributes to obtain the target code length. The "output module" outputs either codes encoded by the first or second coding module on the basis of the code length of codes encoded by the second coding module.

Note that all the above embodiments may be applied to a case wherein moving images are to be compressed. For example, the continuous gradation region of each embodiment may be considered as a moving image, and in such case, compression based on Motion-JPEG is used.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
designation means for designating a target code length as a desired code length;
first coding means for coding entire input image data to obtain the target code length;
segmentation means for segmenting the input image data into a plurality of regions in units of attributes;
second coding means for encoding the regions segmented by said segmentation means in units of attributes to obtain the target code length; and
output means for outputting a code encoded by one of said first and second coding means on the basis of a first coding length of a code encoded by said first coding means and a second coding length of a code in a region having a predetermined attribute encoded by said second coding means.

2. The apparatus according to claim 1, wherein said output means compares the first and second coding lengths, outputs the code encoded by said second coding means when the first coding length is larger than the second coding length as a result of comparison, and outputs the code encoded by said first coding means when the second coding length is larger than the first coding length.

3. The apparatus according to claim 2, wherein said first coding means comprises first quantization means for quantizing the input image data,
the first coding length is obtained based on a first quantization coefficient used upon quantization in said first quantization means,
said second coding means comprises second quantization means for quantizing the region having the predetermined attribute, and
the second coding length is obtained based on a second quantization coefficient used upon quantization in said second quantization means.

4. The apparatus according to claim 1, wherein said first coding means encodes the entire input image data by irreversible coding.

5. The apparatus according to claim 1, wherein said second coding means encodes the region having the predetermined attribute by irreversible coding, and encodes a region other than the region having the predetermined attribute by reversible coding.

6. The apparatus according to claim 1, wherein the region having the predetermined attribute is a continuous gradation region having continuous gradation, and
a region other than the region having the predetermined attribute is a limited color region that can be expressed by a limited number of colors.

7. The apparatus according to claim 6, wherein said segmentation means segments the input image data into the continuous gradation region and the limited color region.

8. An image processing apparatus comprising:
designation means for designating a target code length as a desired code length;
first coding means for coding entire input image data to obtain the target code length;
segmentation means for segmenting the input image data into a plurality of regions in units of attributes;
second coding means for encoding the regions segmented by said segmentation means in units of attributes to obtain the target code length; and
output means for outputting a code encoded by one of said first and second coding means on the basis of a code length of a code encoded by said second coding means.

9. The apparatus according to claim 8, wherein said output means outputs the code encoded by said first coding means when the code length of the code encoded by said second coding means is larger than the target code length, and outputs the code encoded by said second coding means when the code length of the code encoded by said second coding means is smaller than the target code length.

10. The apparatus according to claim 8, wherein said second coding means encodes a region having a predetermined attribute of the regions segmented by said segmentation means by irreversible coding, and encodes a region other than the region having the predetermined attribute by reversible coding.

11. The apparatus according to claim 10, wherein said output means outputs the code encoded by one of said first and second coding means on the basis of a code length of a code obtained when said second coding means encodes the region having the predetermined attribute by irreversible coding to obtain a minimum required code length, and encodes the region other than the region having the predetermined attribute by reversible coding.

12. The apparatus according to claim 8, wherein a region having a predetermined attribute is a continuous gradation region having continuous gradation, and
a region other than the region having the predetermined attribute is a limited color region that can be expressed by a limited number of colors.

13. The apparatus according to claim 12, wherein said segmentation means segments the input image data into the continuous gradation region and the limited color region.

14. An image processing apparatus comprising:
designation means for designating a target code length as a desired code length;
segmentation means for segmenting input image data into a plurality of regions in units of attributes;
first coding means for encoding a region other than a region having a predetermined attribute of a plurality of regions segmented by said segmentation means; and
second coding means for encoding the region having the predetermined attribute on the basis of the target code length and a code length of a code encoded by said first coding means.

15. The apparatus according to claim 14, wherein said second coding means comprises calculation means for calculating a difference between the target code length and the code length of the code encoded by said first coding means, and said second coding means encodes image data corresponding to the region having the predetermined attribute to obtain a code length of the difference calculated by said calculation means.

16. The apparatus according to claim 15, further comprising:

output means for outputting the code encoded by said first coding means and a code encoded by said second coding means.

17. The apparatus according to claim 14, wherein said first coding means encodes the region other than the region having the predetermined attribute by reversible coding.

18. The apparatus according to claim 14, wherein said second coding means encodes the region having the predetermined attribute by irreversible coding.

19. The apparatus according to claim 14, wherein the region having the predetermined attribute is a continuous gradation region having continuous gradation, and the region other than the region having the predetermined attribute is a limited color region that can be expressed by a limited number of colors.

20. The apparatus according to claim 19, wherein said segmentation means segments the input image data into the continuous gradation region and the limited color region.

21. An image processing method comprising:

the designation step of designating a target code length as a desired code length;

the first coding step of coding entire input image data to obtain the target code length;

the segmentation step of segmenting the input image data into a plurality of regions in units of attributes;

the second coding step of encoding the regions segmented in the segmentation step in units of attributes to obtain the target code length; and the output step of outputting a code encoded in one of the first and second coding steps on the basis of a first coding length of a code encoded in the first coding step and a second coding length of a code in a region having a predetermined attribute encoded in the second coding step.

22. The method according to claim 21, wherein the output step includes the step of comparing the first and second coding lengths, outputting the code encoded in the second coding step when the first coding length is larger than the second coding length as a result of comparison, and outputting the code encoded in the first coding step when the second coding length is larger than the first coding length.

23. The method according to claim 22, wherein the first coding step comprises the first quantization step of quantizing the input image data, the first coding length is obtained based on a first quantization coefficient used upon quantization in the first quantization step, the second coding step comprises the second quantization step of quantizing the region having the predetermined attribute, and the second coding length is obtained based on a second quantization coefficient used upon quantization in the second quantization step.

24. The method according to claim 21, wherein the first coding step includes the step of encoding the entire input image data by irreversible coding.

25. The method according to claim 21, wherein the second coding step includes the step of encoding the region having the predetermined attribute by irreversible coding, and encoding a region other than the region having the predetermined attribute by reversible coding.

26. The method according to claim 21, wherein the region having the predetermined attribute is a continuous gradation region having continuous gradation, and a region other than the region having the predetermined attribute is a limited color region that can be expressed by a limited number of colors.

27. The method according to claim 26, wherein the segmentation step includes the step of segmenting the input image data into the continuous gradation region and the limited color region.

28. An image processing method comprising:

the designation step of designating a target code length as a desired code length;

the first coding step of coding entire input image data to obtain the target code length;

the segmentation step of segmenting the input image data into a plurality of regions in units of attributes;

the second coding step of encoding the regions segmented in the segmentation step in units of attributes to obtain the target code length; and the output step of outputting a code encoded in one of the first and second coding steps on the basis of a code length of a code encoded in the second coding step.

29. The method according to claim 28, wherein the output step includes the step of outputting the code encoded in the first coding step when the code length of the code encoded in the second coding step is larger than the target code length, and outputting the code encoded in the second coding step when the code length of the code encoded in the second coding step is smaller than the target code length.

30. The method according to claim 28, wherein the second coding step includes the step of encoding a region having a predetermined attribute of the regions segmented in the segmentation step by irreversible coding, and encoding a region other than the region having the predetermined attribute by reversible coding.

31. The method according to claim 30, wherein the output step includes the step of outputting the code encoded in one of the first and second coding steps on the basis of a code length of a code obtained when the region having the predetermined attribute is encoded by irreversible coding to obtain a minimum required code length and the region other than the region having the predetermined attribute is encoded by reversible coding in the second coding step.

32. The method according to claim 28, wherein a region having a predetermined attribute is a continuous gradation region having continuous gradation, and a region other than the region having the predetermined attribute is a limited color region that can be expressed by a limited number of colors.

33. The method according to claim 32, wherein the segmentation step includes the step of segmenting the input image data into the continuous gradation region and the limited color region.

34. An image processing method comprising:

the designation step of designating a target code length as a desired code length;

the segmentation step of segmenting input image data into a plurality of regions in units of attributes;

the first coding step of encoding a region other than a region having a predetermined attribute of a plurality of regions segmented in the segmentation step; and the second coding step of encoding the region having the predetermined attribute on the basis of the target code length and a code length of a code encoded in the first coding step.

35. The method according to claim 34, wherein the second coding step comprises the calculation step of calculating a difference between the target code length and the code length of the code encoded in the first coding step, and the second coding step includes the step of encoding image data corresponding to the region having the predetermined attribute to obtain a code length of the difference calculated in the calculation step.

36. The method according to claim 35, further comprising:

the output step of outputting the code encoded in the first coding step and a code encoded in the second coding step.

37. The method according to claim 34, wherein the first coding step includes the step of encoding the region other than the region having the predetermined attribute by reversible coding.

38. The method according to claim 34, wherein the second coding step includes the step of encoding the region having the predetermined attribute by irreversible coding.

39. The method according to claim 34, wherein the region having the predetermined attribute is a continuous gradation region having continuous gradation, and the region other than the region having the predetermined attribute is a limited color region that can be expressed by a limited number of colors.

40. The method according to claim 39, wherein the segmentation step includes the step of segmenting the input image data into the continuous gradation region and the limited color region.

41. A computer readable memory that stores program codes of image processing, comprising:

a program code of the designation step of designating a target code length as a desired code length;

a program code of the first coding step of coding entire input image data to obtain the target code length;

a program code of the segmentation step of segmenting the input image data into a plurality of regions in units of attributes;

a program code of the second coding step of encoding the regions segmented in the segmentation step in units of attributes to obtain the target code length; and a program code of the output step of outputting a code encoded in one of the first and second coding steps on the basis of a first coding length of a code encoded in the first coding step and a second coding length of a code in a region having a predetermined attribute encoded in the second coding step.

42. A computer readable memory that stores program codes of image processing, comprising:

a program code of the designation step of designating a target code length as a desired code length;

a program code of the first coding step of coding entire input image data to obtain the target code length;

a program code of the segmentation step of segmenting the input image data into a plurality of regions in units of attributes;

a program code of the second coding step of encoding the regions segmented in the segmentation step in units of attributes to obtain the target code length; and a program code of the output step of outputting a code encoded in one of the first and second coding steps on the basis of a code length of a code encoded in the second coding step.

43. A computer readable memory that stores program codes of image processing, comprising:

a program code of the designation step of designating a target code length as a desired code length;

a program code of the segmentation step of segmenting input image data into a plurality of regions in units of attributes;

a program code of the first coding step of encoding a region other than a region having a predetermined attribute of a plurality of regions segmented in the segmentation step; and a program code of the second coding step of encoding the region having the predetermined attribute on the basis of the target code length and a code length of a code encoded in the first coding step.

44. An image processing apparatus comprising:

holding means for holding a predetermined target code length;

input means for inputting a first type object image and second type object image which form an image for one frame;

first coding means for coding the first type object image using a first method;

second coding means for coding the second type object image using a second method, an algorithm of which is different from an algorithm of the first method; and code length control means for controlling coding of said second coding means so as to make encoded data corresponding to the plurality of object images that form the image for one frame have the predetermined code length as a whole.

45. The apparatus according to claim 44, wherein said first coding means executes binary coding, and said second coding means executes multi-valued coding.

46. The apparatus according to claim 44, wherein said first coding means executes JBIG coding, and said second coding means executes JPEG coding.

47. The apparatus according to claim 44, further comprising:

supply means for receiving a single image for one frame, segmenting the single image into the first and second type object images, and supplying the segmented images to said input means.

48. The apparatus according to claim 45, wherein said supply means analyzes contents of the single image for one frame to determine positions of the first and second type object images.

49. The apparatus according to claim 44, wherein the first type object image is a character image or line image.

50. The apparatus according to claim 44, wherein the second type object image is a halftone image.

51. The apparatus according to claim 44, wherein the second type object image is a moving image.

52. An image processing method comprising:

the holding step of holding a predetermined target code length;

the input step of inputting a first type object image and second type object image which form an image for one frame;

the first coding step of coding the first type object image using a first method;

the second coding step of coding the second type object image using a second method, an algorithm of which is different from an algorithm of the first method; and the code length control step of controlling coding of said second coding step so as to make encoded data corresponding to the plurality of object images that form the image for one frame have the predetermined code length as a whole.

53. A computer readable memory that stores program codes of image processing, comprising:

a program code the holding step of holding a predetermined target code length;

a program code of the input step of inputting a first type object image and second type object image which form an image for one frame;

a program code of the first coding step of coding the first type object image using a first method;

a program code of the second coding step of coding the second type object image using a second method, an algorithm of which is different from an algorithm of the first method; and a program code of the code length control step of controlling coding of said second coding step so as to make encoded data corresponding to the plurality of object images that form the image for one frame have the predetermined code length as a whole.

* * * * *

UNITED STATES PATENT AND TRADEMARK OFFICE
CERTIFICATE OF CORRECTION

PATENT NO. : 6,067,382  Page 1 of 1
DATED : May 23, 2000
INVENTOR(S) : Mitsuru Maeda It is certified that error appears in the above-identified patent and that said Letters Patent is hereby corrected as shown below:

Title page,
Item [56], References Cited, OTHER PUBLICATIONS, after "27623A)", delete No Name, Title, Date or Page."; and after "075773A)" delete "No Name, Title, Date, or Page.".

Column 1,
Line 1, "IMAGE CODING BASED ON THE TARGET CODE LENGTH" should read -- IMAGE PROCESSING APPARATUS AND METHOD --.

Column 6,
Line 28, after "A program code" insert -- of --.

Column 20,
Line 38, "one" should read -- done --.

Column 25,
Line 3, "able" should read -- table --.

Column 51,
Line 8, after "a program code" insert -- of --.

Signed and Sealed this

Seventh Day of October, 2003

JAMES E. ROGAN
*Director of the United States Patent and Trademark Office*